US012622446B2

(12) United States Patent (10) Patent No.: US 12,622,446 B2
Zhao et al. (45) Date of Patent: May 12, 2026

(54) FIBER MIX FORMULATIONS AND USES THEREOF

(71) Applicant: Rutgers, The State University of New Jersey, New Brunswick, NJ (US)

(72) Inventors: Liping Zhao, New Brunswick, NJ (US); Yan Yan Lam, Fords, NJ (US); Yongjia Gong, North Brunswick, NJ (US); Guojun Wu, New Brunswick, NJ (US); Cuiping Zhao, Highland Park, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 495 days.

(21) Appl. No.: 17/917,500

(22) PCT Filed: Apr. 7, 2021

(86) PCT No.: PCT/US2021/026258
§ 371 (c)(1),
(2) Date: Oct. 6, 2022

(87) PCT Pub. No.: WO2021/207412
PCT Pub. Date: Oct. 14, 2021

(65) Prior Publication Data
US 2023/0142707 A1 May 11, 2023

Related U.S. Application Data

(60) Provisional application No. 63/006,896, filed on Apr. 8, 2020.

(51) Int. Cl.
*A23L 7/10* (2016.01)
*A23L 29/212* (2016.01)
*A23L 29/269* (2016.01)
*A23L 33/00* (2016.01)
*A23L 33/22* (2016.01)

(52) U.S. Cl.
CPC ............. *A23L 7/115* (2016.08); *A23L 29/212* (2016.08); *A23L 29/269* (2016.08); *A23L 33/22* (2016.08); *A23L 33/40* (2016.08)

(58) Field of Classification Search
CPC ..... A61K 31/715; A61K 31/733; A61K 9/141
See application file for complete search history.

(56) References Cited

U.S. PATENT DOCUMENTS

| | | | |
|---|---|---|---|
| 2004/0265360 A1 | 12/2004 | Venturi |
| 2005/0037993 A1 | 2/2005 | Craig et al. |
| 2006/0093720 A1 * | 5/2006 | Tatz |
| 2008/0131561 A1 | 6/2008 | Patanawongyuneyong |
| 2009/0074919 A1 | 3/2009 | Smith |
| 2009/0252758 A1 | 10/2009 | Mazed et al. |
| 2011/0250318 A1 | 10/2011 | Innocenzi |
| 2012/0269865 A1 | 10/2012 | Roughead et al. |
| 2014/0308389 A1 | 10/2014 | Ames et al. |
| 2015/0296851 A1 | 10/2015 | Zhao |
| 2015/0366257 A1 | 12/2015 | Manchuliantsau |
| 2015/0368372 A1 * | 12/2015 | Yadav et al. |
| 2016/0050962 A1 | 2/2016 | Davies et al. |
| 2017/0215466 A1 | 8/2017 | Ames et al. |

FOREIGN PATENT DOCUMENTS

| | | | |
|---|---|---|---|
| CN | 106666365 | * | 12/2016 |
| CN | 106666365 A | | 5/2017 |

OTHER PUBLICATIONS

Jovel et al., Characterization of the Gut Microbiome Using 16S or Shotgun Metagenomics, 2016, Front. Microbiol 7:459 (Year: 2016).*
Pinna et al., Can Targeting Non-Contiguous V-Regions With Paired-End Sequencing Improve 16S rRNA-Based Taxonomic Resolution of Microbiomes, An In Silico Evaluation, 2019, Front. Genet. 10:653 (Year: 2019).*
Anil, Munir, Effects of Wheat Bran, Com Bran, Rice Rran and Oat Bran Supplementation on the Properties of Pide, Journal of Food Processing and Preservation, Jun. 2012, pp. 276-283, Turkey.
International Search Report and Written Opinion of related International Application No. PCT/US2021/026258, dated Aug. 12, 2021; 9 pages.

* cited by examiner

*Primary Examiner* — Robert A Wax
*Assistant Examiner* — Kimberly Barber
(74) *Attorney, Agent, or Firm* — Greenberg Traurig, LLP

(57) ABSTRACT

The present disclosure relates to a fiber mix formulation comprising a mixture of bran, inulin, and digestion resistant maltodextrin useful to restore a healthier gut microbiota and alleviate symptoms in subjects with imbalance of gut microbiota. The mixture of soluble dietary fiber (SDF) and insoluble dietary fiber (ISDF) with a ratio of ISDF:SDF (0.5:1 to 1:0.5), has synergistic effect on gut microbiota composition, promoting the growth of the acetate- and butyrate-producing bacteria and inhibiting the growth of pathogens and detrimental bacteria.

34 Claims, 59 Drawing Sheets

Specification includes a Sequence Listing.

Non-diabetes (N=10)

Prediabetes/Diabetes  (N=9)

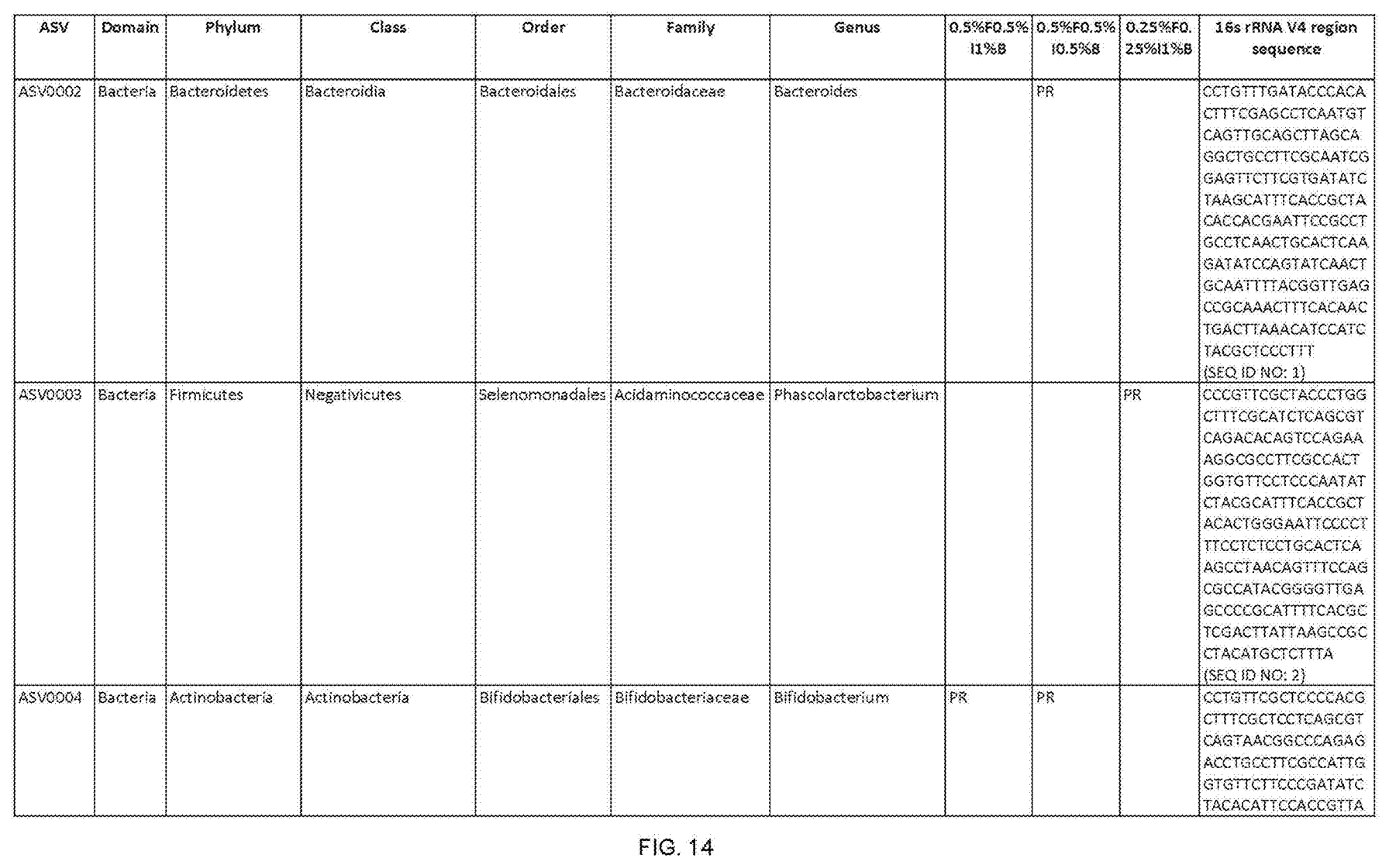

| ASV | Domain | Phylum | Class | Order | Family | Genus | 0.5%FO.5% 11%B | 0.5%FO.5% 10.5%B | 0.25%FO. 25%B | 16s rRNA V4 region sequence |
|---|---|---|---|---|---|---|---|---|---|---|
| ASV0002 | Bacteria | Bacteroidetes | Bacteroidia | Bacteroidales | Bacteroidaceae | Bacteroides | | PR | | CCTGTTTGATACCCACA CTTTCGAGCCTCAATGT CAGTTGCAGCTTAGCA GGCTGCCTTCGCAATCG GAGTTCTTCGTGATATC TAAGCATTTCACCGCTA CACCACGAATTCCGCCT GCCTCAACTGCACTCAA GATATCCAGTATCAACT GCAATTTTACGGTTGAG CCGCAAACTTTCACAAC TGACTTAAACATCCATC TACGCTCCCTTT (SEQ ID NO: 1) |
| ASV0003 | Bacteria | Firmicutes | Negativicutes | Selenomonadales | Acidaminococcaceae | Phascolarctobacterium | | | PR | CCCGTTCGCTACCCTGG CTTTCGCATCTCAGCGT CAGACACAGTCCAGAA AGGCGCCTTCGCCACT GGTGTTCCTCCCAATAT CTACGCATTTCACCGCT ACACTGGGAATTCCCCT TTCCTCTCCTGCACTCA AGCCTAACAGTTTCCAG CGCCATACGGGGTTGA GCCCCGCATTTTCACGC TCGACTTATTAAGCCGC CTACATGCTCTTA (SEQ ID NO: 2) |
| ASV0004 | Bacteria | Actinobacteria | Actinobacteria | Bifidobacteriales | Bifidobacteriaceae | Bifidobacterium | PR | PR | | CCTGTTCGCTCCCCACG CTTTCGCTCCTCAGCGT CAGTAACGGCCCAGAG ACCTGCCTTCGCCATTG GTGTTCTTCCCGATATC TACACATTCCACCGTTA |

FIG. 14

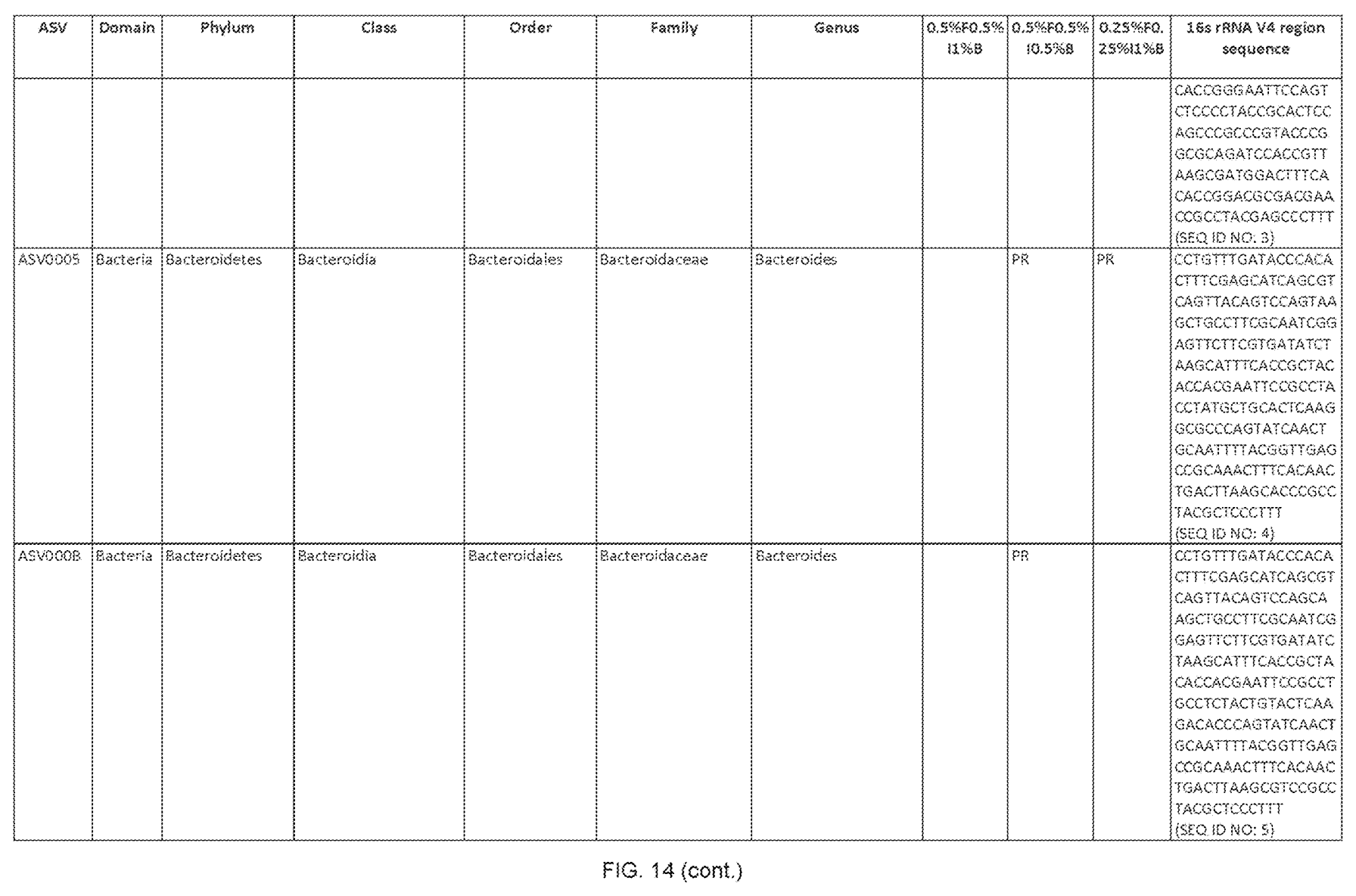

| ASV | Domain | Phylum | Class | Order | Family | Genus | 0.5%F0.5% 11%B | 0.5%F0.5% 10.5%B | 0.25%F0. 2.5%&1.1%B | 16s rRNA V4 region sequence |
|---|---|---|---|---|---|---|---|---|---|---|
| | | | | | | | | | | CACCGGGAATTCCAGT CTCCCTACCGCACTCC AGCCGCGCCGTACCCG GCGGAGATCCACCGTT AAGCGATGGACTTTCA CACCGGACGCGACGAA CCGCCTACGAGCCCTTT (SEQ ID NO: 3) |
| ASV0005 | Bacteria | Bacteroidetes | Bacteroidia | Bacteroidales | Bacteroidaceae | Bacteroides | | PR | PR | CCTGTTTGATACCCACA CTTCGGAGCATCAGCGT CAGTTACAGTCCAGTAA GCTGCCTTCGCAATCGG AGTTCTTCGTGATATCT AAGCATTTCACCGCTAC ACCACGAATTCCGCCTA CCTATGCTGCCACTCAAG GCGCCCAGTATCAACT GCAATTTTACGGTTGAG CCGCAAACTTTCACAAC TGACTTAAGCACCCGCC TACGCTCCCTTT (SEQ ID NO: 4) |
| ASV0008 | Bacteria | Bacteroidetes | Bacteroidia | Bacteroidales | Bacteroidaceae | Bacteroides | | PR | PR | CCTGTTTGATACCCACA CTTTCGGAGCATCAGCGT CAGTTACAGTCCAGCA AGCTGCCTTCGCAATCG GAGTTCTTCGTGATATC TAAGCATTTCACCGCTA CACCACGAATTCCGCCT GCCTCTACTGTACTCAA GACACCCAGTATCAACT GCAATTTTACGGTTGAG CCGCAAACTTTCACAAC TGACTTAAGCGGTCCGCC TACGCTCCCTTT (SEQ ID NO: 5) |

FIG. 14 (cont.)

| ASV | Domain | Phylum | Class | Order | Family | Genus | 0.5%F0.5% 11%B | 0.5%F0.5% 10.5%B | 0.5%F0.5% 0.5%B | 0.25%F0. 25%/1%B | 16s rRNA V4 region sequence |
|---|---|---|---|---|---|---|---|---|---|---|---|
| ASV0000E | Bacteria | Bacteroidetes | Bacteroidia | Bacteroidales | Rikenellaceae | Alistipes | | PR | | | CCTGTTTGCTCCCCACG CTTCGTGCTGCCTCAACGT CAGATATAGTTTGGTAA GCTGCCTTCGCCAATCGG TGTTCTGTGATGATCTCT AAGCATTCACCGCTAC ACCATACATTCCGCCTA CCGCAACTACTCTCTAG TCTAACAGTATTAGAG GCAGTTCCGGAGTTAA GCCCCGGGATTTCACCT CTAACTTATCAAACCGC CTACGCACCCTTT (SEQ ID NO: 5) |
| ASV0000F | Bacteria | Firmicutes | Clostridia | Clostridiales | Lachnospiraceae | [Ruminococcus] torques group | PR | PR | | PR | CCTGTTTGCTCCCCACG CTTTCGAGCCTCAACGT CAGTTACCGTCCAGTAA GCCGCCTTCGCCACTGG TGTTCCTCCTAATATCT ACGCATTTCACCGCTAC ACTAGGAATTCCGCTTA CCTCTCCGGTACTCTAG ATTGACAGTTCCAAATG CAGTCCCGGGGTTGAG CCCGGGTTTTCACATC AGACTTGCCACTCCGTC TACGCTCCCTTT (SEQ ID NO: 7) |
| ASV0000I | Bacteria | Bacteroidetes | Bacteroidia | Bacteroidales | Tannerellaceae | Parabacteroides | | | | PR | CCTGTTTGATCCCCACG CTTCGTGCTGCTCAGTGT CAGTTATGGTTTAGTAA GCTGCCTTCGCCAATCGG AGTTCTGCGTGATATCT ATGCATTCACCGCTAC ACCACGCATTCCGCTA CCTCAAACACACTCAAG |

FIG. 14 (cont.)

| ASV | Domain | Phylum | Class | Order | Family | Genus | 0.5%&0.5% 1%&B | 0.5%&F0.5% !0.5%B | 0.25%&F0. 2.5%&1%B | 16s rRNA V4 region sequence |
|---|---|---|---|---|---|---|---|---|---|---|
|  |  |  |  |  |  |  |  |  |  | TAACCCAGTTTCAACGG CAATTTATGGTTGAGC CACAAACTTTCACCGCT GACTTAAATCACCACCT ACGCACCCTTT (SEQ ID NO: 3) |
| ASVG00J | Bacteria | Actinobacteria | Actinobacteria | Bifidobacteriales | Bifidobacteriaceae | Bifidobacterium | PR | PR |  | CCTGTTCGCTCCCCACG CTTTCGCTCCTCAGCGT CAGTAACGGCCCAGAG ACCTGCCTTCGCCATTG GTGTTCTTCCCGATATC TACACATTCCACCGTTA CACCGGGAATTCCAGT CTCCCTACCGCACTCA AGCCCGCCCGTACCCG GCGCGGATCCACCGTT AAGCGATGGGACTTTCA CACCGGACGCGGACGAA CCGCCTACGGAGCCCTTT (SEQ ID NO: 9) |
| ASVG00K | Bacteria | Firmicutes | Clostridia | Clostridiales | Ruminococcaceae | Subdoligranulum |  | PR |  | CCTGTTTGCTACCCATG CTTTCGAGCCTCAGCGT CAGTTGGTGCCCAGTA GACCGCCTTCGCCACTG GTGTTCCTCCCGATATC TACGCATTCCACCGCTA CACCGGGAATTCCATCT ACCTCTGCACTACTCAA GAAAAACAGTTTTGAA AGCAATTCATGGGTTG AGCCCATGGTTTTCACT TCCAACTTGTCTTCCCG CCTGCGCTCCCTTT (SEQ ID NO: 10) |
| ASVG00L | Bacteria | Bacteroidetes | Bacteroidia | Bacteroidales | Tannerellaceae | Parabacteroides |  | PR |  | CCTGTTTGATCCCCACG CTTTCGTGCTTCAGTGT |

FIG. 14 (cont.)

| ASV | Domain | Phylum | Class | Order | Family | Genus | 0.5%F0.5% l1%B | 0.5%F0.5% l0.5%B | 0.25%F0. 25%l1%B | 16s rRNA V4 region sequence |
|---|---|---|---|---|---|---|---|---|---|---|
| | | | | | | | | | | CAGTTATAGTTTAGTAA GCTGCCTTCGCAATCGG AGTTCTGCGTGATATCT ATGCATTTCACCGCTAC ACCACGCATTCCGCCTA CCTCAAATATATCAAG TCAACCAGTTTCAACGG CAATTTATCGTTGAGC CACAAACTTTCACCGCT GACTTAATTAACCACCT ACGCACCCTTT (SEQ ID NO: 11) |
| ASVGO0M | Bacteria | Firmicutes | Clostridia | Clostridiales | Lachnospiraceae | Lachnospiraceae NK4A136 group | | | PR | CCTGTTGCTCCCCACG CTTTCGAGCCTCAACGT CAGTTACCGTCCAGTAA GCCGGCCTTCGCCACTGG TGTTCTTCCTAATATCTA CGCATTTCACCGCTACA CTAGGAATTCCGCTTAC CTCTCCGGCACTCCAGC CAAACAGTTTCCAAAGC AGTCCCGGCGTTAAGC ACCGGGCTTTCACTTCA GACTTGCCTTGCCGTCT ACGCTCCCTTT (SEQ ID NO: 12) |
| ASVGO0N | Bacteria | Bacteroidetes | Bacteroidia | Bacteroidales | Bacteroidaceae | Bacteroides | | PR | | CCTGTTTGATACCCACA CTTTCGAGCATCAGTGT CAGTTGCAGTCCAGTG AGCTGCCTTCGCAATCG GAGTTCTTCGTGATATC TAAGCATTTCACCGCTA CACCACGAATTCCGCCC ACCTCTACTGTACTCAA GACAGCCAGTATCAAC TGCAATTTTACGGTTGA |

FIG. 14 (cont.)

| ASV | Domain | Phylum | Class | Order | Family | Genus | 0.5%F0.5% 11%B | 0.5%F0.5% 10.5%B | 0.25%F0. 25%&1%B | 16s rRNA V4 region sequence |
|---|---|---|---|---|---|---|---|---|---|---|
| | | | | | | | | | | GCCGCAAACTTCACAA CTGACTTAACTGTCCAC CTACGCTCCCTTT (SEQ ID NO: 13) |
| ASV0000P | Bacteria | Firmicutes | Clostridia | Clostridiales | Lachnospiraceae | Roseburia | PR | PR | PR | CCTGTTTGCTCCCCACG CTTTCGAGCCTCAGCGT CAGTAATCGTCCAGTAA GCCGGCCTTCGCCACTGG TGTTCCTCCTAATATCT ACGCATTTCACCGCTAC ACTAGGAATTCCACTTA CCCCTCCGACACTCTAG TCCGACAGTTTCCAATG CAGTACCGGGGTTGAG CCCCGGGATTTCACATC AGACTTGCCGTACCGCC TGCGCTCCCTTT (SEQ ID NO: 14) |
| ASV0000Q | Bacteria | Bacteroidetes | Bacteroidia | Bacteroidales | Tannerellaceae | Parabacteroides | | PR | PR | CCTGTTTGATCCCCACG CTTTCGTGCATCAGCGT CAGTCATGGCTTGGCA GGCTGCCTTCGCCAATCG GGGTTCTGCGTGATATC TATGCATTTCACCGCTA CACCACGCATTCCGCCT GCCTCAAACATACTCAA GCCCCCAGTTTCAACG GCAATTCTATGGTTGAG CCACAGACTTTCACCGC TGACTTAAAAGGCCGC CTACGCACCCTTT |
| ASV0005 | Bacteria | Bacteroidetes | Bacteroidia | Bacteroidales | Bacteroidaceae | Bacteroides | | | PR | CCTGTTTGATACCCACA CTTTCGAGCATCAATGT CAGTTACAGGTTAGTA AGCTGCCTTCGCCAATCG (SEQ ID NO: 15) |

FIG. 14 (cont.)

| ASV | Domain | Phylum | Class | Order | Family | Genus | 0.5%F0.5% 11%B | 0.5%F0.5% 10.5%B | 0.25%F0. 25%&11%B | 16s rRNA V4 region sequence |
|---|---|---|---|---|---|---|---|---|---|---|
| ASV000T | Bacteria | Firmicutes | Clostridia | Clostridiales | Lachnospiraceae | | PR | PR | PR | GAGTTCTTCGTGTGATATC TAAGCATTCACCGCTA CACCACGAATTCCGCCT ACCTCAACTGTACTCAA GACTGCCAGTATCAATT GCAATTTTACGGTTGAG CCGCAAACTTTCACAAC TGACTTAACAACCCATC TACGCTCCCTTT (SEQ ID NO: 16) CCTGTTTGCTCCCCACG CTTTCGAGCCTCAGCGT CAGTTATCGTCCAGTAA GCCGCCTTCGCCACTGG TGTTCCTCCTAATATCT ACGCATTTCACCGCTAC ACTAGGAATTCCACTTA CCCCTCCGACAGTTCCAATG TACGACAGTTCCAATG CAGTACCGGGGTTGAG CCCCGGGCTTTCACATC AGACTTGCCGCACCGC CTGCGGCTCCCTTT (SEQ ID NO: 17) |
| ASV000V | Bacteria | Bacteroidetes | Bacteroidia | Bacteroidales | Tannerellaceae | Parabacteroides | PR | PR | PR | CCTGTTTGATCCCCACG CTTTCGTGCATCAGCGT CAGTCATGGCTTGGCA GGCTGCCTTCGCAATCG GGGTTCTGCGTGATATC TAAGCATTCACCGCTA CACCACGCATTCCGCCT GCCTCAAACATACTCAA GCCCCCCAGTTCAACG GCAATTCTATGGTTGAG CCACAGACTTTCACCGC |

FIG. 14 (cont.)

| ASV | Domain | Phylum | Class | Order | Family | Genus | 0.5%F0.5%/11%B | 0.5%F0.5%/10.5%B | 0.25%F0,25%&11%B | 16s rRNA V4 region sequence |
|---|---|---|---|---|---|---|---|---|---|---|
| | | | | | | | | | | TGACTTAAAAGGCCGC CTACGCACCCTT (SEQ ID NO: 18) |
| ASV0000W | Bacteria | Bacteroidetes | Bacteroidia | Bacteroidiales | Tannerellaceae | Parabacteroides | | | PR | CCTGTTTGATCCCCACG CTTTCGTGCATCAGCGT CAGTCATGGCTTGGCA GGCTGCCTTCGCGATC GGGGTTCTGCGTGATA TCTAAGCATTTCACCGC TACACCACGCATTCCGC CTGCCTCAAACATACTC AAGCCCCCAGTTTCAA CGGCAATTCTATGGTTG AGCCACAGACTTTCACC GCTGACTTAAAAGGCC GCCTACGCACCCTT (SEQ ID NO: 19) |
| ASV0010 | Bacteria | Proteobacteria | Gammaproteobacteria | Enterobacteriales | Enterobacteriaceae | Escherichia-Shigella | PR | PR | PR | CCTGTTTGCTCCCCACG CTTTCGCACCTGAGCGT CAGTCTTCGTCCAGGG GGCCGCCTTCGCCACC GGTATTCCTCCAGATCT CTACGCATTTCACCGCT ACACCTGGAATTCTACC CCCCTCTACGAGACTCA AGCTTGCCAGTATCAG ATGCAGTTCCCAGGTTG AGCCCGGGGGATTTCAC ATCTGACTTAACAAACC GCCTGCGTGCGCTTT (SEQ ID NO: 20) |
| ASV0014 | Bacteria | Firmicutes | Clostridia | Clostridiales | Ruminococcaceae | Faecalibacterium | PR | PR | PR | CCTGTTTGCTACCCACA CTTTCGAGCCTCAGCGT CAGTTGGTGCCCAGTA GGCCGCCTTCGCCACTG GTGTTCCTCCCGATATC |

FIG. 14 (cont.)

| ASV | Domain | Phylum | Class | Order | Family | Genus | 0.5%&0.5% 11%B | 0.5%&0.5% 10.5%B | 0.5%&0.5% 2.5%&1%B | 0.25%&FO. 2.5%&1%B | 16s rRNA V4 region sequence |
|---|---|---|---|---|---|---|---|---|---|---|---|
| | | | | | | | | | | | TACGGCATTCCACCGCTA CACGGGGAATTCCGCCT ACCTCTGCACTACTCAA GAAAAACAGTTTTGAA AGTCAGTTCATGGGTTG AGCCCATGGGATTTCACT TCCAACTTGTTCTCCCG CCTGCGCTCCCTTT (SEQ ID NO: 21) |
| ASV0016 | Bacteria | Bacteroidetes | Bacteroidia | Bacteroidales | Bacteroidaceae | Bacteroides | | PR | | PR | CCTGTTTGATACCCACA CTTTCGAGCATCAGCGT CAGTTACACTCCAGTGA GCTGCCTTCGCAATCGG AGTTCTTCGTGATATCT AAGCATTTCACCGCTAC ACCACGAATTCCGCCCA CCTCTACTGCCACTCAAG ACTGCCAGTATCAACTG CAATTTTACGGTTGAGC CGCAAACTTTCACAACT GACTTAACAATCCGCCT ACGGTCCCTT (SEQ ID NO: 22) |
| ASV0018 | Bacteria | Firmicutes | Clostridia | Clostridiales | Lachnospiraceae | Lachnoclostridium | PR | PR | | PR | CCTGTTTGCTCCCCACG CTTTCGAGCCTCAACGT CAGTTATCGTCCAGTAA GCCGCCTTCGCCAGTGG TGTTCCTCCTAATATCT ACGCATTTCACCGCTAC ACTAGGAATTCCACTTA CCTCTCCGACACTCTAG CAAAACAGTTTCCAAA GCAGTCCCAGGGTTGA GCCCTGGGTTTTCACTT CAGACTTGCTTCGCCGT CTACGGTCCCTTT |

FIG. 14 (cont.)

| ASV | Domain | Phylum | Class | Order | Family | Genus | 0.5%F0.5% 11%B | 0.5%F0.5% 10.5%B | 0.25%F0. 25%&1%B | 16s rRNA V4 region sequence |
|---|---|---|---|---|---|---|---|---|---|---|
| ASV0019 | Bacteria | Bacteroidetes | Bacteroidia | Bacteroidales | Bacteroidaceae | Bacteroides | | PR | PR | (SEQ ID NO: 23) CCTGTTTGATACCCACA CTTTCGAGCATCAGTGT CAGTGACAGTCTAGTG AGCTGCCTTCGCAATCG GAGTTCTTCGTGATATC TAAGCATTTCACGCTA CACCACGAATTCCGCCC ACCTCTACTGTACTCAA GACTCCCAGTTTCAACT GCAATTTTACGGTTGAG CCGCAAACTTTCACAAC TGACTTAACAATCCACC TACGCTCCCTTT (SEQ ID NO: 24) |
| ASV001A | Bacteria | Firmicutes | Clostridia | Clostridiales | Lachnospiraceae | Blautia | PR | PR | PR | CCTGTTTGCTCCCCACG CTTTCGAGCCTCAACGT CAGTTACCGTCCAGTAA GCCGCCTTCGCCACTGG TGTTCCTCCTAATATCT ACGCATTTCACGCTAC ACTAGGAATTCCGCTTA CCCCTCCGGCACTCAAG CACAGCAGTTTCCAATG CAGTCCAGGGGTTAAG CCCCTGCCTTTCACATC AGACTTGCTGCGCGTC TACGCTCCCTTT (SEQ ID NO: 25) |
| ASV001D | Bacteria | Actinobacteria | Actinobacteria | Bifidobacteriales | Bifidobacteriaceae | Bifidobacterium | | PR | | CCTGTTCGCTCCCCACG CTTTCGCTCCTCAGCGT CAGTRACGGCCCAGAG ACCTGCCTTCGCCATTG GTGTTCTTCCCGATATC TACACATTCCACCGTTA CACCGGGAATTCCAGT |

FIG. 14 (cont.)

| ASV | Domain | Phylum | Class | Order | Family | Genus | 0.5%F0.5% 11%B | 0.5%F0.5% 10.5%B | 0.25%F0. 25%11%B | 16s rRNA V4 region sequence |
|---|---|---|---|---|---|---|---|---|---|---|
| | | | | | | | | | | CTCCCCTACCGCACTCA AGCCCGCCCGTACCCG GCGCGGGATCCACCGTT AAGCGATGGACTTTCA CACCGGACGCGACGAA CGGCCTACGAGCCCTTT (SEQ ID NO: 26) |
| ASV001E | Bacteria | Firmicutes | Clostridia | Clostridiales | Ruminococcaceae | Faecalibacterium | | PR | | CCTGTTTGCTACCCACA CTTTCGAGCCCTCAGCGT CAGTTGGTGCCCAGTA GGGCCGCCTTCGCCACTG GTGTTCCTCCCGGATATC TACGCATTCCACCGCTA CACCGGGAATTCCGCCT ACCTCTGCACTACTCAA GAAAAACAGTTTTGAA AGCCAGTTTATGGGTTG AGCCCCATAGATTTCACT TCCAACTTGTCTTCCCG CCTGCGTCCCTTT (SEQ ID NO: 27) |
| ASV0011 | Bacteria | Firmicutes | Negativicutes | Selenomonadales | Veillonellaceae | Megasphaera;Ambigu ous_taxa | PR | PR | PR | CCCGTTCGCTCCCCTGA CTTTCGTCGCCTCAGCGT CAGTTGTCGTCCAGAA AGCCGCTTTCGCCACTG GTATTCCTCCTAAATATC TACGCATTTCACCGCTA CACTAGGAATTCCTGCTT TCCTCTCCGATACTTCCA GTCTCCCAGTTTCCGTC CCCTTCACGGGGGTTAAG CCCCGCCACTTTTAAGGAC AGACTTAAGAGACCGC CTGCGCACCCTTTA (SEQ ID NO: 28) |

FIG. 14 (cont.)

| ASV | Domain | Phylum | Class | Order | Family | Genus | 0.5%&0.5% 11%B | 0.5%&0.5% 10.5%B | 0.25%&0. 25%&11%B | 16s rRNA V4 region sequence |
|---|---|---|---|---|---|---|---|---|---|---|
| ASV001J | Bacteria | Bacteroidetes | Bacteroidia | Bacteroidales | Tannerellaceae | Parabacteroides | | PR | | CCTGTTTGATCCCACG CTTTCGTGCTTCAGTGT CAGTTATAGTTTAGTAA GCTGCCTTCGCAATCGG AGTTCTGCGTGATATCT ATGCATTCACCGCTAC ACCACGCATTCCGCCTA CCTCAAATATACTCAAG CTAACCAGTTTCAACGG CAATTTATGGTTAAGC CACAAACTTTCACCGCT GACTTAATAAGCCACCT ACGCACCCTT (SEQ ID NO: 29) |
| ASV001M | Bacteria | Bacteroidetes | Bacteroidia | Bacteroidales | Bacteroidaceae | Bacteroides | | PR | PR | CCTGTTTGATACCCACA CTTTCGAGCATCAGCGT CAGTTACAGTCCAGTAA GCTGCCTTCGCAATCGG AGTTCTTCGTGATATCT AAGCATTTCACCGCTAC ACCACGAATTCCGCCTA CCTCTACTGCACTCAAG ACGACCAGTATCAACT GCAATTTTACGGTTGAG CCGCAAACTTTCACAGC TGACTTAATAGTCCGCC TACGCTCCCTT (SEQ ID NO: 30) |
| ASV001R | Bacteria | Firmicutes | Clostridia | Clostridiales | Lachnospiraceae | Fusicatenibacter | PR | PR | | CCTGTTTGCTCCCACG CTTTCGAGCCTCAACGT CAGTTACCGTCCAGTAA GCCGCCTTCGCCACTGG TGTTCTTCCTAATATCTA CGCATTCACCGCTACA CTAGGAATTCCGCCTAC CTCTCCGGCACTCGAGC |

FIG. 14 (cont.)

| ASV | Domain | Phylum | Class | Order | Family | Genus | 0.5%&0.5% 1%B | 0.5%&0.5% &0.5%B | 0.25%&0.25% 25%&1%B | 16s rRNA V4 region sequence |
|---|---|---|---|---|---|---|---|---|---|---|
| | | | | | | | | | | CAGACAGTTTCCAATGC AGTCCCAGGGTTAAGC CCTGGGTTTCCACATCA GACTTGCCTTGCCGTCT ACGCTCCCTT (SEQ ID NO: 31) |
| ASV001Y | Bacteria | Firmicutes | Clostridia | Clostridiales | Lachnospiraceae | Coprococcus 2 | | | PR | CCTGTTTGCTCCCCACG CTTTCGTTGCCTCAGTGT CAGTAGCAGTCCAGTA AGTCGCCTTCGCCACTG GTGTTCCTCCTAATATC TACGCATTTCACCGCTA CACTAGGAATTCCACTT ACCCTCCCTGTACTCTA GTCAGGCAGTTTCCAA AGCAGTTCCGGGGTTA AGCCCGGATTTTCACT TCAGACTTGTCTCACCA CCTACGCACCCTTT (SEQ ID NO: 32) |
| ASV002A | Bacteria | Bacteroidetes | Bacteroidia | Bacteroidales | Bacteroidaceae | Bacteroides | | | PR | CCTGTTTGATACCACA CTTTCGAGCATCAGTGT CAGTAACAGTCTAGTG AGTCTGCCTTCGCAATCG GAGTTCTTCGTGATATC TAAGCATTTCACCGCTA CACCACGAATTCCGCCC ACCCTCTACTGTACTCAA GACTGCCAGTTTCAACT GCAATTTTACGGTTGAG CCGCAAACTTTCACAAC TGACTTAACAATCCACC TACGCTCCCTTT (SEQ ID NO: 33) |
| ASV002B | Bacteria | Firmicutes | Clostridia | Clostridiales | Lachnospiraceae | | | | PR | CCTGTTTGCTCCCCACG CTTTCGAGCCTCAACGT |

FIG. 14 (cont.)

| ASV | Domain | Phylum | Class | Order | Family | Genus | 0.5%F0.5% 12%B | 0.5%F0.5% 10.5%B | 0.25%F0. 25%11%B | 16s rRNA V4 region sequence |
|---|---|---|---|---|---|---|---|---|---|---|
| | | | | | | | | | | CAGTTACAGTCCAGTAA GCCGGCCTTCGCCACTGG TGTTCCTCCTAATATCT ACGCATTTCACCGCTAC ACTAGGAATTCCCACTTA CCTCTCTGCACTCTAG CTTGACAGTTTCCAAAG CAGTCCCAGGGTTGAG CCCTGGGTTTTCACTTC AGACTTGCCATGCCGTC TACGCTCCCTT (SEQ ID NO: 34) |
| ASV002G | Bacteria | Firmicutes | Clostridia | Clostridiales | Ruminococcaceae | Intestinimonas | | | PR | CCTGTTTGCTCCCCACG CTTTCGCGCCTCAGCGT CAGTTATCGTCCAGCAA TCCGCCTTCGCCACTGG TGTTCCTCCTATATCT ACGCATTTCACCGCTAC ACACGGAATTCCGATT GCCTCTCCGACACTCAA GAACTACAGTTTCAAAT GCAGGCTATGGGTTGA GCCCATAGTTTTCACAT CTGACTTGCAGTCCCGC CTACACGCCCTT (SEQ ID NO: 35) |
| ASV002N | Bacteria | Firmicutes | Clostridia | Clostridiales | Ruminococcaceae | UBA1819 | | PR | | CCTGTTTGCTCACCCATG CTTTCGGAGCCTCAGCGT CAGTTAGTGCCCAGTA GGCCGCCTTCGCCACTG GTGTTCCTCCGATATC TAGCATTCCACCGCTA CACCGGGAATTCCGCCT TACCGGGGAATTCCGCCT ACCTGTACACCACTCAA GACTGACAGTTTTGAA AGCAATTTATGGGTTG |

FIG. 14 (cont.)

| ASV | Domain | Phylum | Class | Order | Family | Genus | 0.5%F0.5% 1 1%B | 0.5%F0.5% 10.5%B | 0.25%F0. 25%&1%B | 16s rRNA V4 region sequence |
|---|---|---|---|---|---|---|---|---|---|---|
| | | | | | | | | | | AGCCCATAGATTTCACT CCCAACTTGCCAATCCG CCTGCGCTCCCTTT (SEQ ID NO: 36) |
| ASV0025 | Bacteria | Bacteroidetes | Bacteroidia | Bacteroidales | Prevotellaceae | Paraprevotella;Ambiguous_taxa | | PR | | CCTGTTTGATACCCGCA CTTTCGAGCCTCAGCGT CAGTGCTGCCCCGGCA CAATGCCTTCGCGATCG GAGTTCTTCGTGATATC TAAGCATTTCACCGGCTA CACCACGAATTCCATGT GCCCTGTGCAGACTCA AGGCTTACAGTTTCAAC GGGCTGGCCACGGTTGA GCCGTGGCATTTGACC GCTGACTTAAAAGCCC GCCTACGGCTCCCTTTA (SEQ ID NO: 37) |
| ASV0036 | Bacteria | Bacteroidetes | Bacteroidia | Bacteroidales | Marinifilaceae | Butyricimonas | | | PR | CCTGTTCGCTACCCACG CTTCGCGCATCAGCGT CAGATCGAGCCTGGGA AGCTGCCTTCGCTATCG GGGTTCCAAGTGATAT CTAAGCATTTCACCGCT ACTTCACTTGTTCGCGC TCCTTCGTCTCGTCTCC AGGTCGCCAGTTTCAAC GGCGTGCTACAGTTTA GCTGCAGTCTTTTACCG CTGACTTGGCGTCCCGC CTACGCGCCCTTTA (SEQ ID NO: 37) |
| ASV003C | Bacteria | Firmicutes | Clostridia | Clostridiales | Ruminococcaceae | Ruminiclostridium 5 | | PR | PR | CCTGTTTGCTACCCACA CTTTCGTGCCTCAGCGT CAGTTAAAGCCCAGTA GGCCGCCTTCGCCACTG (SEQ ID NO: 38) |

FIG. 14 (cont.)

| ASV | Domain | Phylum | Class | Order | Family | Genus | 0.5%F0.5%11%B | 0.5%F0.5%10.5%B | 0.25%F0.25%11%B | 16s rRNA V4 region sequence |
|---|---|---|---|---|---|---|---|---|---|---|
| | | | | | | | | | | GTGTTCCTCCCGATCTC TAGGCATTTCACCGCTA CACGGGAATTCCGCCT ACCTCTACTTCACTCAA GACTAACAGTTTCAAAA GCAGTTCATGGGTTAA GCCCATGGATTTCACTT CTGACTTGCCAATCCGC CTACGCACCCTT (SEQ ID NO: 39) |
| ASV003K | Bacteria | Firmicutes | Clostridia | Clostridiales | Lachnospiraceae | Lachnoclostridium | PR | PR | PR | CCTGTTTGCTCCCCACG CTTTCGAGCCTCAACGT CAGTTATCGTCCAGTAA GTCGCCTTCGCCACTGG TGTTCCTCCTAATATCT ACGCATTTCACCGCTAC ACTAGGAATTCCACTTA CCTCTCCGACACTCCAG TTAAACAGTTTCCAAAG CAGTCCCGCAGTTGAG CCGCGGGCTTTCACTTC AGACTTGCTTTACCGTC TACGCTCCCTT (SEQ ID NO: 40) |
| ASV003L | Bacteria | Firmicutes | Clostridia | Clostridiales | Lachnospiraceae | Lachnospiraceae UCG-004;Ambiguous_taxa | | | PR | CCTGTTTGCTCCCCACG CTTTCGAGCCTCAACGT CAGTTACTGTCCAGTAA GCCGCCTTCGCCACTGG TGTTCTTCCTAATATCTA CGGCATTTCACCGCTACA CTAGGAATTCCGCTTAC CTCTCCAGCACTCTAGC AACACAGTTTCCAAAGC AGTTCCCAGGTTGAGC CCGGGTATTTCACTTCA |

FIG. 14 (cont.)

| ASV | Domain | Phylum | Class | Order | Family | Genus | 0.5%F0.5% 11%B | 0.5%F0.5% 10.5%B | 0.25%F0. 25%&1%B | 16s rRNA V4 region sequence |
|---|---|---|---|---|---|---|---|---|---|---|
|  |  |  |  |  |  |  |  |  |  | GACTTGCGTGCGCGTCT ACGCTCCTTT (SEQ ID NO: 41) |
| ASV003P | Bacteria | Firmicutes | Clostridia | Clostridiales | Lachnospiraceae | uncultured |  |  | PR | CCTGTTTGCTCCCCACG CTTTCGGAGCCTCAACGT CAGTTACTGTCCAGTAA GCCGCCTTCGCCACTGG TGTTCCTCCTAATATCT ACGCATTTCACCGCTAC ACTAGGAATTCCGCTTA CCTCTCCAGCACTCCAG TCAAACAGTTTCAAAAG CAGTCCCGGGGTTGAG CCCCAGCCTTTCACTTC TGACTTGCTTGACCGTC TACGCTCCCTTT (SEQ ID NO: 42) |
| ASV003U | Bacteria | Firmicutes | Clostridia | Clostridiales | Lachnospiraceae | [Eubacterium] hallii group |  |  | PR | CCTGTTTGCTCCCCACG CTTTCGTACCTCAGTGT CAGTAACAGTCCAGCA GGCCGCCTTCGCCACTG GTGTTCCTTCCTAATATC TACGCATTTCACCGCTA CACTAGGAATTCCGCCT GCCTCTCCTGTACTCTA GCCGAGCAGTTTCAAA TGCAGTCCGGGGGTTG AGCCCCGGGCCTTTCACA TCTGACTTGCACTGCCA CCTACGCACCCTTT |
| ASV003X | Bacteria | Bacteroidetes | Bacteroidia | Bacteroidales | Bacteroidaceae | Bacteroides |  |  | PR | CCTGTTTGATACCCACA CTTTCGAGCCTCAGTGT CAGTAACAGTCCAGTG AGCTGCCTTCGCAATCG GAGTTCTTCGTGATATC (SEQ ID NO: 43) |

FIG. 14 (cont.)

| ASV | Domain | Phylum | Class | Order | Family | Genus | 0.5%FO.5% 11%B | 0.5%FO.5% 10.5%B | 0.25%FO. 25%11%B | 16s rRNA V4 region sequence |
|---|---|---|---|---|---|---|---|---|---|---|
| | | | | | | | | | | TAAGCATTTCACCGCTA CACCACGAATTCCGCCC ACCTCTACTGTACTCAA GACACACAGTATCAACT GCAATTTTACGGTTGAG CCGCAAACTTTCACAAC TGACTTACATGTCCACC TACGCTCCCTTT (SEQ ID NO: 44) |
| ASV004C | Bacteria | Firmicutes | Clostridia | Clostridiales | Lachnospiraceae | Dorea | | PR | | CCTGTTTGCTCCCCACG CTTTCGAGCCTCAACGT CAGTCATCGTCCAGCAA GCCCGCCTTCGCCACTSG TGTTCCTCCTAAATATCT ACGCATTTCACCGCTAC ACTAGGAATTCCACTTG CCTCTCGAACACTCTAG CTCTACAGTTCCAAATG CAGTCCCGGGGTTGAG CCCGGGCTTTCGACATC TGGCTTGCAATGCCGTC TACGCTCCCTTT (SEQ ID NO: 45) |
| ASV004D | Bacteria | Firmicutes | Clostridia | Clostridiales | Lachnospiraceae | uncultured | | | PR | CCTGTTTGCTCCCCACG CTTTCGTGCCTCAGCGT CAGTTTCAGTCCAGAAA GSCCSCCTTCGCCACTSG TGTTCTTCGCCAATATCT ACGCATTTCACCGCTAC ACTGGGAATTCCGGCTT CCTCTCCTGTACTCTAG CTCAACAGTTTAAAATG CAATCCCGTGGTTAAGC CACGGGCTTTCACATCT TACTTGTCATGCCGCCT ACTCACCCTTT |

FIG. 14 (cont.)

| ASV | Domain | Phylum | Class | Order | Family | Genus | 0.5%F0.5% 11%B | 0.5%F0.5% 10.5%B | 0.5%F0.5% 11%B | 0.25%F0. 25%&11%B | 16s rRNA V4 region sequence |
|---|---|---|---|---|---|---|---|---|---|---|---|
| ASV004W | Bacteria | Actinobacteria | Coriobacteriia | Coriobacteriales | Coriobacteriaceae | Collinsella | PR | | | | (SEQ ID NO: 46) CCTGTTCGCTCCCCAG CTTTCGCGCCTCAGCGT CGGTCTCGGCCCAGAG GGCCGCCTTCGCCACC GGTGTTCCACCGATAT CTGCGCATTCCACCGCT ACACGGGTGTTCCACC CTCCCTACCGGACCCA AGCCGCGGAGGTTCCG GGGGCTTCGGGGGGTT GAGCCCCCCGCTTCGAC CCCGGCGTGCCGGGC CGCCTACGCGCGCTTT |
| ASV005D | Bacteria | Firmicutes | Clostridia | Clostridiales | Lachnospiraceae | [Eubacterium] ventriosum group | | | | PR | (SEQ ID NO: 47) CCTGTTTGCTCCCCACG CTTTCGAGCCTCAGCGT CAGTAATCGTCCAGTAA GCCGCTTCGCCACCG GTGTTCCTCCTAATATC TACGCATTTCACCGCTA CACTAGGAATTCCGCTT ACCCTCCGACACTCTA GCCTGACAGTTTCAAAA GCAATTCCGGGGTTGA GCCCCAGGCTTTCACTT CTGACTTGCCATGCCGC CTACGCTCCCTTT |
| ASV005H | Bacteria | Firmicutes | Clostridia | Clostridiales | Lachnospiraceae | Blautia | PR | | | | (SEQ ID NO: 48) CCTGTTTGCTCCCCACG CTTTCGAGCCTCAACGT CAGTTACCGTCCAGTAA GCCGCCTTCGCCACTGG TGTTCCTCCTAATATCT ACGCATTTCACCGCTAC ACTAGGAATTCCGCTTA |

FIG. 14 (cont.)

| ASV | Domain | Phylum | Class | Order | Family | Genus | 0.5%F0.5% 11%B | 0.5%F0.5% 10.5%B | 0.25%F0. 25%11%B | 16s rRNA V4 region sequence |
|---|---|---|---|---|---|---|---|---|---|---|
| | | | | | | | | | | CCCCTCCGGCACTCAAG CTCAACAGTTTCCAATG CAGTCCAGGGGTTAAG CCCCTGCCTTTCACATC AGACTTGCTGCGCGGTC TACGCTCCCTT (SEQ ID NO: 49) |
| ASV0059 | Bacteria | Firmicutes | Clostridia | Clostridiales | Lachnospiraceae | [Ruminococcus] torques group | | PR | | CCTGTTTGCTCCCCACG CTTTCGAGCCCTCAACGT CAGTCATCGTCCAGTAA GCCGGCCTTCGCCACTGG TGTTCCTCCTAATATCT ACGCATTTCACCGCTAC ACTAGGAATTCCGCTTA CCTCTCCGACACTCTAG AAAAACAGTTTCCAATG CAGTCCCGGGGTTGAG CCCGGGTTTCACATC AGACTTGCCTCTCCGTC TACGCTCCCTT (SEQ ID NO: 50) |
| ASV0060 | Bacteria | Firmicutes | Clostridia | Clostridiales | Ruminococcaceae | Butyricicoccus | | | PR | CCTGTTTGCTCCCCACG CTTTCGCGCCTCAGCGT CAGTTAATGTCCAGCA GGCCGCCTTCGCCACTG GTGTTCCTCCGTATATC TACGCATTTCACCGCTA CACACGGAATTCCGCCT GCCTCTCCATCACTCAA GACCAGCAGTTTTGAA AGCAGTTTATGGGTTA AGCCCATAGATTTCACT TCCAACTTACCGGCCCG CCTGCGCGCCCTT (SEQ ID NO: 51) |

FIG. 14 (cont.)

| ASV | Domain | Phylum | Class | Order | Family | Genus | 0.5%F0.5% 11%B | 0.5%F0.5% 10.5%B | 0.25%F0. 2.5%&1%B | 16s rRNA V4 region sequence |
|---|---|---|---|---|---|---|---|---|---|---|
| ASV0067 | Bacteria | Firmicutes | Clostridia | Clostridiales | Ruminococcaceae | Butyricicoccus | | PR | PR | CCTGTTTGCTCCCCACG CTTTCGCGCCTCAGCGT CAGTTAATGTCCAGCA GGCCGCCTTCGCCACTG GTGTTCCTCCGTATATC TACGCATTTCACCGCTA CACACGGAATTCCGCCT GCCTCTCCATCACTCAA GACCAGCAGTTTTGAA AGCAGTTTATGGGTTA AGCCCATAGATTTCACT TCCAACTTGCCGGCCCG CCTGCGCGCCTTT (SEQ ID NO: 52) |
| ASV0077 | Bacteria | Firmicutes | Clostridia | Clostridiales | Lachnospiraceae | [Eubacterium] fissicatena group | PR | PR | PR | CCTGTTTGCTCCCCACG CTTTCGGAGCCTCAACGT CAGTCATCGTCCAGTAA GCCGGCCTTCGCCACTGG TGTTCCTCCTAAATATCT ACGCATTTCACCGCTAC ACTAGGAATTCCACTTA CCTTCGACACTCTAG TTACATAGTTTCCAATG CAGTCCCGGGGTTGAG CCCGGGTTTTCACATC AGACTTACATAAGCGTC TACGCTCCTTT (SEQ ID NO: 53) |
| ASV0092 | Bacteria | Actinobacteria | Coriobacteriia | Coriobacteriales | Eggerthellaceae | Eggerthella | | PR | PR | CCTGTTCGCTCCCCTAG CTTTCGCGCCTCAGCGT CAGTTGCGGCCCAGCA GGCTGCCTTCGCCATCG GTGTTCTTCCCGATATC TGCGCATTTCACCGCTA CACCGGGAATTCCGCCT GCCTCTACCGAACTCGA |

FIG. 14 (cont.)

| ASV | Domain | Phylum | Class | Order | Family | Genus | 0.5%F0.5% 11%B | 0.5%F0.5% 10.5%B | 0.5%F0.5% 25%i1%B | 0.25%F0. 25%i1%B | 16s rRNA V4 region sequence |
|---|---|---|---|---|---|---|---|---|---|---|---|
| | | | | | | | | | | | GCCTCCCAGTTCGGGAT CCGGCCGGGGGTTGAG CCCTCGGATTAGAGATC CCGCTTGAGAGGGCCGC CTACGCGCTCTTTA (SEQ ID NO: 54) |
| ASV00EE | Bacteria | Firmicutes | Clostridia | Clostridiales | Ruminococcaceae | Ruminococcaceae UCG-005 | | | | PR | CCTGTTTGCGCCTCCACG CTTTCGCGCCTCAGCGT CAGTTGTCGTCAGCA GGCCGCCTTCGCCACTG GTGTTCCTCCTAATATC TACGCATTTCACCGCTA CACTAGGAATTCCGCCT GCCTCTCCGATACTCAA GGGATACAGTTTCAAA AGCAGTTTGGGGGTTG AGCCCCCAGATTTCACT CCTGACTTGCATCTCCG CCTACACGCCCTTT (SEQ ID NO: 55) |
| ASVOQHY | Bacteria | Firmicutes | Clostridia | Clostridiales | Clostridiales vadinBB60 group | uncultured bacterium | | | | PR | CCTGTTTGCTCCCCACG CTTTCGAGCCTCAGTGT CAGTTACAGTCCAGTAA GCCGCCTTCGCCTCTGG TGTTCTTCCTAATATCTA CGGCATTTCACCGCTACA CTAGGAATTCCGCTTAC CTCTCCTGCACTCAAGC TTAACAGTTTTATATGC AGTTCCGCCAGTTAAGCC ACGGGCTTTCACATATA ACTTATTATGCCACCTA CACTCCCTTT (SEQ ID NO: 56) |
| ASV01F9 | Bacteria | Proteobacteria | Gammaproteobacteria | Enterobacteriales | Enterobacteriaceae | | | | | PR | CCTGTTTGCTCCCCACG CTTTCGCACCTGAGCGT |

FIG. 14 (cont.)

| ASV | Domain | Phylum | Class | Order | Family | Genus | 0.5%F0.5% 11%B | 0.5%F0.5% 10.5%B | 0.5% 10.5%B | 0.25%F0. 25%11%B | 16s rRNA V4 region sequence |
|---|---|---|---|---|---|---|---|---|---|---|---|
| | | | | | | | | | | | CAGTCTTTGTCCCAGGG GGCCGCCTTCGCCACC GGTATTCCTCCAGATCT CTACGCATTTCACCGCT ACACCTGGAATTCTACC CCCCTCTACAAGACTCT AGCCTGCCAGTTTCGAA TGCAGTTCCCAGGTTGA GCCCGGGGATTTCACA TCCGACTTGACAGACC GCCTGCGGTGCGCTTT (SEQ ID NO: 57) |
| ASVO1SZ | Bacteria | Firmicutes | Clostridia | Clostridiales | Ruminococcaceae | Ruminococcus 2 | | PR | | | CCTGTTTGCTACCCACG CTTTCGTGCCTCAGCGT CAGTTAAAGCCCAGCA GGCCGCCTTCGCCACTG GTGTTCCTCCCATCTC TACGCATTTCACCGCTA CACGGGGAATTCCGCC TGCCTCTACTTCACTCA AGTCTGCAGTTTCAAA TGCAGGCTATGGGTTG AGCCCATAGATTTCACA TCTGACTTGCAAAGCCG CCTACGCACCCTTT (SEQ ID NO: 58) |
| ASVO2Y1 | Bacteria | Firmicutes | Clostridia | Clostridiales | Lachnospiraceae | [Ruminococcus] torques group | PR | PR | | PR | CCTGTTTGCTCCCCACG CTTTCGAGCCTCAACGT CAGTTACTGTCCAGTAA GCCGCCTTCGCCACTGG TGTTCCTCCTAATATCT AGGCATTTCACCGCTAC ACTAGGAATTCCACTTA CCTCTCCAGCACTCTAG ATGAACAGTTTCCAATG CAGTCCCGGGGGTTGAG |

FIG. 14 (cont.)

| ASV | Domain | Phylum | Class | Order | Family | Genus | 0.5%F0.5% 11%B | 0.5%F0.5% 10.5%B | 0.5%F0.5% 10.5%B | 0.25%F0. 25%11%B | 16s rRNA V4 region sequence |
|---|---|---|---|---|---|---|---|---|---|---|---|
| | | | | | | | | | | | CCCCGGGTTTTCACATC AGACTTGCCCATCCGTC TACGCTCCCTTT (SEQ ID NO: 59) |
| ASV0313 | Bacteria | Firmicutes | Clostridia | Clostridiales | Clostridiaceae 1 | Clostridium sensu stricto 1 | | | | PR | CCTGTTTGCTCCCCACG CTTTCGGAGCCTCAGCGT CAGTTACAGTCCAGAG AAGGCCTTCGCCACTG GTGTTCTTCCTAATCTC TACGCATTTCACCGCTA CACTAGGAATTCCCTTC TCCTCTCTGCACTCTA GACTTCCAGTTTGAAAT GCAGCACTCAGGTTAA GCCCGAGTATTTCACAT CTGACTTAAAAATCCGC CTACGCTCCCTTT (SEQ ID NO: 60) |
| ASV04N8 | Bacteria | Firmicutes | Erysipelotrichia | Erysipelotrichales | Erysipelotrichaceae | [Clostridium] innocuum group | PR | | | | CCTATTTGCTCCCCACG CTTTCGTCGCCTCAGTGT CAGTTACAGACCAGGC GACCGCCTTCGCCACTG GTGTTCCTCCATATATC TACGCATTTTACCGCTA CACATGGAATTCCATCG CCCTCTTCTGCACTCTA GCATACCAGTTTCCATA GCTTACAATGGTTGAG CCATTGCCTTTACTAC AGACTTAGTACGCCACC TACGCACCCTTTA (SEQ ID NO: 60) |
| ASV05BZ | Bacteria | Firmicutes | Clostridia | Clostridiales | Lachnospiraceae | [Ruminococcus] torques group | | | | PR | CCTGTTTGCTCCCCACG CTTTCGGAGCCTCAACGT CAGTTACTGTCCAGTAA GCCGCCTTCGCCACTGG (SEQ ID NO: 61) |

FIG. 14 (cont.)

| ASV | Domain | Phylum | Class | Order | Family | Genus | 0.5%FO.5% 11%B | 0.5%FO.5% 10.5%B | 0.25%FO. 25%11%B | 16s rRNA V4 region sequence |
|---|---|---|---|---|---|---|---|---|---|---|
| | | | | | | | | | | TGTTCCTCCTAATATCT ACGGCATTTCACCGCTAC ACTAGGAATTCCACTTA CCTCTCCAGCACTCTAG ATGAACAGTTTCCAATG CAGTCCCGGGGTTGAG CCCCGGGTTTTCACATC AGACTTGCCATCCGTCT ACGCTCCCTAC (SEQ ID NO: 62) |
| ASV07lF | Bacteria | Firmicutes | Clostridia | Clostridiales | Clostridiaceae 1 | Clostridium sensu stricto 1 | PR | PR | PR | CCTGTTTGCTCCCCACG CTTCCGAGCCTCAGTGT CAGTTACAGTCCAGAA AGGCGCCTTCGCCACT GGTATTCCTCCTAATCT CTACGCATTTCACCGCT ACACTAGGAATTCCCT TTCCTCTCCTGCACTCTA GATATCCAGTTTGGAAT GCAGTACCCAGGGTTAA GCCCGGGGTATTTCACAT CCCACTTAAATATCCAC CTACGCTCCCTT (SEQ ID NO: 63) |
| ASV0001 | Bacteria | Firmicutes | Clostridia | Clostridiales | Ruminococcaceae | Ruminococcaceae UCG-002 | NR | NR | NR | CCTGTTTGCTCCCCACG CTTTCCGCGCCTCACCGT CAGTTGTCGTCCAGCAA TCCGACCTTCGCCACTGG TGTTCCTCCTAATATCT ACGCATTTCACCGCTAC ACTAGGAATTCCGATTG CCTCTCCGATACTCAAG AAGAGTTAGTTCAAAT GCAGTTCACGAGTTGA GCCCGTGGGATTTCACAT |

FIG. 14 (cont.)

| ASV | Domain | Phylum | Class | Order | Family | Genus | 0.5%F0.5% 11%B | 0.5%F0.5% 10.5%B | 0.25%F0. 25%&11%B | 16s rRNA V4 region sequence |
|---|---|---|---|---|---|---|---|---|---|---|
| | | | | | | | | | | CTGACTTGCCCTCCCGG CTACACOCCCTTT (SEQ ID NO: 64) |
| ASV0006 | Bacteria | Firmicutes | Clostridia | Clostridiales | Christensenellaceae | Christensenellaceae R-7 group | | NR | | CCTGTTTGCTCCCCACG CTTTCGTGCGTCAGCGT CAGTTACAGTCCAGAA AGCCGCCTTCGCCACCG GTGTTCCTCCTAATATC TACGCATTTCACCGCTA CACTAGGAATTCCGCTT TCCTCTCCTGCACTCAA GTCCGACAGTATTGGA TTGCAGCCCCCAAGTTAA GCCCGGGTATTTCACAT CCAACTTACCAAAACCGC CTACGCACCCTTT (SEQ ID NO: 65) |
| ASV0007 | Bacteria | Verrucomicrobia | Verrucomicrobiae | Verrucomicrobiales | Akkermansiaceae | Akkermansia | NR | NR | | CCCTTTCGGTCCCCTGG CCTTCGTGCGTCAGCGT CAGTTAATGTCCAGGA ACCCGCCTTCGCCACGA GTGTTCCTCCTCGATATC TACGCATTTCACTGCTA CACCGAGAATTCCGGTT CCCCTCCATTACTCTA GTCTCGGCAGTATCATGT GCCGTCGCGGGGTTGA GCCGGCGCCTTTCACAC ACGACTTACGAAACAG CCTACGCACGCTTT (SEQ ID NO: 66) |
| ASV000A | Bacteria | Firmicutes | Clostridia | Clostridiales | Ruminococcaceae | Ruminococcaceae UCG-002 | NR | NR | NR | CCTGTTTGCTCCCCACA CTTTCGCACCTCACCGT CAGTTATCGTCCAGCAA TCCGCCCTTCGCCACTGG TGTTCCTCCTAATATCT |

FIG. 14 (cont.)

| ASV | Domain | Phylum | Class | Order | Family | Genus | 0.5%F0.5% 11%B | 0.5%F0.5% 10.5%B | 0.25%F0. 25%/1%B | 16s rRNA V4 region sequence |
|---|---|---|---|---|---|---|---|---|---|---|
| | | | | | | | | | | ACGGCATTTCACCGCTAC ACTAGGAATTCCGATTG CCCCTCCGACACTCAAG ATCTACAGTTTCAAATG CAGTTCATGGGTTGAG CCCATGGGATTTCACATC TGACTTGCAGACCGGG CTGCACGCCCTTT (SEQ ID NO: 67) |
| ASV000C | Bacteria | Firmicutes | Clostridia | Clostridiales | Ruminococcaceae | Ruminococcaceae UCG-002 | NR | NR | NR | CCTGTTGCTCCCCACA CTTTCGGCGCTCACCGT CAGTTGCTGTCCAGCAA TCCGCCTTCGCCACTGG TGTTCCTCCTAATATCT ACGCATTTCACCGCTAC ACTAGGAATTCCGATTG CCTCTCCAGTACTCAAG AAATACAGTTTCAAATG CAGTTCATGGGTTAAG CCCATGGATTTCACATC TGACTTGCATTCCCGGC TGCACGCCCTTT (SEQ ID NO: 68) |
| ASV000D | Bacteria | Bacteroidetes | Bacteroidia | Bacteroidales | Barnesiellaceae | Barnesiella | NR | NR | NR | CCTGTTCGATACCCACG CTTTCGTGCCTCAGCGT CGTGTCGCACCCTAGCAG GCTGCCTTCGCCAATCGG GGTTCTGCGTGATATCT ATGCATTTCACCGCTAC ACCACGCATTCCGCCTG CGTCTTGTGTCGACTCTAG CGTCGCCAGTTTCAACGG CACAGTCCGGGTTGAG CCCGGAAATTTCACCGC TGACTTGGCGTGCCGC CTACGCAGCCTTT |

FIG. 14 (cont.)

| ASV | Domain | Phylum | Class | Order | Family | Genus | 0.5%F0.5% 11%B | 0.5%F0.5% 10.5%B | 0.25%F0. 25%/1%B | 16s rRNA V4 region sequence |
|---|---|---|---|---|---|---|---|---|---|---|
| | | | | | | | | | | (SEQ ID NO: 69) |
| ASV000H | Bacteria | Firmicutes | Clostridia | Clostridiales | Lachnospiraceae | Blautia | NR | NR | NR | CCTGTTTGCTCCCCACG CTTTCGAGCCTCAACGT CAGTTACCGTCCAGTAA GCCGCCTTCGCCACTGG TGTTCCTCCTAATATCT ACGCATTTCACCGCTAC ACTAGGAATTCCGCTTA CCCCTCCGGCACTCAAG TATGACAGTTTCCAATG CAGTCCACAGGTTGAG CCCATGCCTTTCACATC AGACTTGCCACACCGTC TACGCTCCCTTT |
| | | | | | | | | | | (SEQ ID NO: 70) |
| ASV000U | Bacteria | Bacteroidetes | Bacteroidia | Bacteroidales | Bacteroidaceae | Bacteroides | NR | NR | | CCTGTTTGATACCCACA CTTTCGAGCATGAACGT CAGTTACGGCTTAGTGT GCTGCCTTCGCAATCGG AGTTCTTCGTGATATCT AAGCATTCACCGCTAC ACCACGAATTCCGCACA CCTCAACCGCACTCAAG GACGCCAGTATCAACT GCAATTTAAGGTTGA GCCCCAAACTTTCACAG CTGACTTAACGACCCGT CTCGCTCCCTTT |
| | | | | | | | | | | (SEQ ID NO: 71) |
| ASV000Z | Bacteria | Proteobacteria | Deltaproteobacteria | Desulfovibrionales | Desulfovibrionaceae | Bilophila | NR | NR | NR | CCTGTTTGCTACCCACG CTTTCGCACCTCAGCGT CAGTTACCGTCCAGGT GGCCGCCTTCGTCACC GGTGTTTCCTCCAGATAT CTACGGGATTTCACTCCT ACACCTGGAATTCCGCC |

FIG. 14 (cont.)

| ASV | Domain | Phylum | Class | Order | Family | Genus | 0.5%F0.5% 1%B | 0.5%F0.5% 10.5%B | 0.25%F0. 2.5%&1%B | 16s rRNA V4 region sequence |
|---|---|---|---|---|---|---|---|---|---|---|
| | | | | | | | | | | ACCCTCTCCGGTACTCA AGCCTGGCAGTATCAA AGGCAGTTCCACAGTT GGGCTGTGGGATTTCA CCCTGACTTACCAGGC CGCCTACGTACGCTTT (SEQ ID NO: 72) |
| ASV0012 | Bacteria | Firmicutes | Clostridia | Clostridiales | Lachnospiraceae | Eisenbergiella | NR | | | CCTGTTTGCTCCCCACG CTTTCGAGCCTCAACGT CAGTTACAGTCCAGTAA GCCGCCTTCGCCACTGG TGTTCCTCCTAATATCT ACGCATTTCACCGCTAC ACTAGGAATTCCGCTTA CCTCTCCTGCACTCCAG CCTGGCAGTTCCAAATG CAATCCCAAGGTTGAG CCCTGGGTTTTCACATC TGGCTTGCCATGCCGTC TACGCTCCCTT (SEQ ID NO: 73) |
| ASV001C | Bacteria | Firmicutes | Clostridia | Clostridiales | Ruminococcaceae | Oscillibacter | NR | NR | | CCTGTTTGCTCCCCACG CTTTCGCGCCTCACCGT CAGTTGCCGTCCAGTTA TCCGCCTTCGCCACTGG TGTTCCTCCTTATATCTA CGGCATTTCACCGCTACA CAAGGAATTCCGATAA CCTCTCCGGTACTCAAG ACCTACAGTTTCAAATG CAGTTGGAGGTTAAG CCTCCAGATTTCACATC TGACTTGCCGGCCCGG CTGCACGCCCTT (SEQ ID NO: 74) |

FIG. 14 (cont.)

| ASV | Domain | Phylum | Class | Order | Family | Genus | 0.5%FQ 0.5% 11%B | 0.5%FQ 0.5% 10.5%B | 0.25%FQ 2.5%&1%B | 16s rRNA V4 region sequence |
|---|---|---|---|---|---|---|---|---|---|---|
| ASV001H | Bacteria | Firmicutes | Clostridia | Clostridiales | Ruminococcaceae | Intestinimonas | | NR | | CCTGTTTGCTCCCCACG CTTTCGCGCCTCAGCGT CAGTTACTGTCCAGCAA TCCGACCTTCGCCACTGG TGTTCCTCCGTATATCT ACGGCATTTCACCGCTAC ACACGGAATTCCGATT GCCTCTCCAGCACTCAA GAACTACACAGTTCAAAT GCAGGCTATGAGTTGA GCTCATAGTTTCACAT CTGACTTGCAGTCCCGC CTACACGCCCTTT (SEQ ID NO: 75) |
| ASV001K | Bacteria | Firmicutes | Clostridia | Clostridiales | Lachnospiraceae | Tyzzerella 3 | NR | NR | NR | CCTGTTTGCTCCCCACG CTTTCGTGACTCAGCGT CAGTAACAGTCCAGTA AGCCGCCTTCGCCACCG GTGTTCCTCCTAAATATC TACGCATTTCACCGCTA CACTAGGAATTCCGCTT ACCTCTCCTGCACTCTA GTCATACAGTTTCTTAT GCAGCGCCAAGGTTAA GCCCTGACATTTCACAT ATGACTTGCATGACCGC CTACTCACCCTTT (SEQ ID NO: 76) |
| ASV001L | Bacteria | Firmicutes | Clostridia | Clostridiales | Lachnospiraceae | | | | NR | CCTGTTTGCTCCCCACG CTTTCGAGCCTCAACGT CAGTTACAGTCCAGTAA GCCGCCTTCGCCACTGG TGTTCCTCCTAATATCT ACGGCATTTCACCGCTAC ACTAGGAATTCCACTTA CCTCCTGCACTCCAG |

FIG. 14 (cont.)

| ASV | Domain | Phylum | Class | Order | Family | Genus | 0.5%FO.5% 11%B | 0.5%FO.5% 10.5%B | 0.25%FO. 25%11%B | 16s rRNA V4 region sequence |
|---|---|---|---|---|---|---|---|---|---|---|
|  |  |  |  |  |  |  |  |  |  | CCTGACAGTTTCCAAAG CAGTTCAGGGGTTGAG CCCCCGCATTTCACTTC AGAACTTGCCATGCCGTC TACGCTCCCTT (SEQ ID NO: 77) |
| ASV0015 | Bacteria | Firmicutes | Clostridia | Clostridiales | Ruminococcaceae | Flavonifractor |  |  | NR | CCTGTTTGCTCCCCACG CTTTCGCGCGCTCAGCGT CAGTTACTGTCCAGCAA TCCGCCTTCGCCACTGG TGTTCCTCCGTATATCT ACGGCATTTCACCGCTAC ACACGGAATTCCGATT GCCTCTCCAGCACTCAA GAACTACAGTTTCAAAT GCAGGCTGGAGGTTGA GCCCCCAGTTTCACAT CTGACTTGCAATCCCGC CTACACGCCCTTT (SEQ ID NO: 78) |
| ASV0022 | Bacteria | Proteobacteria | Deltaproteobacteria | Desulfovibrionales | Desulfovibrionaceae | Bilophila | NR | NR |  | CCTGTTTGCTACCCACG CTTTCGCACCTCAGCGT CAGTTACCGTCCAGGT GGCCGCCCTTCGCCACC GGTGTTCCTCCAGATAT CTACGGGATTTCACTCCT ACACCTGGAATTCCGCC ACCCTCTCCGGTACTCA AGGCCTGGCAGTATCAA AGGCAGTTCCACAGTT GGGCTGTGGGGATTTCA CCCCTGACTTACCCAAGC CGCCTACGCTGCGCTTT |
| ASV0024 | Bacteria | Firmicutes | Erysipelotrichia | Erysipelotrichales | Erysipelotrichaceae | Erysipelotrichaceae UCG-003 |  | NR |  | CCTATTTGCTCCCCACG CTTTCGGGACTGAGCCG |

FIG. 14 (cont.)

| ASV | Domain | Phylum | Class | Order | Family | Genus | 0.5%F0.5% 1%B | 0.5%F0.5% 0.5%B | 0.5%F0.5% 10.5%B | 0.25%F0. 25%&1%B | 16s rRNA V4 region sequence |
|---|---|---|---|---|---|---|---|---|---|---|---|
| | | | | | | | | | | | TCAGTTATGCGCCAGAT CGTCGCCTTCGCCACTG GTGTTCCTCCATATATC TACGCATTTCACCGCTA CACATGGAATTCCACG ATCCTCTCACACACTCT AGCTCTACGGTTTCCAT GGCTTACCGAAGTTAA GCTTCGATCTTTCACCA CAGACCCTTAGTGCCGC CTRGTCCCTCTTTA (SEQ ID NO: 80) |
| ASV0027 | Bacteria | Firmicutes | Clostridia | Clostridiales | Lachnospiraceae | Blautia | | | | NR | CCTGTTTGCTCCCCACG CTTTCGAGCCTCAACGT CAGTTACCGTCCAGTAA GCCGCCTTCGCCACTGG TGTTCCTCCTAATATCT ACGCATTTCACCGCTAC ACTAGGAATTCCGCTTA CCTCTCCGGCACTCAAG ACTAACAGTTTCCAATG CAGTCCAGGGGTTGAG CCCCGGCTTTCACATC AGACTTGCCAGTCCGTC TACGCTCCCTT (SEQ ID NO: 81) |
| ASV002F | Bacteria | Firmicutes | Clostridia | Clostridiales | Lachnospiraceae | Blautia | | | | NR | CCTGTTTGCTCCCCACG CTTTCGAGCCTCAACGT CAGTTACCGTCCAGTAA GCCGCCTTCGCCACTGG TGTTCCTCCTAATATCT ACGCATTTCACCGCTAC ACTAGGAATTCCGCTTA CCTCTCCGGCACTCAAG ACTAGGAATTCCGCTTA CCTCTCCGGCACTCAAG ACGGGCAGTTTCCAAT GCAGTCCCGGGGGTTGA |

FIG. 14 (cont.)

| ASV | Domain | Phylum | Class | Order | Family | Genus | 0.5%F0.5% 11%B | 0.5%F0.5% 10.5%B | 0.25%F0. 25%&1%B | 16s rRNA V4 region sequence |
|---|---|---|---|---|---|---|---|---|---|---|
| | | | | | | | | | | GCCCAGCCTTTCACAT CAGACTTGTCCATCCGT CTACGCTCCCTTT (SEQ ID NO: 82) |
| ASV002P | Bacteria | Proteobacteria | Gammaproteobacteria | Betaproteobacte riales | Burkholderiaceae | Oxalobacter | NR | NR | NR | CCTGTTTGCTCCCACG CTTTCGTGCATGAGCGT CAGTGTTATCCCAGGG GGCTGCCTTCGCCATCG GTATTCCTCCACATATC TACGCATTTCACTGCTA CACGTGGAATTCTACCC CCCTCTGACACACTCTA GCCGTGCAGTCACAAA TGTCAATTCCCAGGTTAA GCCCGGGCATTTCACAT CTGTCTTACACAACCGC CTGCGCACGCTTT (SEQ ID NO: 83) |
| ASV002Q | Bacteria | Firmicutes | Clostridia | Clostridiales | Ruminococcaceae | Ruminococcus 1 | NR | NR | NR | CCTGTTTGCTCCCACG CTTTCGAGCCTCAGCGT CAGTAAAGCCCAGTA AGCCGCCTTCGCCACCG ATGTTCCTCCTCGATCTC TACGCATTTCACCGCTA CACCAGGAATTCCCGTT ACCTCTACCTCACTCAA GAACAACAGTTTCAAAT GCAGTCTATGGGTTGA GCCCATAGTTTTCACAT CTGACTTGCCGTCCCGC CTACGCTCCCTTT (SEQ ID NO: 84) |
| ASV002Y | Bacteria | Firmicutes | Clostridia | Clostridiales | Ruminococcaceae | Ruminococcaceae UCG-003;Ambiguous_taxa | | NR | | CCTGTTTGCTCCCACG CTTTCGCGCCTCACCGT CAGTTACCGTCCAGTAA TCCGGCCTTCGCCACTGG |

FIG. 14 (cont.)

| ASV | Domain | Phylum | Class | Order | Family | Genus | 0.5%F0.5% 11%B | 0.5%F0.5% 10.5%B | 0.25%F0. 25%11%B | 16s rRNA V4 region sequence |
|---|---|---|---|---|---|---|---|---|---|---|
| | | | | | | | | | | TGTTCTTCCTTATATCTA CGCATTTCACCGCTACA CAAGGAATTCCGATTAC CTCTCCGGCACTCAAGA TGCACAGTTTCAAATGC AGTTTCAGGGTTGAGC CCTGAGATTTCACATCT GACTTGCGCACCCGGC TGCACGCCCTT (SEQ ID NO: 85) |
| ASV0031 | Bacteria | Firmicutes | Clostridia | Clostridiales | Christensenellaceae | Christensenellaceae R-7 group | NR | NR | | CCTGTTTGCTCCCACG CTTTCGCGCCTCAACGT CAGTTACAGTCCAGAA AGCCGCCTTCGCCACTG GTGTTCCTCCTAATATC TACGCATTTCACCGCTA CACTAGGAATTCCGCTT CCTCTCCTGCACTCAA GCCATGCAGTATTACA GGCAGTTTCCAACCTTGA AAGTTGGGCTTTCACCT ATAACTTACACAGCCGT CTACGCGCCCTT (SEQ ID NO: 86) |
| ASV0038 | Bacteria | Firmicutes | Clostridia | Clostridiales | Ruminococcaceae | Oscillibacter | NR | NR | NR | CCTGTTTGCTCCCACG CTTTCGCGCCTCACCGT CAGTTGCCGCAGTCA TCCGCCTTCGCCACTGG TGTTCCTCCTTATATCTA CGCATTTCACCGCTACA CAAGGAAATTCCGATGA CCTCTCCGGTACTCAAG ACCAGCAGTTTCAAAC GCAGTTCCAGGGTTGA GCCCTGGGATTTCACGGC CTGACTTGCCAGCCCG |

FIG. 14 (cont.)

| ASV | Domain | Phylum | Class | Order | Family | Genus | 0.5%FO.5% I1%B | 0.5%FO.5% I0.5%B | 0.25%FO. 25%I1%B | 16s rRNA V4 region sequence |
|---|---|---|---|---|---|---|---|---|---|---|
|  |  |  |  |  |  |  |  |  |  | GCTGCACGCCCTTT (SEQ ID NO: 87) |
| ASV0030Q | Bacteria | Firmicutes | Clostridia | Clostridiales | Ruminococcaceae | Ruminococcaceae UCG-014 |  |  | NR | CCTGTTTGCTCCCCACA CTTTCGTGCCTCAACGT CAGTTTCTGTCCCAGAAA GTCGCCTTCGCCACTGG TGTTCCTCCTAATATCT ACGCATTTCACCGCTAC ACTAGGAATTCCACTTT CCTCTCCAGTACTCAAG AAAAACAGTTTTAGTTG CAGTTCCTCAGTTAAGC CGAGGGATTTCACAAC TAACTTATCTTCCCGTCT ACGCACCCTTT (SEQ ID NO: 88) |
| ASV0046 | Bacteria | Firmicutes | Clostridia | Clostridiales | Lachnospiraceae | Lachnospiraceae ND3007 group |  |  | NR | CCTGTTTGCTCCCCACG CTTTCGAGCCTCAGTGT CAGTTACAGTCCAGTG AGCCGCCTTCGCCTCCG GTGTTCCTCCTAATATC TACGCATTTCACCGCTA CACTAGGAATTCCGCTC ACCCCTCCTGCACTCTA GCATGACAGTTCCAAA AGCAATCCCCGGGGTTG AGCCCCGGGTTTTCACT TCTGACTTGCCTTGCCA CCTACGCTCCCTTT (SEQ ID NO: 89) |
| ASV004B | Bacteria | Firmicutes | Clostridia | Clostridiales | Ruminococcaceae | Ruminiclostridium 9 | NR | NR | NR | CCTGTTTGCTCCCCACA CTTTCGGCCTCAGCGT CAGTTACTGTCCAGCAA ATCGCCTTCGCCACTGG TGTTCTTCCTAATATCTA CGCATTTCACCGCTACA |

FIG. 14 (cont.)

| ASV | Domain | Phylum | Class | Order | Family | Genus | 0.5%F0.5% 1%B | 0.5%F0.5% 10.5%B | 0.25%F0. 25%/1%B | 16s rRNA V4 region sequence |
|---|---|---|---|---|---|---|---|---|---|---|
| ASV004L | Bacteria | Firmicutes | Clostridia | Clostridiales | Christensenellaceae | Christensenellaceae R-7 group | | | NR | CCTGTTTGCTCCCCACG CTTCGTGCCTCAGCGT CAGTTGTCGTCCAGTAA GCCGCCCTTCGCCACTGG TGTTCCTCCCGATATCT ACGGCATTTCACCGCTAC ACCGGGAATTCCGGCTTA CCTCTCCGACACTCAAG TCCGAAAGTTTCGAATG CAGTCCCATGTTAAGC ACAGGGGATTTCACATCC GACTTTTCAGACCGCCT ACGCACCCTT (SEQ ID NO: 91) |
| ASV004P | Bacteria | Firmicutes | Clostridia | Clostridiales | Ruminococcaceae | Ruminiclostridium 9;Ambiguous_taxa | | | | CCTGTTTGCTCCCCACG; CTTCCGCCGCCTCASCGT CAGTTGCTGTCCAGCA GATCGCCTTCGCCACTG GTGTTCCTCCTAATATC TACGCATTTCACCGCTA CACTAGGAATTCCATCT GCCTCTCCAGTACTCAA GAAAAACAGTTTCAAA TGCAGGCTGTGTGGTTG AGCCCACAGTTTTCACA TCTGACTTGCTTTCCCG CCTACACGCCCTT (SEQ ID NO: 92) |

FIG. 14 (cont.)

| ASV | Domain | Phylum | Class | Order | Family | Genus | 0.5%F0.5% 11%B | 0.5%F0.5% 10.5%B | 0.25%F0. 25%11%B | 16s rRNA V4 region sequence |
|---|---|---|---|---|---|---|---|---|---|---|
| ASV004V | Bacteria | Firmicutes | Clostridia | Clostridiales | Ruminococcaceae | Ruminiclostridium 9 | NR | NR | | CCTGTTTGCTCCCCACG CTTTCGGCGCTCAGCGT CAGTTGCTGTCCAGTTG ACCGCCTTCGCCACTGG TGTTCCTCCTAAATATCT ACGCATTTCACCGCTAC ACTAGGAATTCCGTCAA CCTCTCCAGTACTCAAG AACTACAGTTTCAAACG CAGGCCAGAGGTTGAG CCCCTGGTTTTCACGCC TGACTTGCAATCCGCC TACACGCCCTT (SEQ ID NO: 93) |
| ASV0053 | Bacteria | Firmicutes | Clostridia | Clostridiales | Family XIII | Family XIII AD3011 group | NR | NR | | CCTGTTTGCTCCCCACG CTTTCGTACCTCAGTGT CAGTTACAGTCCAGAA AGCCGCCTTCGCCACTG GTGTTCCTCCTAATATC TACGCATTTCACCGCTA CACTAGGAATTCCGCTT TCCTCTCTGCACTCAA GTAGCCCAGTTCACAA GGCGAACAATGGTTAA GCCATTGCCTTATACCT CGTGCTTAGGTAACCAC CTACGTACTCTTTA (SEQ ID NO: 94) |
| ASV0054 | Bacteria | Firmicutes | Clostridia | Clostridiales | Clostridiales vadinBB60 group | gut metagenome | NR | NR | NR | CCTGTTTGCTCCCCACG CTTTCGTGCTTCAGTGT CAGTTACGGCCCAGTAT GTCGCTTTCGCCACCGG TGTTCCTCCTAAATATCT ACGCATTCCACCGCTAC ACTAGGAATTCCACATA CCCCTGCCGCCACTCAAG |

FIG. 14 (cont.)

| ASV | Domain | Phylum | Class | Order | Family | Genus | 0.5%F0.5% 11%B | 0.5%F0.5% 10.5%B | 0.25%F0. 25%&11%B | 16s rRNA V4 region sequence |
|---|---|---|---|---|---|---|---|---|---|---|
| | | | | | | | | | | CCTATCAGTTTTGGCAG TAGTTCCGCGGTTAAGC CACGGAATTACGCTGC CAACTTGACAAACCACC TACGCACCCTTT (SEQ ID NO: 95) |
| ASV0057 | Bacteria | Firmicutes | Clostridia | Clostridiales | Lachnospiraceae | Agathobacter | | NR | | CCTGTTTGCTCCCACG CTTTCGAGCCTCAGCGT CAGTTATCGTCCAGTAA GCCGCCTTCGCCACTGG TGTTCCTCCTAATATCT ACGCATTTCACCGCTAC ACTAGGAATTCCGCTTA CCCCTCCGACACTCTAG TACGACAGTTTCCAATG CAGTACCGGAGGTTGAG CCCCGGGTTTTCACATC AGACTTGTCCGACCGGC CTGCGCTCCCTTT (SEQ ID NO: 96) |
| ASV0058 | Bacteria | Firmicutes | Clostridia | Clostridiales | Ruminococcaceae | Ruminococcaceae UCG-005 | NR | NR | NR | CCTGTTTGCTCCCACG CTTTCGCGCCTCAGCGT CAGTTGTCGTCCAGCA GGCCGCCTTCGCCACTG GTGTTCCTCCTAATATC TACGCATTTCACCGCTA CACTAGGAATTCCGCCT GCCTCTCCGGATACTCAA GAAAAACGGTTTCAAA TGCAGTTCCGGGGTTG AGCCCCGGACATTTCACA TCTGACCTGTCTTCCCG CCTACACGCCCTTT (SEQ ID NO: 97) |
| ASV005C | Bacteria | Firmicutes | Clostridia | Clostridiales | Ruminococcaceae | Flavonifractor | | NR | | CCTGTTTGCTCCCACG CTTTCGCGCCTCAGCGGT |

FIG. 14 (cont.)

| ASV | Domain | Phylum | Class | Order | Family | Genus | 0.5%F0.5% 11%B | 0.5%F0.5% 10.5%B | 0.25%F0. 25%i11%B | 16s rRNA V4 region sequence |
|---|---|---|---|---|---|---|---|---|---|---|
| | | | | | | | | | | CAGTTATCGTCCAGCGATCCGCCTTCCGCCACTGGTGTTCCTCCGTATATCTACGCATTTCACCGCTACACACGGAATTCCGATCGCCTCTCCGACACTCAAGAACTACAGTTTCAAATGCAGGCTGGAGGTTGAGCCCCCAGTTTTCACATCTGACTTGCAGTCCCGCCTACACGGCCCTTT (SEQ ID NO: 98) |
| ASV0056 | Bacteria | Firmicutes | Clostridia | Clostridiales | Defluviitaleaceae | Defluviitaleaceae UCG-011 | | | NR | CCTGTTTGCTCCCACGCTTTCGTGCTCAGCGTCAGTTGCAGTCCAGAAAGCCGCCTTCGSCCACTGGTGTTCCTCCTAATATCTACGCATTTCACCGCTACACTAGGAATTCCGCTTTCCTCTGCACTCTAGCTCCGCAGTTTCCATTGCACCTCGATGGTTAAGCCATCGCCTTCCACAACAGACTTACGGTGCCGCCTACGCACCCTTT (SEQ ID NO: 99) |
| ASV0055j | Bacteria | Firmicutes | Clostridia | Clostridiales | Ruminococcaceae | Ruminiclostridium 9 | NR | NR | | CCTGTTTGCTCCCACGCTTTCGGCGCTCAGCGTCAGTTGCTGTCCAGCAGACCGCCTTCGCCACTGGTGTTCCTCCTAATATCTACGCATTTCACCGCTACACTAGGAATTCCGTCTGCCTCTCCAGTACTCAAGAACTACAGTTTCAAATGCAGGCCCACAGGTTGA |

FIG. 14 (cont.)

| ASV | Domain | Phylum | Class | Order | Family | Genus | 0.5%F0.5% 11%B | 0.5%F0.5% 10.5%B | 0.5%F0.5% 10.5%B | 0.25%F0. 25%&11%B | 16s rRNA V4 region sequence |
|---|---|---|---|---|---|---|---|---|---|---|---|
| | | | | | | | | | | | GCCCATGGTTTTCACAT CTGACTTGCAGTCCCGC CTACACGCCCTTT (SEQ ID NO: 100) |
| ASV006F | Bacteria | Firmicutes | Clostridia | Clostridiales | Christensenellaceae | uncultured | NR | NR | NR | | CCTGTTTGCTCCCCACG CTTTCGTGCCTCAGCGT CAGTTACAGTCCCAGAA AGCCGCCTTCGCCACTG GTGTTCCTCCTAATATC TACGCATTTCACCGCTA CACTAGGAATTCCGCTT TCCTCTCCTGCACTCAA GCACTAACAGTATCAGAT CACGGGTATTTCACATC TGACTTACCAGGCCGCC TACGCACCCTTT (SEQ ID NO: 101) |
| ASV006H | Bacteria | Firmicutes | Clostridia | Clostridiales | Ruminococcaceae | DTU089 | | | NR | | CCTGTTTGCTACCCATG CTTCCGTGCCTCAGCGT CAGTTAAGCCCAGCA GGCCGCCTTCGCCACTG GTGTTCCTCCGATCTC TACGCATTTCACCGCTA CACCGGGAATTCCGCCT GCCCTCACCTCACTCAA GACCCACAGTTTCAATA GCAGTTCCAGGGTTAA GCCCTGGGATTTCACTA CTGACTTGCAGATCCGC CTACGCACCCTTT (SEQ ID NO: ...) |
| ASV006N | Bacteria | Firmicutes | Clostridia | Clostridiales | Ruminococcaceae | Angelakisella | | NR | NR | | CCTGTTTGCTCCCCACA CTTTCGAGCCTCAGCGT CAGTAAAAGCCCAGCA AGCCGCCTTCGCCACTG (SEQ ID NO: 102) |

FIG. 14 (cont.)

| ASV | Domain | Phylum | Class | Order | Family | Genus | 0.5%F0.5% 11%B | 0.5%F0.5% 10.5%B | 0.25%F0.25% 11%B | 16s rRNA V4 region sequence |
|---|---|---|---|---|---|---|---|---|---|---|
| | | | | | | | | | | GTGTTCCTCCTAATATCTACGCATTTCACCGCTACACTAGGAATTCCGCTTGCCCTCTACTTCACTCAAGAAAAACAGTTTTGAATGTCAGTTCTGTAGGTTGAGCCCACAGTTTTCACATCCAACTTGCCTTCCCGCCTACGCTCCCTTT (SEQ ID NO: 103) |
| ASV0070 | Bacteria | Firmicutes | Clostridia | Clostridiales | Lachnospiraceae | Marvinbryantia | | | NR | CCTGTTTGCTCCCCACGCTTTCGAGCCTCAACGTCAGTTACCGTCCAGTAAGCCGCCTTCGCCACTGGTGTTCCTCCTAATATCTACGCATTTCACCGCTACACTAGGAATTCCGCTTACCTCTCCGGCACTCCAGCAGGACAGTTTCCAATGCAGTCCCGGGGGTTGAGCCCCAGCCTTTCACATCAGACTTGCCTTGCCGTCTACGCTCCCTTT (SEQ ID NO: 104) |
| ASV007C | Bacteria | Firmicutes | Bacilli | Lactobacillales | Streptococcaceae | Streptococcus | | | NR | CCTGTTTCGCTCCCCACGCTTTCGAGCCTCAGCGTCAGTTACAGACCAGAGAGCCGCTTTCGCCACCCGGTGTTCCTCCATATATCTACGCATTTCACCGCTACACATGGAATTCCACTCTCCCCTTCTGCACTCAAGTTTGACAGTTTCCAAAGCGAACTATGGTTGAGCCACAGCCTTTAACTTC |

FIG. 14 (cont.)

| ASV | Domain | Phylum | Class | Order | Family | Genus | 0.5%FO.5% 11%B | 0.5%FO.5% 10.5%B | 0.5%FO.5% 10.5%B | 0.25%FO. 25%11%B | 16s rRNA V4 region sequence |
|---|---|---|---|---|---|---|---|---|---|---|---|
| | | | | | | | | | | | AGACTTATCAAACCGCC TGCGCTCGCTTTA (SEQ ID NO: 105) |
| ASV007E | Bacteria | Firmicutes | Clostridia | Clostridiales | Ruminococcaceae | | NR | NR | | NR | CCTGTTTGCTCCCCACG CTTTCGCGCCTCAGCGT CAGTTACTGTCCAGCAA TCCGCCTTCGCCACTGG TGTTCCTCCGTATATCT ACGCATTTCACCGCTAC ACACGGAATTCCGATT GCCTCTCCAGCACTCAA GAAAAACAGTTTCAAA TGCAGGCTATGAGTTG AGCCCATAGTTTTCACA TCTGACTTGCCTTCCCG CCTACACGCCCTT (SEQ ID NO: 106) |
| ASV007S | Bacteria | Firmicutes | Clostridia | Clostridiales | | | | NR | | | CCTGTTTGCTACCCACG CTTTCGTGCCTCAGCGT CAGTTTTGGTCCAGCAA GCCGCCTTCGCCACTGG TGTTCCTCCCGATCTCT ACGCATTTCACCGCTAC ACCGGGAATTCCGCTT GCCTCTCCCATACTCAA GCCAACCCAGTTTCAAGT GCAACCCCATGTTIAAG CACGGGTCTTTCACACC TGACTTGATCGGCCGCC TACGCACCCTT (SEQ ID NO: 107) |
| ASV007Z | Bacteria | Firmicutes | Clostridia | Clostridiales | Christensenellaceae | uncultured | NR | NR | | NR | CCTGTTTGCTACCCACG CTTTCGTGCCTCAGCGT CAGTTACAGTCCAGTAA GTCGCCTTCGCCACTGG TGTTCCTCCTAATATCT |

FIG. 14 (cont.)

| ASV | Domain | Phylum | Class | Order | Family | Genus | 0.5%F0.5% 11%B | 0.5%F0.5% 10.5%B | 0.25%F0. 25%I1%B | 16s rRNA V4 region sequence |
|---|---|---|---|---|---|---|---|---|---|---|
| | | | | | | | | | | ACGCAATTCCACCGCTAC ACTAGGAATTCCACCTTA CCCTTCCTGCACTCAAG CACAGCAGTATCAGAA GCAGTCCCGGAGGTTAA GCCCCGATATTTCACTT CTGACTAACTGCGCCGC CTACGCACCCTTT (SEQ ID NO: 108) |
| ASV0216 | Bacteria | Firmicutes | Clostridia | Clostridiales | Ruminococcaceae | Ruminococcaceae UCG-002 | NR | NR | NR | CCTGTTTGCTCCCCACG CTTTCGCGCCTCACCGT CAGTTGTCGTCCAGCAA TCCGCCTTCGCCACTGG TGTTCCTCCTAATATCT ACGCATTTCACCGCTAC ACTAGGAATTCCGATTG CCTCTCCGATACTCAAG AAAAGTAGTTTCAAAT GCAGTTCACGAGTTAA GCCCGTGGATTTCACAT CTGACTTGCCTTCCCGG CTACACGCCCTTT (SEQ ID NO: 109) |
| ASV0222 | Bacteria | Firmicutes | Clostridia | Clostridiales | Ruminococcaceae | Subdoligranulum | NR | NR | NR | CCTGTTTGCTACCCATG CTTTCGAGCCTCAGCGT CAGTTGGTGCCCAGTA GGTCGCCTTCGCCACTG GTGTTCCTCCCGATATC TACGCATTCCACCGCTA CACCGGGAATTCCACCT ACCTCTGCACTACTCAA GGGCCAGCAGTTTTGAA AGCAATTCACGGGTTG AGCCCATGGATTTCACT TCCAACTTGCCGGTCCG |

FIG. 14 (cont.)

| ASV | Domain | Phylum | Class | Order | Family | Genus | 0.5%FO. 1%B | 0.5%FO.5% 10.5%B | 0.5%FO.5% 10.5%B | 0.25%FO. 25%&1%B | 16s rRNA V4 region sequence |
|---|---|---|---|---|---|---|---|---|---|---|---|
| | | | | | | | | | | | CCTGCGCTCCCTT (SEQ ID NO: 110) |
| ASV03YT | Bacteria | Firmicutes | Clostridia | Clostridiales | Ruminococcaceae | Ruminococcaceae NK4A214 group | | NR | | | CCTGTTTGCTCCCACG CTTTCGCGCCTCAGCGT CAGTTATCGTCCAGTTG ACCGGCCTTCGCCACTGG TGTTCCTCCTAATATCT ACGCATTTCACCGCTAC ACTAGGAATTCCGTCAA CCTCTCCGACACTCAAG AAATACAGTTTCAAATG CAGTTCAAGGGTTGAG CCCTTGGATTTCACATC TGACTTGCATTCCCGCC TACGCGCCCTT (SEQ ID NO: 111) |
| ASV03YX | Bacteria | Firmicutes | Clostridia | Clostridiales | Family XIII | Family XIII UCG-001 | NR | NR | | NR | CCTGTTTGCTCCCACG CTTTCGTACGTCAGCGT CAGTTACAGTCCAGAA AGTCGCCTTCGCCACTG GTGTTCCTCCTAATATC TACGCATTTCACCGCTA CACTAGGAATTCCACTT TCCCCTCCTGCACTCAA GTCTGACAGTTCGCAA GGCTGACATTGGTTGA GCCTATGCCTTTCACCT TGCGCTTACCAGACCGC CTACGTACTCTTTA (SEQ ID NO: 111) |
| ASV04KS | Bacteria | Firmicutes | Clostridia | Clostridiales | Peptococcaceae | uncultured | | NR | | | CCTGTTTGCTCCCACG CTTTCGCGCCTCAGTGT CAGTTACGGTCCAGGC AGCCGCCTTCGCCACTG GTGTTCCTCCCAATCTC TACGCATTTCACCGCTA (SEQ ID NO: 112) |

FIG. 14 (cont.)

| ASV | Domain | Phylum | Class | Order | Family | Genus | 0.5%FO.5% 1 1%B | 0.5%FO.5% 10.5%B | 0.25%FO. 2.5%&1%B | 16s rRNA V4 region sequence |
|---|---|---|---|---|---|---|---|---|---|---|
| | | | | | | | | | | CACTGGGAATTCCACTG CCCTCTCCCGCACTCAA GACTGACCGTATCGGA TGCGGTTCCCAGGTTAA GCCTGGGGGCTTTCACAT CCGACTGATCAGTCCAC CTACACGCCCTTT (SEQ ID NO: 113) |
| ASV04KT | Bacteria | Proteobacteria | Deltaproteobacteria | Desulfovibrionales | Desulfovibrionaceae | Desulfovibrio | | NR | | CCTGTTTGCTCCCCACG CTTTCCACCTCAGCGT CAATACCGGTCCAGGT GGCCGGCTTCGCCACTG ATGTTCCTCCAGATATC TACGGATTTCACTCCTA CACCTGGAATTCCGCCA CCCTCTCCGGATTCAA GTTGTGCAGTATCAAA GGCAGTTCCACGGTTG AGCCGTGGGGATTTCAC CCCTGACTTACACTACA GCCTACGTGCGCTTT (SEQ ID NO: 114) |
| ASV04L1 | Bacteria | Firmicutes | Clostridia | Clostridiales | Ruminococcaceae | Ruminiclostridium 1 | NR | | | CCTGTTTGCTCCCCACG CTTTCGCGCCTCAGCGT CAGTTTCTGTCCCAGAAA GCCGCCTTCGCCACCG GTGTTCCTCCTAATATC TACGCATTTCACCGCTA CACTAGGAATTCCACTT TCCTCTCCAGTACTCAA GATCCACAGTTTCAGAT GCAGTTCCGGAGTTAA GCCCCGGCATTTCACAT CTGACTTGCAGACCCGC CTACGCGCCCTTT (SEQ ID NO: 115) |

FIG. 14 (cont.)

| ASV | Domain | Phylum | Class | Order | Family | Genus | 0.5%FQ.5% 11%B | 0.5%FQ.5% 10.5%B | 0.25%FQ. 2.5%&1.%B | 16s rRNA V4 region sequence |
|---|---|---|---|---|---|---|---|---|---|---|
| ASV04TB | Bacteria | Firmicutes | Clostridia | Clostridiales | Lachnospiraceae | Blautia | | | NR | CCTGTTTGCTCCCCACG CTTTCGAGCCTCAACGT CAGTTACCGTCCAGTAA GCCGCCTTCGCCACTGG TGTTCCTCCTAATATCT ACGCATTTCACCGCTAC ACTAGGAATTCCGCTTA CCTCTCCGGCACTCAAG AAAAACAGTTTCCAATG CAGTCCTGGGGTTAAG CCCCAGCCTTCACATC AGACTTGCTCTTCCGTC TACGCTCCCTT (SEQ ID NO: 116) |
| ASV05RB | Bacteria | Firmicutes | Clostridia | Clostridiales | Lachnospiraceae | Blautia | NR | | NR | CCTGTTTGCTCCCCACG; CTTTCGAGCCTCAACGT CAGTTACCGTCCAGTAA GCCGCCTTCGCCACTGG TGTTCCTCCTAATATCT ACGCATTTCACCGCTAC ACTAGGAATTCCGCTTA CCCCTCCGGCACTCAAG TATGACAGTTTCCAATG CAGTCCACGGGTTGAG CCCATGCCTTCACATC AGACTTGCCACCGTC TACGCTCCCTT (SEQ ID NO: 117) |

FIG. 14 (cont.)

FIBER MIX FORMULATIONS AND USES THEREOF

RELATED APPLICATIONS

This patent application is a national phase filing under 35 U.S.C. 371 of International Application No. PCT/US2021/026258, filed on Apr. 7, 2021, which claims the benefit of and the priority to U.S. Provisional Patent Application Ser. No. 63/006,896, filed Apr. 8, 2020, the entirety of each of which is incorporated by reference in its entirety.

SEQUENCE LISTING

The instant application contains a Sequence Listing which has been submitted electronically in ASCII format and is hereby incorporated by reference in its entirety. Said ASCII copy, created on Apr. 7, 2021, is named 117465-016701PCT_SL.txt and is 49,521 bytes in size.

FIELD

The present disclosure relates to a fiber mix formulation useful for in vitro and in vivo indications.

BACKGROUND

The gut ecosystem is regarded as foundational for human health. Developing strategies to promote and maintain a healthy gut microbiota is one of the key priorities in recent medical research. Dysbiosis (an imbalance of beneficial and detrimental intestinal microbes) is associated with metabolic diseases, including obesity and type 2 diabetes.

SUMMARY

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Aspects of the present disclosure relate to a formulation comprising a mixture of bran, inulin, and digestion resistant maltodextrin, wherein the bran consists essentially of corn bran, wheat bran, sorghum bran, and oat bran, wherein the mixture has a ratio of dietary fibers from bran:dietary fibers from inulin:dietary fibers from digestion resistant maltodextrin ranging from about 1:1:1 to about 4:1:1, wherein the inulin is present in a range of 5-10% of total weight of the mixture, and wherein the mixture has a uniform particle size between 150 μm and 300 μm.

In some embodiments, the ratio of fiber contributed by each of the corn bran, wheat bran, sorghum bran, and oat bran is about 1:1:1:1 by weight.

In some embodiments, the formulation comprises about 7-8% inulin by weight. In some embodiments, the formulation comprises about 7.8% inulin by weight. In some embodiments, the total fiber content is about 47% (w/w). In some embodiments, the digestion resistant maltodextrin is Fibersol-2®, a soluble corn fiber. In some embodiments, the Fibersol-2® is present at a final percentage of about 7.8% (w/w).

In some embodiments, the formulation further comprises xanthan gum. In some embodiments, the xanthan gum is present at a final percentage of about 4% (w/w).

Other aspects of the present disclosure relate to methods for promoting a healthy gut microbiome in a subject in need thereof, the method comprising enterally administering to the subject an effective amount of the formulation comprising a mixture of bran, inulin, and digestion resistant maltodextrin, wherein the bran consists essentially of corn bran, wheat bran, sorghum bran, and oat bran, wherein the mixture has a ratio of dietary fibers from bran:dietary fibers from inulin:dietary fibers from digestion resistant maltodextrin ranging from about 1:1:1 to about 4:1:1, wherein the inulin is present in a range of 5-10% of total weight of the mixture, and wherein the mixture has a uniform particle size between 150 μm and 300 μm, wherein the effective amount is sufficient to increase proliferation of acetate-producing and butyrate-producing gut bacteria in the subject's gut, thereby promoting the healthy gut microbiome in the subject.

In some embodiments, the effective amount of the formulation comprises 30-90 grams of fiber per day. In some embodiments, the effective amount of the formulation comprises 30-60 grams of fiber per day. In some embodiments, the effective amount of the formulation comprises 30-120 grams of fiber per day.

In some embodiments, the acetate-producing and butyrate-producing gut bacteria species are classified in a bacterial genus comprising at least one of *Bifidobacterium, Ruminococcus, Eubacterium, Clostridium, Alistipes, Bacteroides, Blautia, Butyricicoccus, Butyricimonas, Collinsella, Coprococcus, Dorea, Eggerthella, Faecalibacterium, Fusicatenibacter, Intestinimonas, Lachnoclostridium, Lachnospiraceae, Megasphaera, Parabacteroides, Paraprevotella, Phascolarctobacterium, Roseburia, Ruminiclostridium*, or *Subdoligranulum*, wherein the acetate-producing and butyrate-producing gut bacteria species are classified in a bacterial family comprising at least one of Acidaminococcaceae, Bacteroidaceae, Bifidobacteriaceae, Clostridiaceae, Clostridiales, Coriobacteriaceae, Eggerthellaceae, Enterobacteriaceae, Erysipelotrichaceae, Lachnospiraceae, Marinifilaceae, Prevotellaceae, Rikenellaceae, Ruminococcaceae, Tannerellaceae, or Veillonellaceae.

In some embodiments, the acetate-producing and butyrate-producing gut bacteria species are detected by 16S rRNA amplicon sequencing targeting one or a few of the variable regions such as V4, V3-V4 or the full-length gene. In some embodiments, the 16S rRNA V4 amplicon sequencing identifies at least one of an amplicon sequence variant (ASV) characteristic of the acetate-producing and butyrate-producing gut bacteria. In some embodiments, each of the ASVs represents a unique bacterial strain or a group of highly similar strains of the acetate-producing and butyrate-producing gut bacteria.

In some embodiments, the subject in need thereof has an imbalance of gut microbiota. In some embodiments, the imbalance of gut microbiota is characterized by low levels of acetate-producing and butyrate-producing gut bacteria. In some embodiments, the low levels of acetate-producing and butyrate-producing gut bacteria are less than 5% of total gut microbiota in the subject in need thereof. For example, the acetate-producing and butyrate-producing gut bacteria species are classified in a bacterial genus comprising at least one of *Bifidobacterium, Ruminococcus* or *Eubacterium*. In some embodiments, the acetate-producing and butyrate-producing gut bacteria species are detected by 16S rRNA V4 amplicon sequencing. In some embodiments, the 16S rRNA V4 amplicon sequencing identifies at least one of an amplicon sequence variant (ASV) characteristic of the acetate-producing and butyrate-producing gut bacteria. In some embodiments, each of the ASVs represents a unique bacterial strain or a group of highly similar strains of the acetate-producing and butyrate-producing gut bacteria.

In some embodiments, the administering increases the acetate-producing and butyrate-producing gut bacteria.

Aspects of present disclosure relate to a fiber mix formulation comprising a mixture of bran, inulin, and digestion resistant maltodextrin useful. The mixture of soluble dietary fiber (SDF) and insoluble dietary fiber (ISDF) with a ratio of ISDF:SDF ranging from about 0.5:1 to about 1:0.5 has synergistic effect on gut microbiota composition, promoting the growth of the acetate- and butyrate-producing bacteria and inhibiting the growth of pathogens and detrimental bacteria. In some embodiments, the fiber mix formulation restores a healthier gut microbiota. In some embodiments, the fiber mix formulation restores a healthier gut microbiota and alleviate symptoms in patients with various diseases or indications which are known to have a dysbiotic gut microbiota, such as obesity, prediabetes, type 2 diabetes, multiple sclerosis Parkinson disease, Prader-Willi syndrome, alleviation of side effects (diarrhea, nausea, vomiting, bloody stool etc.) of cancer chemotherapy.

In some embodiments, the subject in need thereof is obese. In some embodiments, the subject in need thereof has type 2 diabetes. In some embodiments, the subject in need thereof has diabetic kidney disease. In some embodiments, the subject in need thereof is obese with respiratory viral infection such as COVID-19. In some embodiments, the subject in need thereof has type 2 diabetes with respiratory viral infection such as COVID-19. In some embodiments, the subject in need thereof is prediabetic with respiratory viral infection such as COVID-19. In some embodiments, the subject in need thereof has multiple sclerosis. In some embodiments, the subject in need thereof has Parkinson disease. In some embodiments, the subject in need thereof has Prader-Willi syndrome. In some embodiments, the subject in need thereof has cancer and administration of the formulation alleviates side effects associated with cancer chemotherapy.

BRIEF DESCRIPTION OF THE DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

FIG. 14 is a Table showing positive and negative responders to different combination of fibers and 16S rRNA V4 region sequences (SEQ ID NOs: 1-117)

DETAILED DESCRIPTION

Figure 1A:
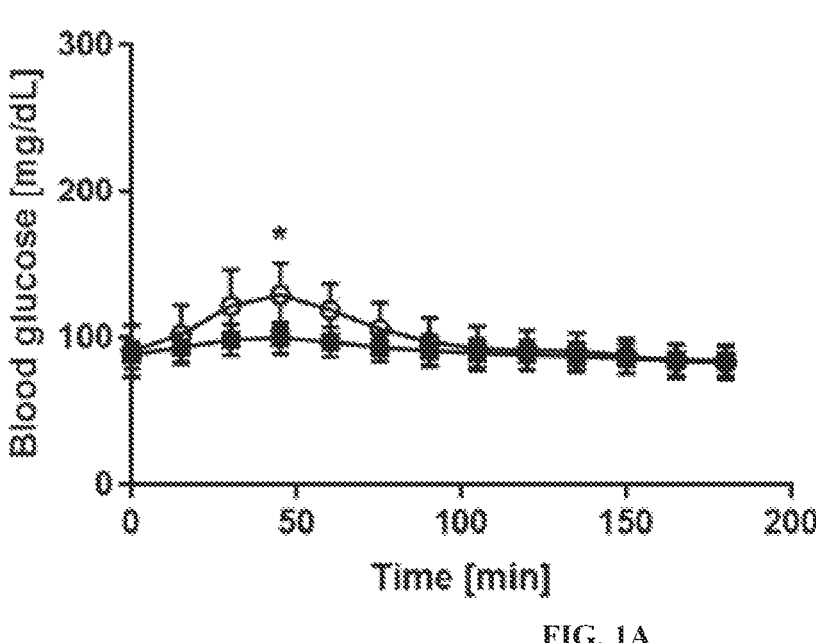
FIGS. 1A and 1B depict postprandial glycemic response in healthy controls (FIG. 1A) and individuals with prediabetes/type 2 diabetes (FIG. 1B). * $P<0.05$ vs white bread at the same time point.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising" "including," and "having" do not limit the scope of a specific claim to the materials or steps recited by the claim.

As used herein, the term "consisting essentially of" limits the scope of a specific claim to the specified materials or steps and those that do not materially affect the basic and novel characteristic or characteristics of the specific claim, e.g., fiber mix formulations and use thereof for restoring and/or maintaining a gut microbiota that supports human health. For instance, by using "consisting essentially of" the fiber mix formulations described herein do not contain any unspecified ingredients that have a direct beneficial or adverse therapeutic effect on treatment of a disorder associated with dysbiosis of gut microbiota. Also, by using the term "consisting essentially of" the composition may comprise substances that do not have therapeutic effects on the treatment of a disorder associated with dysbiosis of gut microbiota; such ingredients include carriers, excipients, adjuvants, flavoring agents, etc. that do not affect gut microbiota.

As used herein, terms such as "consisting of" and "composed of" limit the scope of a specific claim to the materials and steps recited by the claim.

The term "treatment" or any grammatical variation thereof (e.g., treat, treating, and treatment etc.), as used herein, includes but is not limited to, alleviating a symptom of a disease or condition; and/or reducing, suppressing, inhibiting, lessening, or affecting the progression, severity, and/or scope of a disease or condition.

The term "amelioration" or any grammatical variation thereof (e.g., ameliorate, ameliorating, and amelioration etc.), as used herein, includes, but is not limited to, delaying the onset, or reducing the severity of a disease or condition (e.g., diarrhea, bacteremia and/or endotoxemia). Amelioration, as used herein, does not require the complete absence of symptoms.

The term "effective amount," as used herein, refers to an amount that is capable of treating or ameliorating a disease or condition or otherwise capable of producing an intended therapeutic effect.

As used herein, words of approximation such as, without limitation, "about", "substantial" or "substantially" refer to a condition that when so modified is understood to not necessarily be absolute or perfect but would be considered close enough to those of ordinary skill in the art to warrant designating the condition as being present. In general, a numerical value herein that is modified by a word of approximation such as "about" may vary from the stated value by at least or equal to +1, 2, 3, 4, 5, 6, 7, 8, 9, or 10%.

Fiber Mix

In some embodiments, the subject invention provides a method for restoring and/or maintaining a gut microbiota that supports human health, wherein said method comprises: administering to a subject in need thereof, a fiber mix formulation comprising oat bran, corn bran, sorghum bran, wheat bran, inulin, and digestion resistant maltodextrin; and optionally, therapeutically acceptable carriers, electrolytes, vitamins, buffering agents, and flavoring agents. In some embodiments, the digestion resistant maltodextrin is Fibersol-2®, a soluble corn fiber. In a particular embodiment, the administering is via enteral route. In a particular embodiment, the fiber mix formulation further comprises water.

The present inventors have gathered comprehensive evidence relating to the role of dietary fibers in establishing and maintaining a gut microbiota that supports human health. By incorporating foods that are rich in whole grains, traditional Chinese medicinal foods, and prebiotics, the present inventors demonstrated that a diet high in dietary fibers having diverse physicochemical structures restores a healthier gut microbiota, which, in turn, confers clinical benefits including weight loss, reduction of inflammation and improved glucose homeostasis. As shown herein, among hundreds of gut bacteria that possess the genetic capacity to utilize dietary fibers, the fiber mix formulation described herein selectively promotes a small group of acetate- and butyrate-producing bacteria. Acetate and butyrate from bacterial carbohydrate fermentation provide energy substrates locally for colonocytes and function as signaling molecules in many metabolic pathways including those that regulate immune response, appetite and insulin secretion. The present inventors refer to this group of bacteria as the "foundation guild" of a healthy gut microbiota structure. The foundation guild comprises bacteria from different groups. When the foundation guild becomes predominant in a gut microbial community, the guild produces acetate and butyrate to create a mildly acidic gut environment, which is inhibitory to many detrimental bacteria or pathogens and therefore shapes the gut microbiota towards a healthier structure.

Adopting a high-fiber dietary regimen in everyday life, however, is challenging if at all possible. The fiber mix formulation described herein was carefully formulated to include a large amount of diverse fibers with different physicochemical structures to maximize short-chain fatty acid (SCFA) production by gut bacteria that differ with respect to their preferred fermentation substrates.

In the present inventors' clinical trials using the fiber mix formulation described herein, the average fiber intake was 33-44 g/day, which greatly exceeds the typical intake of fiber at 15 g/day among adults in the United States. Such a significant discrepancy between the amount fiber that may be needed for health benefits and that which is routinely consumed, underscores the potential benefits of the fiber mix formulation described herein to the general population.

The fiber mix formulation described herein provides soluble and insoluble dietary fibers as fermentation substrates that restore and/or maintain a gut microbiota that supports human health. The fiber mix primarily consists of ingredients that are rich in soluble and insoluble fibers of diverse physicochemical structures. In some embodiments, the fiber mix formulation comprises one or more soluble fibers. In some embodiments, the soluble fiber can be fructo-oligosaccharide (FOS), galacto-oligosaccharides (GOS), trans-galacto-oligosaccharides (TOS), resistant starch (RS), pectic oligosaccharide (POS), raffinose family oligosaccharides (RFO), polydextrose, inulin, Fibersol-2® or any combination of the foregoing.

In some embodiments, the fiber mix formulation comprises a mixture of bran (insoluble dietary fibers), inulin (soluble dietary fibers) and/or digestion resistant maltodextrin (soluble dietary fibers). In some embodiments, the fiber mix formulation further comprises xanthan gum.

In some embodiments, the bran mix comprises oat bran, corn bran, sorghum bran, wheat bran or combinations thereof. In some embodiments, the fiber mix comprises a ratio of dietary fibers from bran:dietary fibers from inulin:dietary fibers from digestion resistant maltodextrin ranging from about 1:1:1 to about 4:1:1. In some embodiments, the fiber mix comprises a ratio of dietary fibers from bran:dietary fibers from inulin:dietary fibers from digestion resistant maltodextrin ranging from about 2:1:1 to about 4:1:1. In some embodiments, the fiber mix comprises a ratio of dietary fibers from bran:dietary fibers from inulin:dietary fibers from digestion resistant maltodextrin ranging from about 3:1:1 to about 4:1:1. In some embodiments, the fiber mix comprises a ratio of dietary fibers from bran:dietary fibers from inulin:dietary fibers from digestion resistant maltodextrin ranging from about 1:1:1 to about 2:1:1. In some embodiments, the fiber mix comprises a ratio of dietary fibers from bran:dietary fibers from inulin:dietary fibers from digestion resistant maltodextrin ranging from about 1:1:1 to about 3:1:1. In some embodiments, the fiber mix comprises a ratio of dietary fibers from bran:dietary fibers from inulin:dietary fibers from digestion resistant maltodextrin ranging from about 2:1:1 to about 3:1:1. In some embodiments, the fiber mix comprises a ratio of dietary fibers from bran:dietary fibers from inulin:dietary fibers from digestion resistant maltodextrin ranging from about 3:1:1 to about 4:1:1. For example, the fiber mix comprises a ratio of dietary fibers from bran:dietary fibers from inulin:dietary fibers from digestion resistant maltodextrin (e.g. Fibersol-2®) can be 1:1:1, 3:1:1, 4:1:1. In some embodiments, the fiber mix comprises a ratio of insoluble dietary fibers to soluble dietary fibers ranging from about 0.5:1 to about 1:0.5. In some embodiments, the fiber mix comprises a ratio of insoluble dietary fibers to soluble dietary fibers ranging from about 0.5:1 to about 1:1. In some embodiments, the fiber mix comprises a ratio of insoluble dietary fibers to soluble dietary fibers ranging from about 1:1 to about 1:0.5. For example, the fiber mix comprises a ratio of insoluble dietary fibers to soluble dietary fibers of about 0.5:1, about 0.6:1, about 0.7:1, about 0.8:1, about 0.9:1, about 1:1, about 1:0.9, about 1:0.8, about 1:0.7, about 1:0.6, or about 1:0.5.

Oat bran, corn bran, sorghum bran, wheat bran, inulin and Fibersol-2® are mixed such that the total dietary fibers from the brans and those from inulin and Fibersol-2® are in the ratio of between about 1:1:1 and about 4:1:1, for example about 1:1:1, about 2:1:1, about 3:1:1, or about 4:1:1.

It should be noted that each bran has a different content of dietary fiber. In some embodiments, each bran contributes equal amount of dietary fiber in the fiber mix composition. In some embodiments, the composition of the fiber mix 1 comprises between about 30% to 50% (w/w) of total dietary fiber content. The total dietary fiber content includes insoluble and soluble fibers. In some embodiments, the composition of the fiber mix 1 comprises between about 36% to 47% (w/w) of total dietary fiber content. In some embodiments, the composition of the fiber mix as shown in Table 1 comprises 36.8% (w/w) of total dietary fiber content.

TABLE 1

| | Weight [%] |
| --- | --- |
| Oat bran | 43.7 |
| Corn bran | 11.2 |
| *Sorghum* bran | 16.4 |
| Wheat bran | 13.0 |
| Inulin | 7.8 |
| Fibersol-2 ® | 7.8 |

In some embodiments, a thickener, such as xanthan gum, can be then added to this mix to improve texture and palatability. (see Table 2)

TABLE 2

| | Weight [%] |
| --- | --- |
| Oat bran | 42.0 |
| Corn bran | 10.8 |

TABLE 2-continued

| | Weight [%] |
| --- | --- |
| *Sorghum* bran | 15.8 |
| Wheat bran | 12.5 |
| Inulin | 7.5 |
| Fibersol-2 ® | 7.5 |
| Xanthan gum | 4.0 |

In some embodiments, the amount of soluble fiber such as inulin ranges from 1% to 30% (w/w) relative to the total weight of the fiber mix. In some embodiments, the amount of inulin ranges from 5% to 25% (w/w) relative to the total weight of the fiber mix. In some embodiments, the amount of inulin ranges from 10% to 20% (w/w) relative to the total weight of the fiber mix. In some embodiments, the amount of inulin ranges from 7% to 8% (w/w) relative to the total weight of the fiber mix. According to certain exemplary embodiments, the amount of inulin ranges from 5% to 15% (w/w) relative to the total weight of the fiber mix. In some embodiments, the amount of inulin ranges from 7% to 8% (w/w) relative to the total weight of the fiber mix. In some embodiments, the amount of inulin ranges from 7.5% (w/w) relative to the total weight of the fiber mix. In some embodiments, the amount of inulin ranges from 5% to 15%, 6% to 15%, 7% to 15%, 8% to 15%, 9% to 15%, 10% to 15%, 11% to 15%, 12% to 15%, 13% to 15%, and 14% to 15% (w/w) relative to the total weight of the fiber mix. Each possibility represents a separate embodiment of the formulations, methods and uses described herein.

In some embodiments, the mixture of bran, inulin, and digestion resistant maltodextrin comprises has a uniform particle size between 150 μm and 300 μm. In some embodiments, the mixture has a uniform particle size higher than 150 μm and lower than 300 μm. For example, the mean particle size can be 160, 170, 180, 190, 200, 210, 220, 230, 240, 250, 260, 270, 280, or 290 μm.

All ingredients are sourced from commercial food suppliers. To prepare the fiber mix, the bran ingredients are first mixed at the specified ratios, the mixture is then milled to yield a uniform particle size between 150 and 300 μm and then roasted at 135° C. for 5 minutes for sterilization. The insoluble bran fiber mix may be further mixed with soluble fiber(s). A sample of the finished project is tested for nutrient profiling, microbial load check, and stability and shelf life by an ISO 17025 accredited food nutritional laboratory (Eurofins Nutrition Analysis Center). The remaining fiber mix is packaged into sachets and kept at 4° C. and 60-70% humidity for long-term storage. In some embodiments, the fiber mix is stable for at least 1 year at room temperature.

The fiber mix described herein comprises fibers of a diverse range of physicochemical structures that effectively promote members of the foundation guild to increase SCFA production. The diverse range of physicochemical structures confers to the fiber the ability to promote the foundation guild of microbes despite a myriad of expected differences in guild members across individuals. The foundation guild of gut bacteria is able to utilize nondigestible but fermentable carbohydrates and become predominant in the gut ecosystem as the foundation of a healthy gut microbiota. The foundation guild of gut bacteria provides SCFAs, including but not limited to acetic acid, butyric acid and propionate, that supports human health. In some embodiments, the SCFA producers play a structural role in the gut ecosystem by producing SCFAs that acidify the gut and create a gut environment unfavorable to pathogenic and detrimental bacteria, producing antimicrobials and occupying available ecological niches (competitive exclusion effect) etc.

Many gut bacteria possess the genetic capacity to ferment carbohydrates but not all of them are equally efficient in generating SCFAs. Gut bacteria also differ in their tolerance to an acidified gut environment. Without being bound to the theory among many gut bacteria that possess the genetic capacity to produce SCFAs, only a select group are active SCFA producers that can form an interactive group (e.g. via cross-feeding or other mechanisms) that collectively function as a "guild" to ferment carbohydrates and generate SCFAs. This guild of SCFA producers can be regarded as the foundation for a healthy gut microbiota. In some embodiments, the microbiota can be profiled using 16S rRNA amplicon sequencing targeting one or a few of the variable regions such as V4, V3-V4 or the full-length gene. The microbiota can also be profiled based on shotgun metagenomics.

The fiber mix is primarily intended to be consumed as a supplement (e.g., mixed with water and consumed as a drink) or it may be incorporated into daily food (e.g., as a substitute for conventional flour) to restore and/or maintain a gut microbiota that supports human health. For example, the fiber mix can be consumed as smoothies, baking products, as substitution of part of flours In each and every embodiment of administering a fiber mix formulation described herein, the fiber mix formulation may be administered or consumed as a single combined unit comprising all of the components or as multiple units, wherein each of the units comprises at least one of the components of the fiber mix formulation, such that administration/consumption of the multiple units in total provides all of the components of the single combined unit of the fiber mix formulation. For example, the fiber mix formulation may be consumed or administered in multiple units: one unit comprising the bran, one unit comprising the inulin, and one unit comprising the digestion resistant maltodextrin. In another embodiment, the fiber mix formulation may be consumed or administered in multiple units: one unit comprising the bran and the inulin, and one unit comprising the digestion resistant maltodextrin. Additional multiple unit administrations are encompassed herein.

Fiber mix formulations described herein are suitable for the general population. In an embodiment, fiber mix formulations described herein may be administered to healthy individuals who want to maintain healthy gut microbiota. In another embodiment, fiber mix formulations described herein are administered to individuals in need thereof who have dysbiosis of gut microbiota or who are at risk for dysbiosis of gut microbiota.

Other aspects of the present disclosure relate to methods for promoting a healthy gut microbiome in a subject in need thereof, the method comprising enterally administering to the subject an effective amount of the formulation comprising a mixture of bran, inulin, and digestion resistant maltodextrin, wherein the bran consists essentially of corn bran, wheat bran, sorghum bran, and oat bran, wherein the mixture has a ratio of dietary fibers from bran:dietary fibers from inulin:dietary fibers from digestion resistant maltodextrin ranging from about 1:1:1 to about 4:1:1, wherein the inulin is present in a range of 5-10% of total weight of the mixture, and wherein the mixture has a uniform particle size between 150 μm and 300 μm, wherein the effective amount is sufficient to increase proliferation of acetate-producing and butyrate-producing gut bacteria in the subject's gut, thereby promoting the healthy gut microbiome in the subject. In some embodiments, the fiber mix comprises a ratio of dietary fibers from bran:dietary fibers from inulin:dietary fibers from digestion resistant maltodextrin ranging from about 1:1:1 to about 4:1:1, wherein the inulin is present in a range of 7-8% of total weight of the mixture, and wherein the mixture has a uniform particle size between 150 μm and 300 μm, wherein the effective amount is sufficient to increase proliferation of acetate-producing and butyrate-producing gut bacteria in the subject's gut, thereby promoting the healthy gut microbiome in the subject.

In some embodiments, the acetate-producing and butyrate-producing gut bacteria species are classified in a bacterial genus comprising at least one of *Bifidobacterium, Ruminococcus, Eubacterium, Clostridium, Alistipes, Bacteroides, Blautia, Butyricicoccus, Butyricimonas, Collinsella, Coprococcus, Dorea, Eggerthella, Faecalibacterium, Fusicatenibacter, Intestinimonas, Lachnoclostridium, Lachnospiraceae, Megasphaera, Parabacteroides, Paraprevotella, Phascolarctobacterium, Roseburia, Ruminiclostridium*, or *Subdoligranulum*, wherein the acetate-producing and butyrate-producing gut bacteria species are classified in a bacterial family comprising at least one of Acidaminococcaceae, Bacteroidaceae, Bifidobacteriaceae, Clostridiaceae, Clostridiales, Coriobacteriaceae, Eggerthellaceae, Enterobacteriaceae, Erysipelotrichaceae, Lachnospiraceae, Marinifilaceae, Prevotellaceae, Rikenellaceae, Ruminococcaceae, Tannerellaceae, or Veillonellaceae.

In some embodiments, the acetate-producing and butyrate-producing gut bacteria species are detected by 16S rRNA amplicon sequencing targeting one or a few of the variable regions such as V4, V3-V4 or the full-length gene. In some embodiments, the 16S rRNA V4 amplicon sequencing identifies at least one of an amplicon sequence variant (ASV) characteristic of the acetate-producing and butyrate-producing gut bacteria. In some embodiments, each of the ASVs represents a unique bacterial strain or a group of highly similar strains of the acetate-producing and butyrate-producing gut bacteria.

In some embodiments, the subject in need thereof has an imbalance of gut microbiota. In some embodiments, the imbalance of gut microbiota is characterized by low levels of acetate-producing and butyrate-producing gut bacteria. In some embodiments, the low levels of acetate-producing and butyrate-producing gut bacteria are less than 5% of total gut microbiota in the subject in need thereof. In some embodiments, the administering increases the acetate-producing and butyrate-producing gut bacteria.

In some embodiments, the fiber mix formulation comprising a mixture of soluble dietary fiber (SDF) and insoluble dietary fiber (ISDF) with a ratio of ISDF:SDF ranging from about 0.5:1 to about 1:0.5 has synergistic effect on gut microbiota composition, promoting the growth of the acetate- and butyrate-producing bacteria and inhibiting the growth of pathogens and detrimental bacteria. In some embodiments, the fiber mix formulation restores a healthier gut microbiota. In some embodiments, the fiber mix formulation restores a healthier gut microbiota and alleviate symptoms in subjects with various diseases or indications which are known to have a dysbiotic gut microbiota. In some embodiments, the fiber mix formulation alleviate symptoms in patients having obesity, prediabetes, type 2 diabetes, multiple sclerosis, Parkinson disease, Prader-Willi syndrome, or alleviate of side effects of cancer chemotherapy.

In some embodiments, the subject in need thereof has prediabetes. In some embodiments, the subject in need thereof is obese. In some embodiments, the subject in need thereof has type 2 diabetes. In some embodiments, the subject in need thereof has diabetic kidney disease. In some embodiments, the subject in need thereof is obese with respiratory viral infection such as COVID-19. In some embodiments, the subject in need thereof has prediabetes with respiratory viral infection such as COVID-19. In some embodiments, the subject in need thereof is diabetic with respiratory viral infection such as COVID-19.

Overgrowth of pathogens in the gut of diabetic or pre-diabetic patients may drive the more severe form of COVID-19. Such pathogens can contribute to the cytokine storm and sepsis, which are the major causes of mortality in these high-risk patients.

In some embodiments, the subject in need thereof has multiple sclerosis. In some embodiments, the subject in need thereof has multiple sclerosis. In some embodiments, the subject in need thereof has Parkinson disease. In some embodiments, the subject in need thereof has Prader-Willi syndrome.

Figure 2:
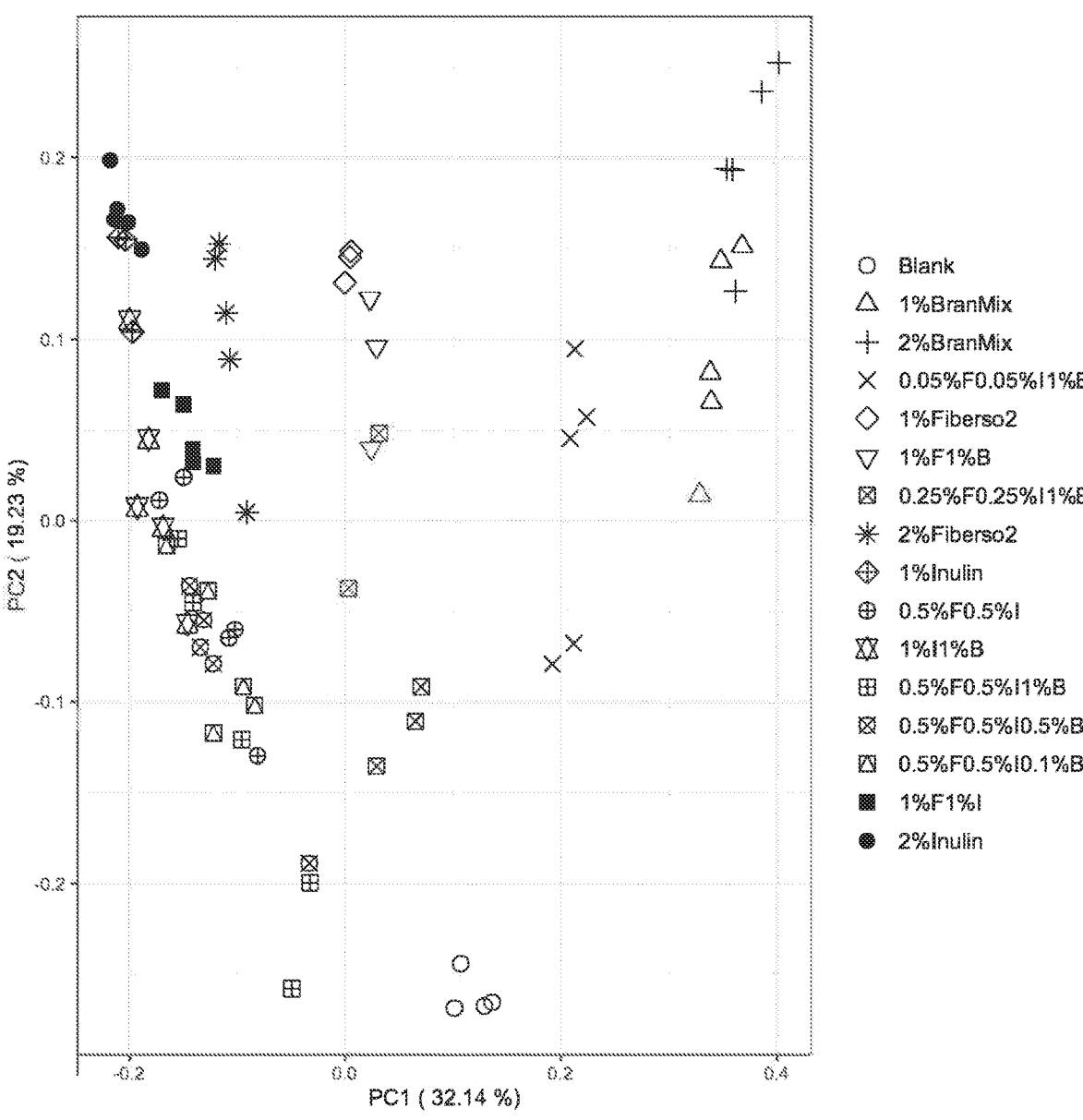
FIG. 2 shows Principal Coordinates Analysis plot of beta diversity at baseline and after 48 h fermentation based on the Bray-Curtis distance. N=3-5/group. Blank is the baseline of fermentation. Other symbols indicate the position of all 15 fiber groups after 48 hours fermentation.

The fiber mix may also be used as a standardized reagent (a supply of fermentable carbohydrates having diverse phys-icochemical structures at known concentrations) in an in vitro system, e.g. in vitro fermentation in FIG. 2, to directly compare the bacterial fermentation capacity of gut micro-biota of different individuals. Such fermentation assays may serve as diagnostic test assays for gut microbiota functions.

Dosage Forms

A dosage unit of a fiber mix formulation described herein may be mixed together or combined such that ionic or covalent bonds are formed between and/or among compo-nents of the formulation. The fiber mix formulation described herein may be administered enterally (e.g., via oral or rectal route), using dosage forms known to those of ordinary skill in the pharmaceutical arts. Depending on the particular location or method of delivery, different dosage forms, e.g., tablets, capsules, pills, powders, granules, elix-irs, tinctures, suspensions, syrups, and emulsions may be used to provide the fiber mix formulation described herein to a patient in need of thereof. The fiber mix formulation described herein may also be administered as a salt form of any one of the components described herein.

A fiber mix formulation described herein can be admin-istered in admixture with suitable pharmaceutical salts, buffers, diluents, extenders, excipients and/or carriers (col-lectively referred to herein as a pharmaceutically acceptable carrier or carrier materials) selected based on the intended form of administration and conventional pharmaceutical practice. Depending on the mode of administration, the fiber mix formulation described herein may be formulated to provide, e.g., maximum and/or consistent dosing for oral or rectal administration. While the fiber mix formulation described herein may be administered alone, it will gener-ally be provided in a stable salt form mixed with a pharma-ceutically acceptable carrier. The carrier may be solid or liquid, depending on the type and/or location of administra-tion selected.

Techniques and compositions for making useful dosage forms a fiber mix formulation described herein are described in one or more of the following references: Anderson, Philip O.; Knoben, James E.; Troutman, William G, eds., Hand-book of Clinical Drug Data, Tenth Edition, McGraw-Hill, 2002; Pratt and Taylor, eds., Principles of Drug Action, Third Edition, Churchill Livingston, New York, 1990; Katzung, ed., Basic and Clinical Pharmacology, Ninth Edi-tion, McGraw Hill, 2007; Goodman and Gilman, eds., The Pharmacological Basis of Therapeutics, Tenth Edition, McGraw Hill, 2001; Remington's Pharmaceutical Sciences, 20th Ed., Lippincott Williams & Wilkins, 2000; Martindale, The Extra Pharmacopoeia, Thirty-Second Edition (The Pharmaceutical Press, London, 1999); each of which is incorporated herein by reference in its entirety.

For example, the fiber mix formulation described herein may be included in a tablet. Tablets may contain, e.g., suitable binders, lubricants, disintegrating agents, coloring agents, flavoring agents, flow-inducing agents and/or melt-ing agents. For example, oral administration may be in a dosage unit form of a tablet, gel cap, caplet or capsule, wherein the active drug component is combined with a non-toxic, pharmaceutically acceptable, inert carrier such as lactose, gelatin, agar, starch, sucrose, glucose, methyl cel-lulose, magnesium stearate, dicalcium phosphate, calcium sulfate, mannitol, sorbitol, mixtures thereof, and the like. Suitable binders for use with the fiber mix formulation described herein include: starch, gelatin, natural sugars (e.g., glucose or beta-lactose), corn sweeteners, carboxymethyl-cellulose, polyethylene glycol, waxes, and the like. Lubri-cants for use with the fiber mix formulation described herein may include: sodium oleate, sodium stearate, magnesium stearate, sodium benzoate, sodium acetate, sodium chloride, mixtures thereof, and the like. Disintegrators may include: starch, methylcellulose, agar, bentonite, mixtures thereof, and the like.

The fiber mix formulation described herein may be administered in the form of liposome delivery systems, e.g., small unilamellar vesicles, large unilamellar vesicles, and multilamellar vesicles, whether charged or uncharged. Lipo-somes may include one or more: phospholipids (e.g., cho-lesterol), stearylamine and/or phosphatidylcholines, mix-tures thereof, and the like.

The fiber mix formulation described herein may also be coupled to one or more soluble, biodegradable, bioaccept-able polymers as drug carriers or as a prodrug. Such poly-mers may include: polyvinylpyrrolidone, pyran copolymer, Poly(N-(2-hydroxypropyl) methacrylamide)-phenol, poly-hydroxyethylasparta-midephenol, or polyethyleneoxide-polylysine substituted with palmitoyl residues, mixtures thereof, and the like. Furthermore, the fiber mix formulation described herein may be coupled one or more biodegradable polymers to achieve controlled release of the fiber mix formulation described herein. Biodegradable polymers for use with the fiber mix formulation described herein include: polylactic acid, polyglycolic acid, copolymers of polylactic and polyglycolic acid, polyepsilon caprolactone, polyhy-droxy butyric acid, polyorthoesters, polyacetals, polydihy-dropyrans, polycyanoacylates, and crosslinked or amphip-athic block copolymers of hydrogels, mixtures thereof, and the like.

In one embodiment, gelatin capsules (gel caps) may include the fiber mix formulation described herein and powdered carriers, such as lactose, starch, cellulose deriva-tives, magnesium stearate, stearic acid, and the like. Like diluents may be used to make compressed tablets. Both tablets and capsules may be manufactured as immediate-release, mixed-release or sustained-release formulations to provide for a range of release of the fiber mix formulation described herein over a period of minutes to hours. Com-pressed tablets may be sugar coated or film coated to mask any unpleasant taste and protect the tablet from the atmo-sphere. An enteric coating may be used to provide selective disintegration in, e.g., the gastrointestinal tract.

For oral administration in a liquid dosage form, compo-nents of the fiber mix formulation described herein may be combined with any oral, non-toxic, pharmaceutically acceptable inert carrier such as ethanol, glycerol, water, and the like. Examples of suitable liquid dosage forms include solutions or suspensions in water, pharmaceutically acceptable fats and oils, alcohols or other organic solvents, including esters, emulsions, syrups or elixirs, suspensions, solutions and/or suspensions reconstituted from non-effervescent granules and effervescent preparations reconstituted from effervescent granules. Such liquid dosage forms may contain, for example, suitable solvents, preservatives, emulsifying agents, suspending agents, diluents, sweeteners, thickeners, and melting agents, mixtures thereof, and the like.

Liquid dosage forms of the fiber mix formulation described herein for oral administration may also include coloring and flavoring agents that increase patient tolerance of the formulation and therefore, promote compliance with a dosing regimen. In general, water, a suitable oil, saline, aqueous dextrose (e.g., glucose, lactose and related sugar solutions) and glycols (e.g., propylene glycol or polyethylene glycols) may be used as suitable carriers for parenteral solutions. Solutions for parenteral administration include generally, a water-soluble salt of the active ingredient, suitable stabilizing agents, and if necessary, buffering salts. Antioxidizing agents such as sodium bisulfite, sodium sulfite and/or ascorbic acid, either alone or in combination, are suitable stabilizing agents. Citric acid and its salts and sodium EDTA may also be included to increase stability. In addition, parenteral solutions may include pharmaceutically acceptable preservatives, e.g., benzalkonium chloride, methyl- or propyl-paraben, and/or chlorobutanol. Suitable pharmaceutical carriers are described in Remington's Pharmaceutical Sciences, Mack Publishing Company, a standard reference text in this field, relevant portions incorporated herein by reference.

Capsules. Capsules may, for example, be prepared by filling standard two-piece hard gelatin capsules each with the fiber mix formulation described herein, 10 to 500 milligrams of powdered active ingredient, 5 to 150 milligrams of lactose, 5 to 50 milligrams of cellulose and 6 milligrams magnesium stearate.

Soft Gelatin Capsules. A mixture of active ingredients (the fiber mix formulation described herein) is dissolved in a digestible oil such as soybean oil, cottonseed oil or olive oil. The active ingredient is prepared and injected by using a positive displacement pump into gelatin to form soft gelatin capsules containing, e.g., 10-500 milligrams of the active ingredient. The capsules are washed and dried.

Tablets. Tablets are prepared in bulk by conventional procedures so that the dosage unit may, for example, be 100-1,500 milligrams of the fiber mix formulation described herein, 0.2 milligrams of colloidal silicon dioxide, 5 milligrams of magnesium stearate, 50-275 milligrams of microcrystalline cellulose, 11 milligrams of starch and 98.8 milligrams of lactose. Appropriate coatings may be applied to increase palatability or delay absorption.

To provide an effervescent tablet with the fiber mix formulation described herein, appropriate amounts of, e.g., monosodium citrate and sodium bicarbonate, are blended together and then roller compacted, in the absence of water, to form flakes that are then crushed to give granulates. The granulates are then combined with the active ingredient, drug and/or salt thereof, conventional beading or filling agents and, optionally, sweeteners, flavors and lubricants.

Suspension. An aqueous suspension is prepared for oral administration so that each 5 ml contain 100 mg of finely divided active ingredients (fiber mix formulation described herein), 200 mg of sodium carboxymethyl cellulose, 5 mg of sodium benzoate, 1.0 g of sorbitol solution, U.S.P., and 0.025 ml of vanillin.

For mini-tablets, the fiber mix formulation described herein is compressed into a hardness in the range 6 to 12 Kp. The hardness of the final tablets is influenced by the linear roller compaction strength used in preparing the granules or granulates, which are influenced by the particle size of, e.g., the monosodium hydrogen carbonate and sodium hydrogen carbonate. For smaller particle sizes, a linear roller compaction strength of about 15 to 20 KN/cm may be used.

Examples of suitable oral dosage forms include solutions or suspensions in water, pharmaceutically acceptable fats and oils, alcohols or other organic solvents, including esters, emulsions, syrups or elixirs, suspensions, solutions and/or suspensions reconstituted from non-effervescent granules and effervescent preparations reconstituted from effervescent granules. Such liquid dosage forms may contain, for example, suitable solvents, preservatives, emulsifying agents, suspending agents, diluents, sweeteners, thickeners, and melting agents. Oral dosage forms optionally contain flavorants and coloring agents. Parenteral forms may also include minerals and other materials to make them compatible with the delivery system chosen.

The composition of the fiber mix formulation described herein may be formulated for release that is immediate, rapid, extended, bi-phasic, etc. By "immediate release" is meant a release of an active agent to an environment over a period of seconds to no more than about 30 minutes once release has begun and release begins within no more than about 2 minutes after administration. An immediate release does not exhibit a significant delay in the release of drug. By "rapid release" is meant a release of an active agent to an environment over a period of 1-59 minutes or 0.1 minute to three hours once release has begun and release can begin within a few minutes after administration or after expiration of a delay period (lag time) after administration. As used herein, the term "extended release" profile assumes the definition as widely recognized in the art of pharmaceutical sciences. An extended release dosage form will release drug at substantially constant rate over an extended period of time or a substantially constant amount of drug will be released incrementally over an extended period of time. An extended release tablet generally effects at least a two-fold reduction in dosing frequency as compared to the drug presented in a conventional dosage form (e.g., a solution or rapid releasing conventional solid dosage forms). By "controlled release" is meant a release of an active agent to an environment over a period of about eight hours up to about 12 hours, 16 hours, 18 hours, 20 hours, a day, or more than a day. By "sustained release" is meant an extended release of an active agent to maintain a constant drug level in the blood or target tissue of a subject to which the device is administered. The term "controlled release", as regards to drug release, includes the terms "extended release", "prolonged release", "sustained release", or "slow release", as these terms are used in the pharmaceutical sciences. A controlled release can begin within a few minutes after administration or after expiration of a delay period (lag time) after administration.

A slow release dosage form is one that provides a slow rate of release of drug so that drug is released slowly and approximately continuously over a period of 3 hours, 6 hours, 12 hours, 18 hours, a day, 2 or more days, a week, or 2 or more weeks, for example.

A timed-release dosage form is one that begins to release drug after a predetermined period of time as measured from the moment of initial exposure to the environment of use.

A targeted release dosage form generally refers to an oral dosage form that designed to deliver the fiber mix formulation described herein to a particular portion of the gastrointestinal tract of a subject. An exemplary targeted dosage form is an enteric dosage form that delivers a drug into the middle to lower intestinal tract but not into the stomach or mouth of the subject. Other targeted dosage forms can deliver to other sections of the gastrointestinal tract such as the stomach, jejunum, ileum, duodenum, cecum, large intestine, small intestine, colon, or rectum.

In some embodiments, the fiber mix formulation is mixed with aqueous solution. In some embodiments, an effective amount of the fiber mix formulation is mixed with an aqueous solution. For example, the fiber mix formulation can be prepared by mixing 30 g of fiber mix in 500 ml of water. In some embodiments, the 30 g of fiber mix comprises about 11 g of dietary fiber.

In some embodiments, the formulation described herein can be taken at about 60 grams/day with no adverse gut reaction. In some embodiments, the formulation can be administered to a subject in need thereof in a dosage that ranges from about 1 g to about 120 g/day without adverse gut reaction. In some embodiments, the formulation described herein can be taken at about 30-120 grams, about 30-90 grams, about 30-60 grams, about 30-50 grams or about 30 to 40 grams/day with no adverse gut reaction.

In some embodiments, the effective amount of the formulation comprises about 10 to 50 grams of dietary fiber per day. In some embodiments, the effective amount of the formulation comprises about 10 to 120 grams of dietary fiber per day. In some embodiments, the effective amount of the formulation comprises 11 to 44 grams of dietary fiber per day. For example, the effective amount of the formulation comprises 11 grams of dietary fiber per day, 22 grams of dietary fiber per day, 33 grams of dietary fiber per day or 44 grams of dietary fiber per day. In some embodiments, the effective amount of the formulation comprises 10, 20, 30, 40, 50, 60, 70, 80, 90, 100, 110, 120 or more grams of fiber per day.

In some embodiments, the method comprises administering orally to a subject in need thereof an effective amount of the formulation once a day, twice a day, three times a day, four times a day. In some embodiments, the method comprises administering the formulation orally to a subject in need thereof four times a day. For example, the method comprises administering the formulation orally to a subject in need thereof before each main meal and 2 hours after dinner.

In some embodiments, administration results in the reduction of pathogens in the gut. For example, administration results in the reduction of pathogens by at least 10%, 20%, 30%, 40%, 50%, 60%, 70%, 80%, 90% or more. In some embodiments, administration results in the reduction of pathogens in the gut to non-detectable levels. In some embodiments, administration results in the reduction of levels of inflammation. In some embodiments, administration results in the reduction of risk of bacterial sepsis.

EXAMPLES

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

Example 1—Process of Making Fiber Mix

The components include wheat bran, oat bran, corn bran, sorghum bran, inulin, Fibersol-2® and xanthan gum.

An exemplary batch of the insoluble component of the fiber mix (the bran mix) comprising oat bran, corn bran, sorghum bran and wheat bran at the ratios listed in Table 3 was made.

TABLE 3

| Bran mix composition. | |
|---|---|
| Ingredient | Weight [%] |
| Oat bran | 51.9 |
| Corn bran | 13.3 |
| *Sorghum* bran | 19.4 |
| Wheat bran | 15.4 |

The bran mix was sent to Safe Sterilization USA for mixing, milling and roasting as described above. In some embodiments, the wheat bran, oat bran, corn bran and sorghum bran are in the form of powder or flakes. In some embodiments, the wheat bran, oat bran, corn bran and sorghum bran sieved to remove brans of particle size lower than 150 μm or greater than 300 μm.

Samples of the wheat bran, oat bran, corn bran and sorghum bran can be processed and sieved to confirm that the particular size is from 150-300 μm.

Thereafter, inulin, Fibersol-2® and xanthan gum were added to the bran mix at a final percentage of 7.5, 7.5 and 4% (w/w).

In some embodiments, inulin, Fibersol-2® and xanthan gum is in the form of powder.

The wheat bran, oat bran, corn bran and sorghum bran are mixed so that each bran contributes to the same amount of dietary fibers. This bran mix is then combined with inulin and Fibersol-2® so that the ratio of dietary fiber from bran mix to that of inulin and that of Fibersol-2 is 4:1:1. Finally, xanthan gum is added to achieve a total percentage of 4% (w/w).

The percentage (w/w) of each component of the fiber mix is: oat bran 42.0%, sorghum bran 15.8%, wheat bran 12.5%, corn bran 10.8%, inulin 7.5%, Fibersol-2® 7.5% and xanthan gum 4.0% as shown in Table 2.

Oat bran, sorghum bran, what bran and corn bran are first mixed at the specified ratios. This bran mixture is milled to yield a uniform particle size between 150 and 300 μm, mixed with inulin and Fibersol-2® at specified ratios, xanthan gum is added at a percentage of 4% (w/w), and finally roasted at 135° C. for 5 minutes for sterilization. NBT-NM108 is then packaged into heat-sealed foil sachets and kept at 4° C. and 60-70% humidity for long-term storage.

Nutrient profile (including total dietary fiber content) of each ingredient and the final product can be determined by an ISO 17025 accredited food nutritional laboratory (Eurofins Nutrition Analysis Center).

Microbial load, stability and shelf life of each ingredient can be determined by an ISO 17025 accredited food nutritional laboratory.

Example 2 Fermentation Characteristics

To explore the fermentation characteristics of different fiber combinations and their interactions with intestinal microbiota, 15 different fiber formulas were fermented in vitro with human fecal samples from a healthy donor for 48 hours anaerobically. These fibers formulas are soluble dietary fibers (SDFs) and insoluble dietary fibers (ISDF) s combined at different ratios (Table 4). SDFs were exemplified by Inulin and Fibersol-2®; and ISDFs by a bran mix (fiber content ratio of corn bran:sorghum bran:oat bran: wheat bran=1:1:1:1).

In Vitro Culture Setup

The direct effect of the fiber mix composition on the human gut microbiota was determined using in vitro fermentation. Human fecal material (within 2 h of collection) was suspended in phosphate-buffered saline (PBS)-based medium (Table 5) in a 1:3 ratio (w/v). The suspension was then mixed in a 1:4 ratio with a PBS-based fiber solution with each fiber mixture (Table 4) at 37° C. for 6, 12, 24, and 48 hours under anaerobic conditions. The final concentration of bran mixture (w/v) is shown in Table 4. This system was set up as triplicates or quintuplicate.

Prior to culture, the bran mix was pre-treated with digestive enzymes (pepsin, amyloglucosidase and pancreatin) and dialyzed to mimic the digestion and absorption of macronutrients in the human gastrointestinal system.

TABLE 4

Composition of the 15 Fiber formulas.

| SDF vs ISDF | Composition | Inulin (I) weight [%] * | Fibersol-2 ® (F) weight [%] * | Bran mix (B) weight [%] * |
|---|---|---|---|---|
| SDF:ISDF = 1:0 | 1% Inulin | 1 | 0 | 0 |
| SDF:ISDF = 2:0 | 2% Inulin | 2 | 0 | 0 |
| SDF:ISDF = 1:0 | 1% Fibersol-2 ® | 0 | 1 | 0 |
| SDF:ISDF = 2:0 | 2% Fibersol-2 ® | 0 | 2 | 0 |
| SDF:ISDF = 0:1 | 1% BranMix | 0 | 0 | 1 |
| SDF:ISDF = 0:2 | 2% BranMix | 0 | 0 | 2 |
| SDF:ISDF = 1:1 | 1% F 1% B | 0 | 1 | 1 |
| SDF:ISDF = 1:1 | 1% I 1% B | 1 | 0 | 1 |
| SDF:SDF = 0.5:0.5 | 0.5% F 0.5% I | 0.5 | 0.5 | 0 |
| SDF:SDF = 1:1 | 1% F 1% I | 1 | 1 | 0 |
| SDF:ISDF = 1:1 | 0.5% F 0.5% I 1% B | 0.5 | 0.5 | 1 |
| SDF:ISDF = 0.5:1 | 0.25% F 0.25% I 1% B | 0.25 | 0.25 | 1 |
| SDF:ISDF = 0.1:1 | 0.05% F 0.05% I 1% B | 0.05 | 0.05 | 1 |
| SDF:ISDF = 1:0.5 | 0.5% F 0.5% I 0.5% B | 0.5 | 0.5 | 0.5 |
| SDF:ISDF = 1:0.1 | 0.5% F 0.5% I 0.1% B | 0.5 | 0.5 | 0.1 |

* The weight percentage is the weight of these fibers in the fermentation system [w/v].

TABLE 5

PBS medium (1000 ml).

| Ingredient | amount |
|---|---|
| PBS tablet | 5 tablets |
| L-cysteine HCl | 0.5 g |
| Sodium 2-Mercaptoethanesulfonate | 0.5 g |
| Resazurin (1 mg/ml) | 1 ml |
| Final pH = 7.2 ± 0.2 | |

Fermenta samples, gas production, and pH data were collected or measured at the baseline and different timepoints of fermentation. These fermenta samples were sequenced for 16S rRNA gene V4 region with Ion torrent platform. All samples were downsized to 20,000 reads. 1499 ASVs were retained for analysis. Each ASV represent a unique type of gut bacteria. Taxonomic position of each ASV was assigned at different levels depending on the novelty of these sequences.

Fermentation with the mix of ISDFs with SDFs had higher gas production than those with same concentration of SDF Gas production of all 15 different fiber formulas were recorded after 48 hours fermentation (Table 6). Gas production may reflect the fermentability of fibers and their formula. Inulin fermentation produced more gas than Fibersol-2®, indicating that inulin may be a fast fermentable SDF while Fibersol-2® a slow fermentable SDF. Both SDFs produce more gas than the ISDF, bran mix, indicating that SDF are more fermentable than ISDFs. 1% F1% I and 2% Inulin produce less gas than 1% Inulin, which is probably due to the low pH induced by these two fibers formula that inhibit the survival or growth of gas-producing bacteria (Table 7).

Table 6 shows the gas production after 48 h fermentation with different fibers. Tukey test were used for gas production comparison. Significance difference were shown in letters. Blank is fermentation with only fecal sample, no fiber is added in the Blank group.

TABLE 6

| Treatment | Gas production/ml | Statistical significance* |
|---|---|---|
| 1% I 1% B | 15.0 ± 0.00 | h |
| 1% Inulin | 11.44 ± 0.12 | f |
| 0.5% F 0.5% I 1% B | 11.44 ± 0.12 | f |
| 0.5% F 0.5% I 0.5% B | 10.86 ± 0.20 | e |
| 1% F 1% I | 10.54 ± 0.26 | de |
| 0.5% F 0.5% I 0.1% B | 10.16 ± 0.32 | bd |
| 2% Fibersol-2 ® | 10.1 ± 0.2 | b |
| 1% F 1% B | 10.04 ± 0.08 | b |
| 0.5% F 0.5% I | 9.96 ± 0.08 | bc |
| 2% Inulin | 9.56 ± 0.12 | c |
| 1% Fibersol-2 ® | 7.44 ± 0.12 | a |
| 0.25% F 0.25% I 1% B | 7.2 ± 0.24 | a |
| 0.05% F 0.05% I 1% B | 4.96 ± 0.15 | k |
| 2% BranMix | 3.74 ± 0.12 | i |
| 1% BranMix | 3.00 ± 0.13 | g |
| Blank | 1.62 ± 0.15 | j |

*P < 0.05. If groups have same letters, it means there is no significant difference between these two groups. E.g. 1% Inulin and 0.5% F 0.5% I 1% B groups both have f, which means there is no significant difference in their gas production results The combination of ISDFs with SDFs had higher gas production than the same concentration of SDF, which shows a synergistic fermentation effect between SDFs and ISDFs. For example, produced gas volume: 1% 11% B>2% Inulin; 1% F1% B≈2% Fibersol2®; 0.5% F0.5%11% B>1% F1% I. But fiber with low ISDF/SDF ratio did not show such promotion. For example, 0.5% F0.5%10.1% B group produced similar gas with 0.5% F0.5% I.

Fermentation with SDF Produce More Acids than Those with Same Concentration of ISDF pH was reported to be able to regulate the fermentation mode (Mohd-Zaki, Z., et al., Influence of pH Regulation Mode in Glucose Fermentation on Product Selection and Process Stability. Microorganisms, 2016. 4(1): p. 2.). At high pH, propionate type fermentation is the main process, producing propionate and acetate without any substantial gas production. When the pH decrease, the fermentation type may shift to butyrate-type or ethanol-type fermentation, producing butyrate or ethanol and acetate with hydrogen and carbon-dioxide as by-products. pH data at baseline and the endpoint of the fermentation are reported in Table 7. SDFs decreased pH more significantly than ISDFs. Regarding SDF, inulin decreased pH more significantly than Fibersol-2®. The gas production and pH data combined, 2% Inulin produced less gas than 1% Inulin, which may be because the lower pH of 2% Inulin group, 3.78±0.02, is inhibitory to many gas-producing bacteria. The growth and survival of some gas-producing bacteria may be prevented or reduced in such low pH and couldn't produce more gas as 1% Inulin group. Fibersol-2® produced less acid and gas compared to inulin, which is also consistent with previous study (lickinger, E. A., et al., Glucose-Based Oligosaccharides Exhibit Different In Vitro Fermentation Patterns and Affect In Vivo Apparent Nutrient Digestibility and Microbial Populations in Dogs. The Journal of Nutrition, 2000. 130(5): p. 1267-1273). The formula which combined ISDF with SDF optimized pH so that more fermentation can take place as indicated by high amount of gas production.

Table 7 shows the pH at baseline and the endpoint of fermentation with different fibers. Wilcoxon test were used to compare the pH before and after fermentation. Asterisk indicate the significant difference between before (Time 0 h) and after fermentation (Time 48 h). ** P<0.01. Tukey test were used for pH comparison among all treatments at baseline or after 48 hours fermentation. There is no significance difference among pH of 16 groups before fermentation. Significance difference among pH of 16 groups after fermentation were shown in letters.

TABLE 7

| Treatments | pH_0 h | pH_48 h | Statistical significance | |
|---|---|---|---|---|
| 2% Inulin | 6.75 ± 0.04 | 3.79 ± 0.02 | i | ** |
| 1% F 1% I | 6.99 ± 0.01 | 4.26 ± 0.05 | f | ** |
| 1% Inulin | 6.81 ± 0.04 | 4.6 ± 0.07 | g | ** |
| 1% I 1% B | 6.69 ± 0.04 | 4.61 ± 0.03 | g | ** |
| 2% Fiberso2 | 6.74 ± 0.01 | 4.67 ± 0.02 | g | ** |
| 1% Fiberso2 | 6.75 ± 0.01 | 4.78 ± 0.04 | d | ** |
| 1% F 1% B | 6.65 ± 0.06 | 4.82 ± 0.07 | bd | ** |
| 0.5% F 0.5% I | 7 ± 0.01 | 4.85 ± 0.04 | bcd | ** |
| 0.5% F 0.5% I 0.1% B | 6.85 ± 0.03 | 4.89 ± 0.03 | abc | ** |
| 0.5% F 0.5% I 1% B | 6.87 ± 0.03 | 4.91 ± 0.01 | ac | ** |
| 0.5% F 0.5% I 0.5% B | 6.9 ± 0.01 | 4.92 ± 0.01 | ac | ** |
| 0.25% F 0.25% I 1% B | 6.88 ± 0.02 | 4.97 ± 0.02 | a | ** |
| 2% BranMix | 6.5 ± 0.04 | 5.37 ± 0.03 | h | ** |
| 0.05% F 0.05% I 1% B | 6.81 ± 0.02 | 5.44 ± 0.05 | h | ** |
| 1% BranMix | 6.6 ± 0.01 | 5.8 ± 0.04 | e | ** |
| Blank | 6.97 ± 0.03 | 6.81 ± 0.02 | j | ** |

The generation of gas and the change of pH are two primary indicators reflecting the degree of fermentation. Unexpectedly, the inventors found SDF could increase the fermentability of ISDF as indicated by synergistic gas production. Without being bound by the theory, when bacteria are cultured with the mix of SDF and ISDF, some gas producing bacteria grow faster than when they were only cultured with either SDF or ISDF alone. This shows that synergistic effects of the combination of SDFs and ISDFs on fermentation.

Example 3: Fecal Microbiota Composition Change Induced by Fiber Formula

Changes in the microbiota composition were assessed after the fecal microbiota were fermented with different combinations of fibers. In total, 1499 ASVs were identified, which included all the unique bacteria that could be detected in all treatment groups and time points.

The gut microbiota composition showed a significant shift after 48 hours fermentation with all 15 fiber formulas as indicated by principal coordinates analysis (PCoA, multivariate analysis of variance (MANOVA) test) based on Bray-Curtis distance. β-diversity based on the Bray-Curtis distance of ASVs shows that 48 h fermentation with fiber formula induced a shift of microbiota along PC1 compared to baseline samples (FIG. 2). All baseline samples were clustered together with blank group at 48 h. There was a significant clustering by treatment groups for samples from 48 h fermenta along PC1 and these groups are separated based on their fermentability. The slowest fermentable ISDF groups, 1% Bran Mix and 2% Bran Mix, were clustered together and located at the right of the PCoA plot. The microbiota from groups with the faster fermentable SDF and higher amount of SDF shifted toward left along PC1. Groups with inulin located toward the left with 2% Fibersol-2® group at the left of the PCoA plot.

Example 4: Positive or Negative Responders to Fiber Mixtures

Positive and negative responders to different combination of fibers were identified (see Table at FIG. 14).

Principal coordinate analysis (PCoA) was performed to compare and visualize the changing patterns of the pre- and post-fermentation samples based on Bray-Curtis distance. The principal coordinate, along which the pre- and post-fermentation samples can be segregated, was selected for further analysis. Pearson correlation was performed between the abundance of each ASV and the scores of the selected principal coordinate (de Goffau et al. Diabetes, 2013, 62(4): 1238-44). P value was adjusted by Benjamini-Hochberg procedure to control for the false positives that arise from multiple statistical comparisons. The ASVs, which have significant correlations (adjusted P<0.05) with the selected principal coordinate, were identified as responders.

Figure 3:
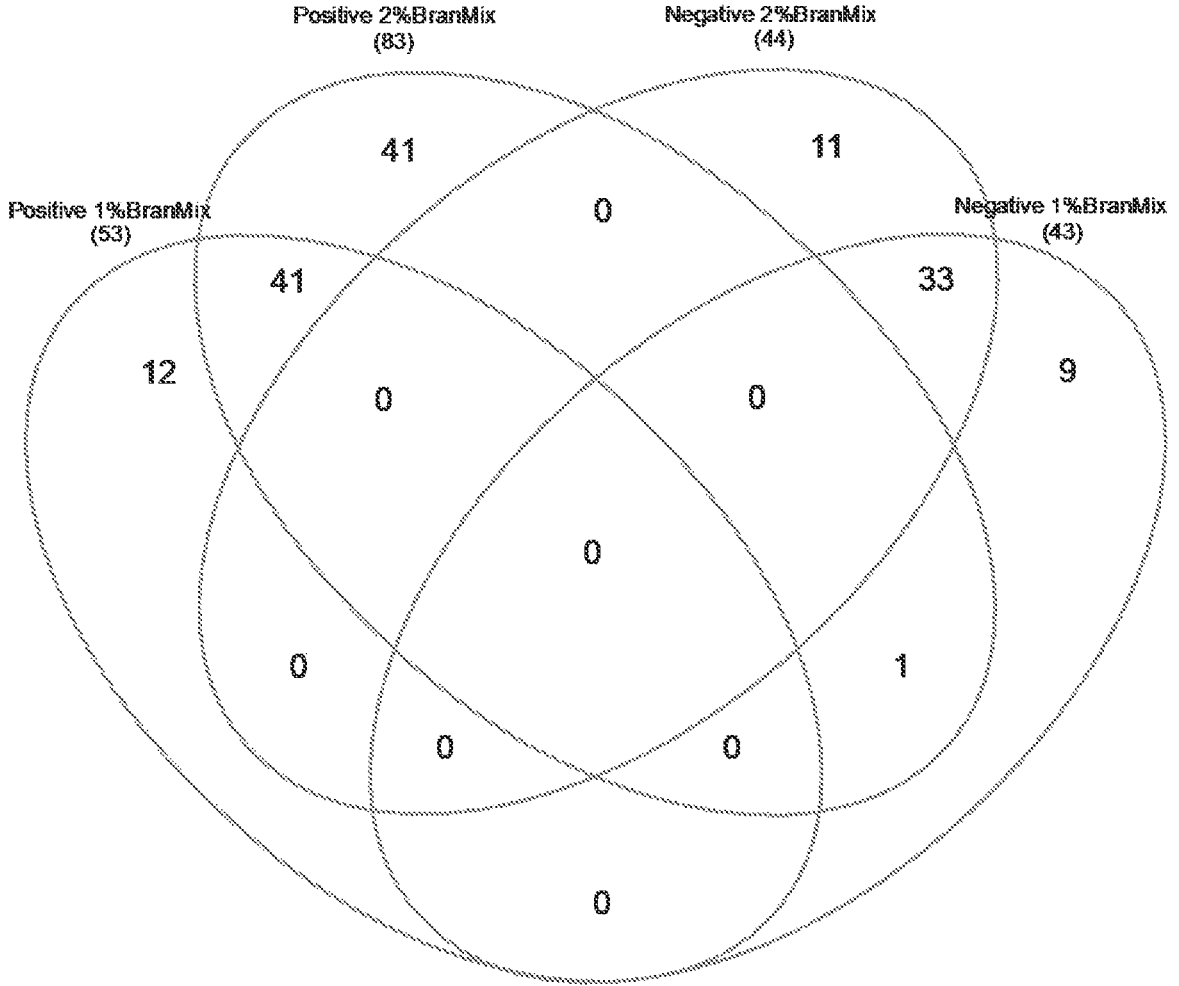
FIG. 3 shows comparison of responders between 1% Bran Mix and 2% Bran Mix in in vitro fermentation.

The fermentation of ISDFs: when cultured with 1% bran mix, 53 ASVs were positive responders and 43 negative responders. In 2% Bran Mix, 83 were positive responders and 44 negative responders. 42 new ASVs responded positively when the bran mix dose was doubled from 1% (FIG. 3). One ASV, Coprococcus ASV004E, is positive responders in 2% Bran Mix but negative responder in 1% Bran Mix. 1% or 2% Bran Mix shared 33 negative responders but both have around 10 unique negative responders (FIG. 3). The data suggests that the relationship between substrate dose and microbiota composition is dynamic rather than a simple linear relationship.

Figure 4:
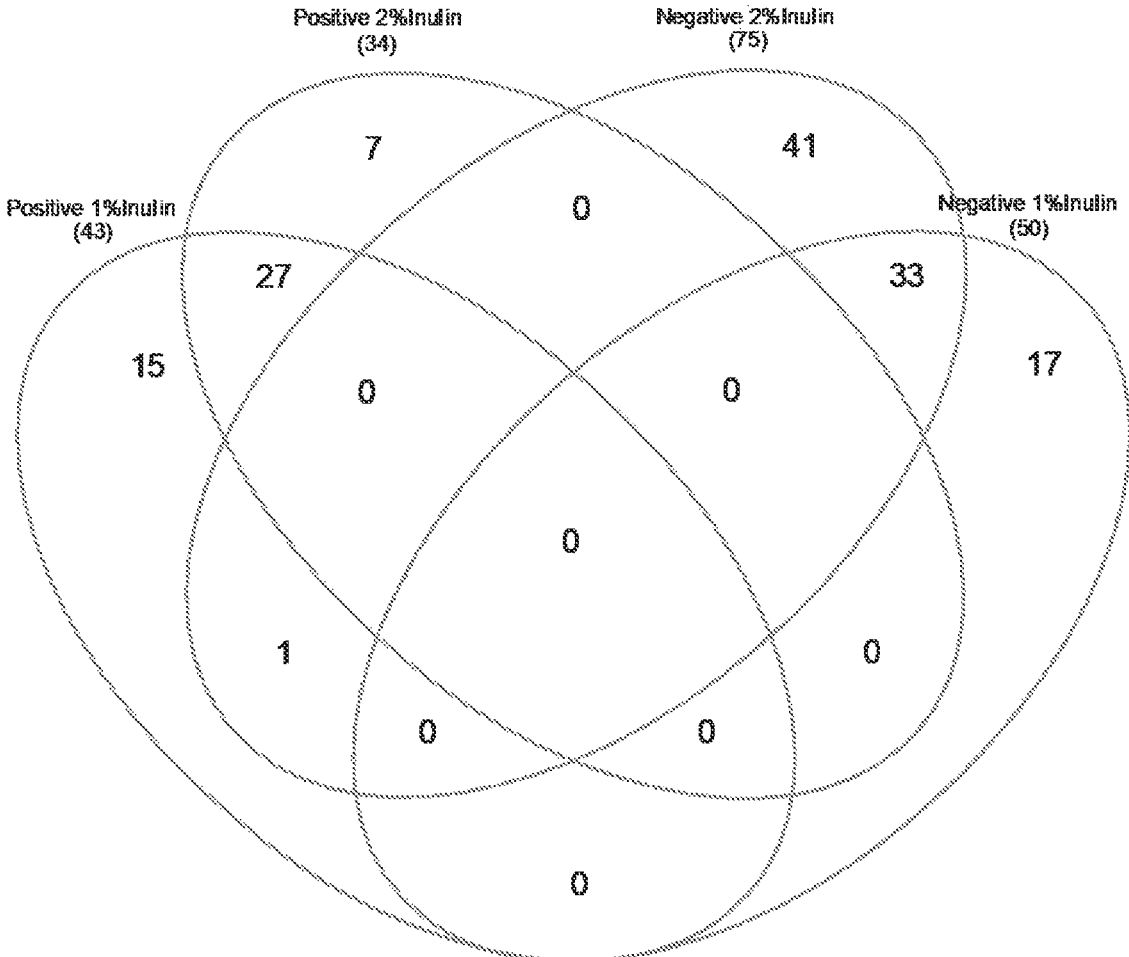
FIG. 4 shows comparison of responders between 1% Inulin and 2% Inulin in in vitro fermentation.

The fermentation of SDFs: increased concentration of inulin reduced the number of positive responding ASVs (43 in 1% vs 34 in 2% inulin) but increase the number of negative responding ASVs (50 in 1% vs 75 in 2% inulin). Among the 43 positive responders in 1% inulin, 15 no longer responded when the inulin dose was doubled (FIG. 4), which is probably because these 15 ASVs couldn't grow well in the lower pH induced by 2% Inulin.

Figure 5:
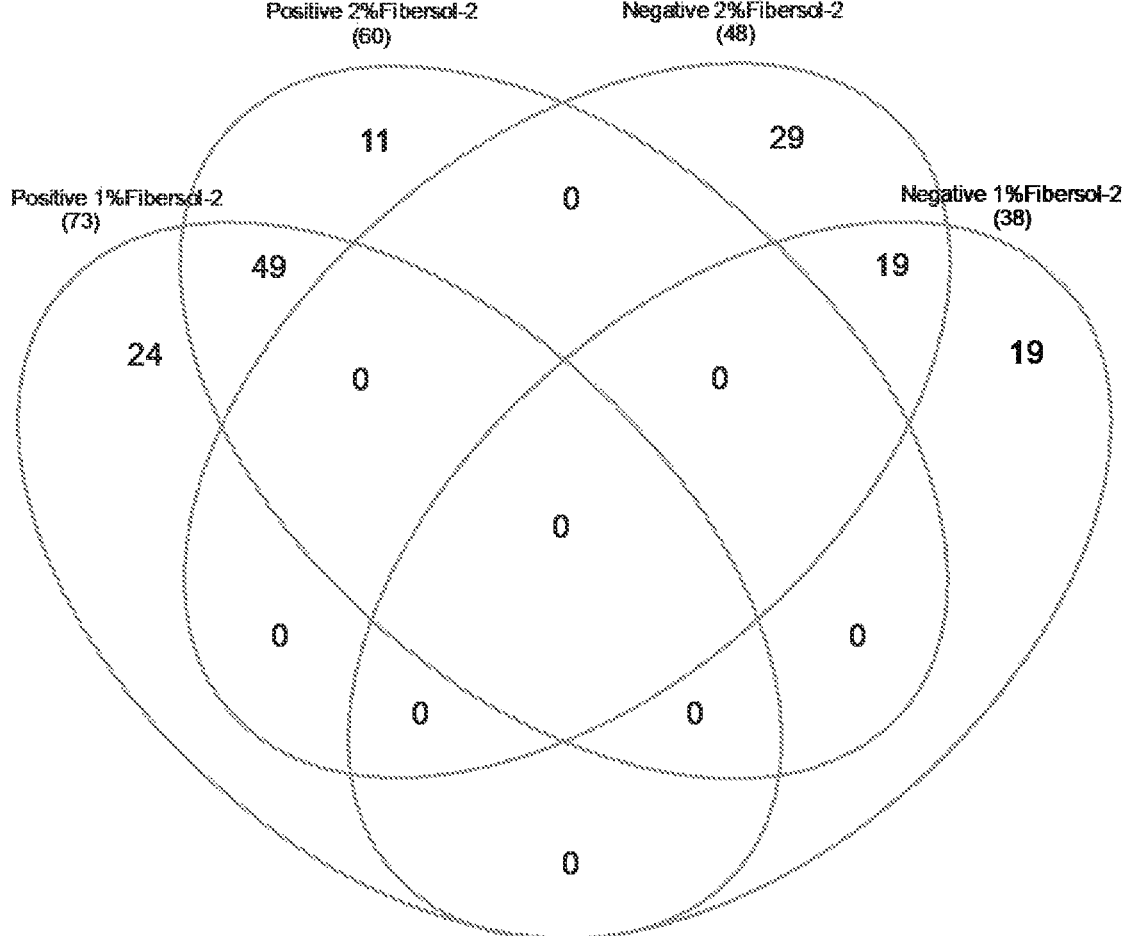
FIG. 5 shows comparison of responders between 1% Fibersol-2® and 2% Fibersol-2® in in vitro fermentation.

Increased concentration of another soluble fiber, Fibersol-2®, also reduced the number of positive responding ASVs (73 in 1% vs 60 in 2% Fibersol-2®; FIG. 5) but increased the number of negative responding ASVs (38 in 1% vs 48 in 2% Fibersol-2®; FIG. 5).

Figure 6:
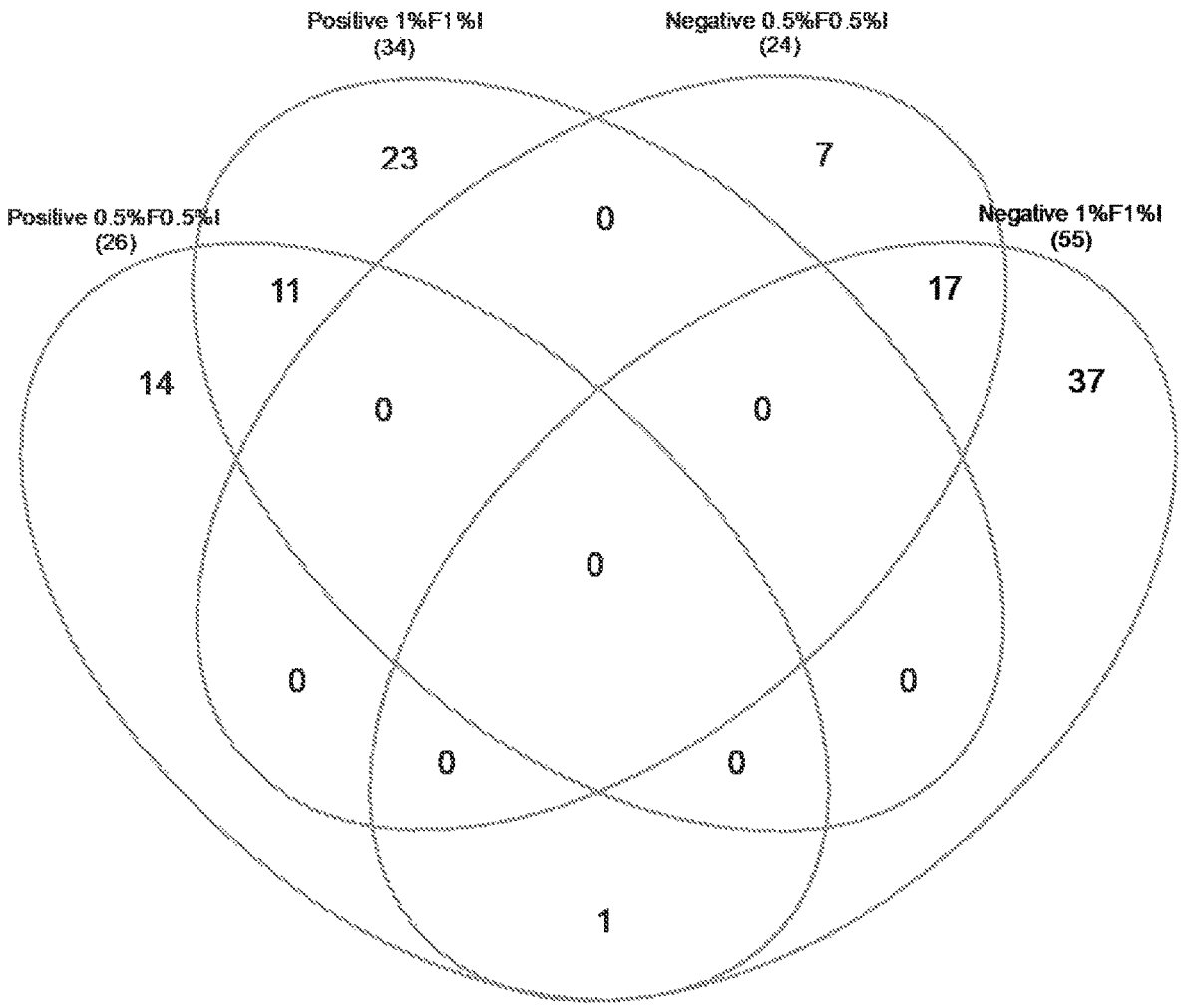
FIG. 6 shows comparison of responders between 0.5% Fibersol-2®: 0.5% Inulin and 1% Fibersol-2®: 1% Inulin in in vitro fermentation.

Different SDFs, inulin and Fibersol-2®, were combined and fermented with fecal microbiota. Increased concentration of SDFs increased the number of positive responding ASVs (26 in 0.5% F0.5% I vs 34 in 1% F1% I; FIG. 6) and the number of negative responding ASVs (24 in 0.5% F0.5% I vs 55 in 1% F1% I; FIG. 6).

Figure 7:
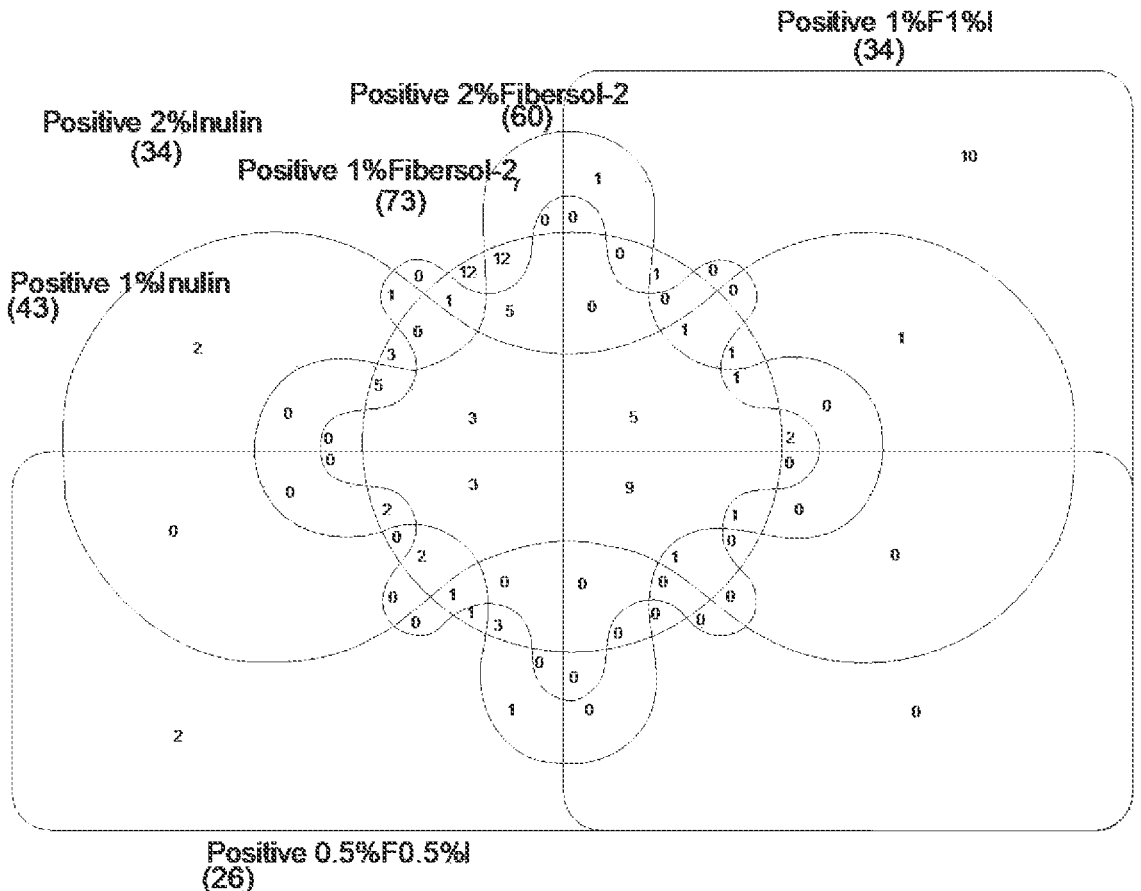
FIG. 7 shows comparison of positive responders among 0.5% Fibersol-2®: 0.5% Inulin, 1% Fibersol-2®: 1% Inulin, 1% Fibersol-2®, 2% Fibersol-2®, 1% Inulin and 2% Inulin groups in in vitro fermentation.

The positive responders from 0.5% Fibersol-2®: 0.5% inulin, 1% Fibersol-2®: 1% inulin, 1% Fibersol-2®, 2% Fibersol-2®, 1% inulin and 2% inulin groups were compared (FIG. 7). The unique 10 positive responders from 1% Fibersol-2®: 1% inulin contain 4 potential butyrate producing bacteria, including *Blautia* ASV005H, *Blautia massiliensis* ASV002F, *Blautia* ASV006C, *Blautia massiliensis* ASV04LB, and one beneficial bacterium, *Bifidobacterium* ASV06TU. The unique 2 positive responders from 0.5% Fibersol-2®: 0.5% inulin contain one beneficial bacterium, *Bifidobacterium* ASV0004.

The data show that the combination the two different SDFs promote more beneficial bacteria compared to single SDF groups. The data show that relationship between substrate dose and microbiota composition is dynamic rather than a simple linear relationship.

Figure 8:
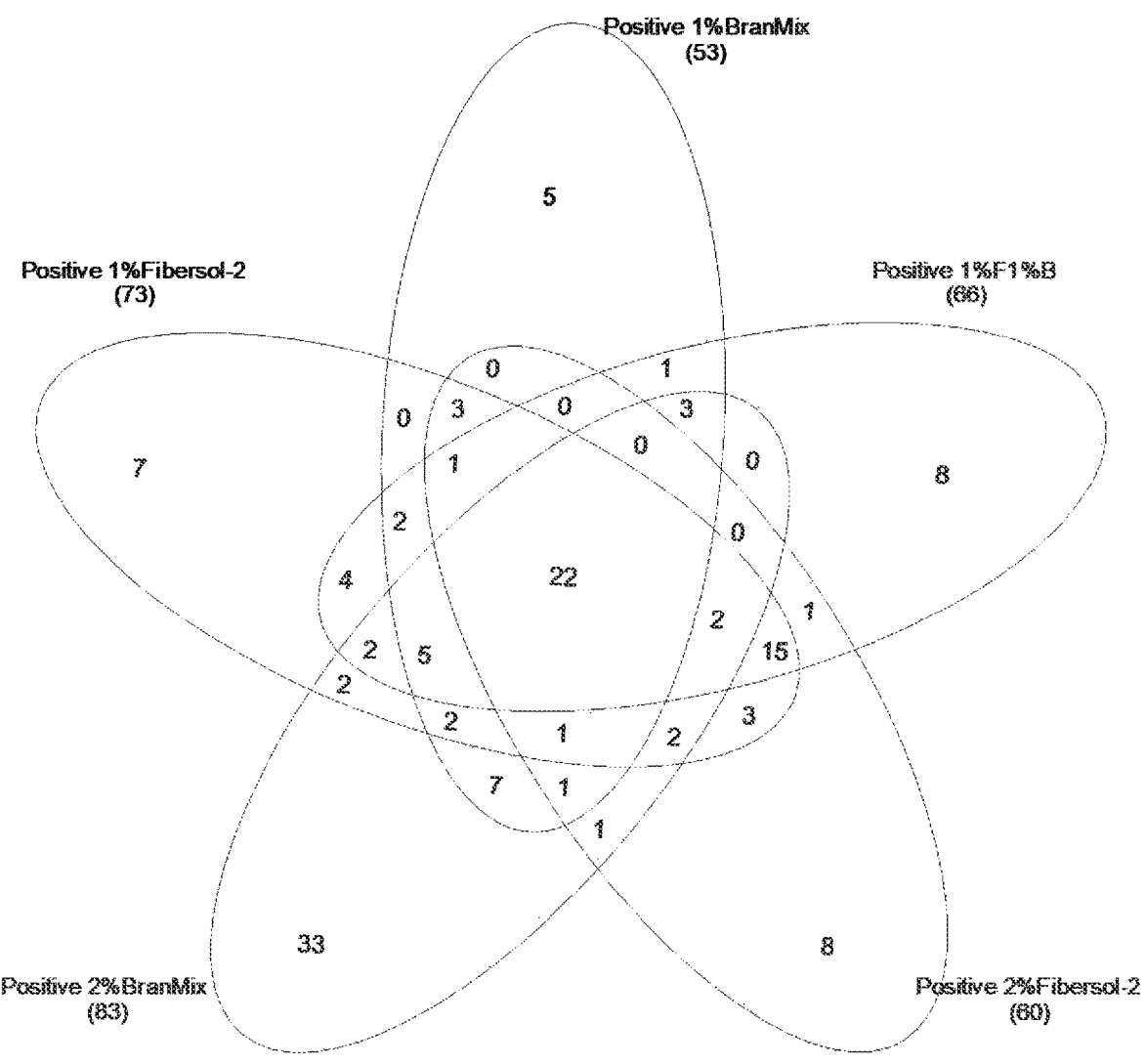
FIG. 8 shows positive responder comparison among 1% Fibersol-2®: 1% Bran Mix, 1% Fibersol-2®, 1% Bran Mix, 2% Fibersol-2®, and 2% Bran Mix in in vitro fermentation.

The fermentation of single SDF combined with ISDFs: The combination of one single SDF, inulin or Fibersol-2®, with ISDFs introduced new negative and positive responders compared to SDF alone or ISDF alone groups. The combination of Fibersol-2® and bran mix have 8 unique positive responders compared to either 1% or 2% Fibersol-2® and 1% or 2% BranMix groups (FIG. 8). These 8 unique positive responders included three potential butyrate producing bacteria, such as *Clostridium butyricum* ASV07RL, *Faecalibacterium* ASV002D, and *Blautia* ASV006C.

Figure 9:
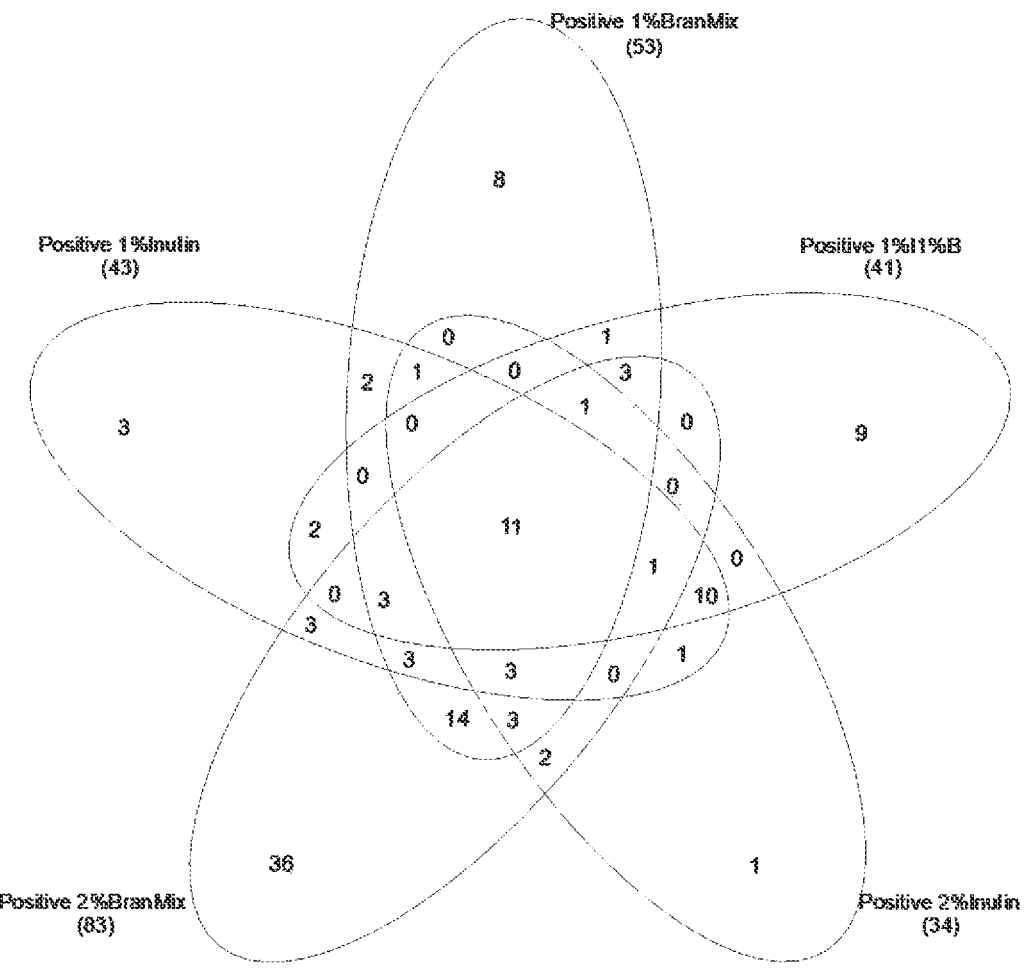
FIG. 9 shows positive responder comparison among 1% Inulin: 1% Bran Mix, 1% Inulin, 1% Bran Mix, 2% Inulin, and 2% Bran Mix in in vitro fermentation.

The combination of inulin and bran mix have 9 unique positive responders compared to either 1% or 2% inulin and 1% or 2% Bran Mix groups (FIG. 9). These 9 unique positive responders contain a beneficial bacterium, *Bifidobacterium* ASV0004, and three potential butyrate producing bacteria, including Anaerostipes ASV001P, Anaerostipes ASV002J, and *Clostridium butyricum* ASV07RL.

These data show that synergistic effect was present in the combination of single SDF with ISDFs. The combination of single SDFs with ISDFs promoted unique beneficial bacteria compared with single SDF or ISDFs alone.

The fermentation of SDFs combined with ISDFs: The combination of two SDFs, inulin and Fibersol-2®, with ISDFs was fermented with fecal microbiota. Their positive and negative responders were identified. Different ratios between SDFs and ISDFs were compared.

First, SDF:ISDF=1:1 (0.5% F0.5%11% B), SDF:ISDF=1:0.5 (0.5% F0.5%10.5% B) and SDF:ISDF=1:0.1 (0.5% F0.5%10.1% B) were compared with SDF formula (0.5% F0.5% I) group.

Figure 10:
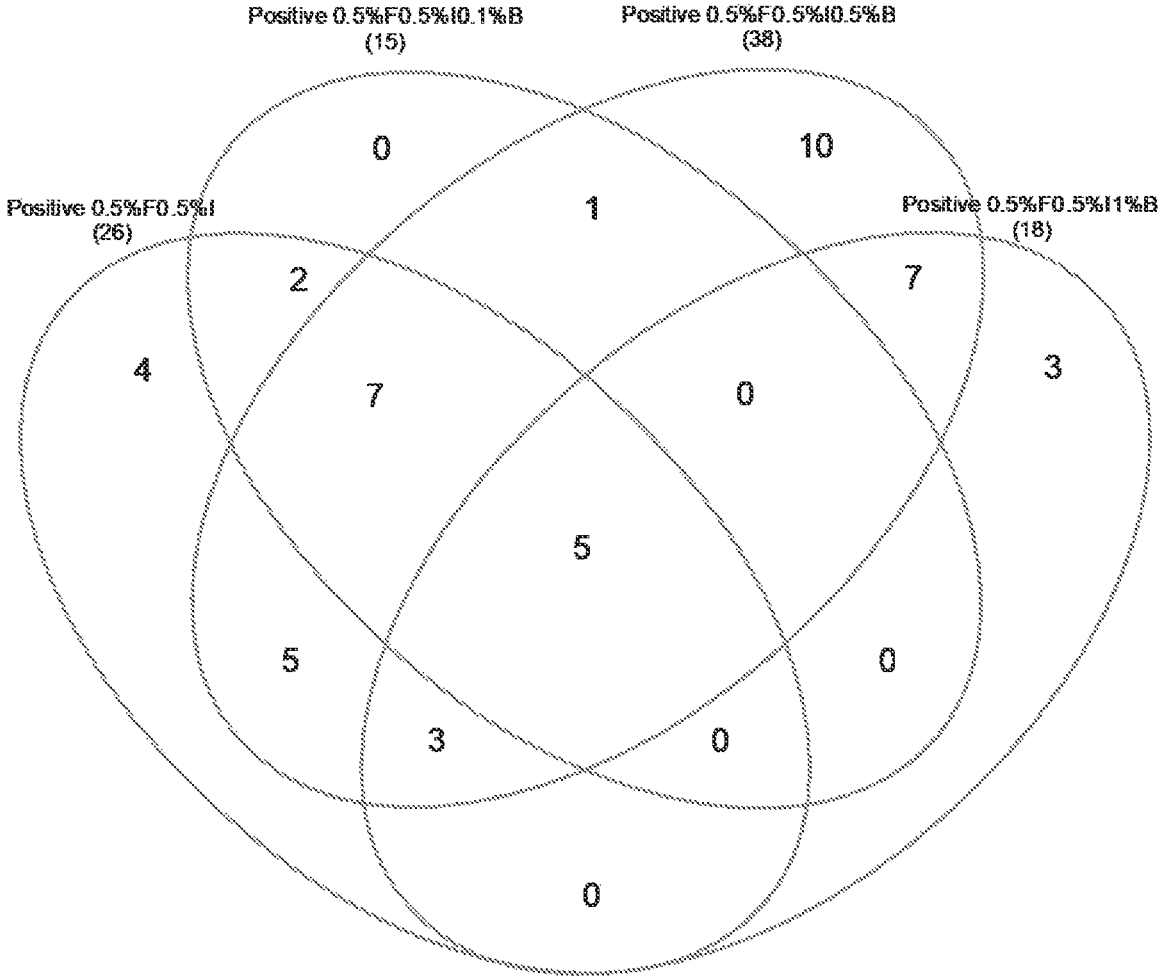
FIG. 10 shows positive responder comparison among 0.5% Fibersol®-2:0.5% Inulin, 0.5% Fibersol-2®: 0.5% Inulin: 0.1% Bran Mix, 0.5% Fibersol-2®: 0.5% Inulin: 0.5% Bran Mix, and 0.5% Fibersol-2®: 0.5% Inulin: 1% Bran Mix in in vitro fermentation.

1 of the 15 positive responders in SDF:ISDF=1:0.1 (0.5% F0.5%10.1% B) group was not promoted by 0.5% F0.5% I group. The only one new ASV promoted by SDF:ISDF=1:0.1 (0.5% F0.5%10.1% B) group is a potential butyrate-producing bacterium, *Parabacteroides* ASV000Q (FIG. 10).

18 of the 38 positive responders in SDF:ISDF=1:0.5 (0.5% F0.5%10.5% B) group were not promoted by 0.5% F0.5% I group (FIG. 10). 10 unique positive responders of SDF:ISDF=1:0.5 (0.5% F0.5%10.5% B) group also contain three potential butyrate producing bacteria, *Parabacteroides* ASV000L, *Parabacteroides* ASV001J, and Butyricicoccus ASV0067.

10 of the 18 positive responders in SDF:ISDF=1:1 (0.5% F0.5%11% B) group were not promoted by 0.5% F0.5% I group (FIG. 10). 3 unique positive responders of SDF:ISDF=1:1 (0.5% F0.5%11% B) group contain one potential butyrate producing bacteria, *Blautia* ASV005H. 7 ASVs were promoted by both SDF:ISDF=1:1 (0.5% F0.5%11% B) and SDF:ISDF=1:0.5 (0.5% F0.5%10.5% B) groups (FIG. 10), which includes a beneficial bacterium *Bifidobacterium* ASV000J, and three potential butyrate producing bacteria, *Blautia* ASV001A, *Clostridium butyricum* ASV07IF, and *Parabacteroides distasonis* ASV000V.

Figure 11:
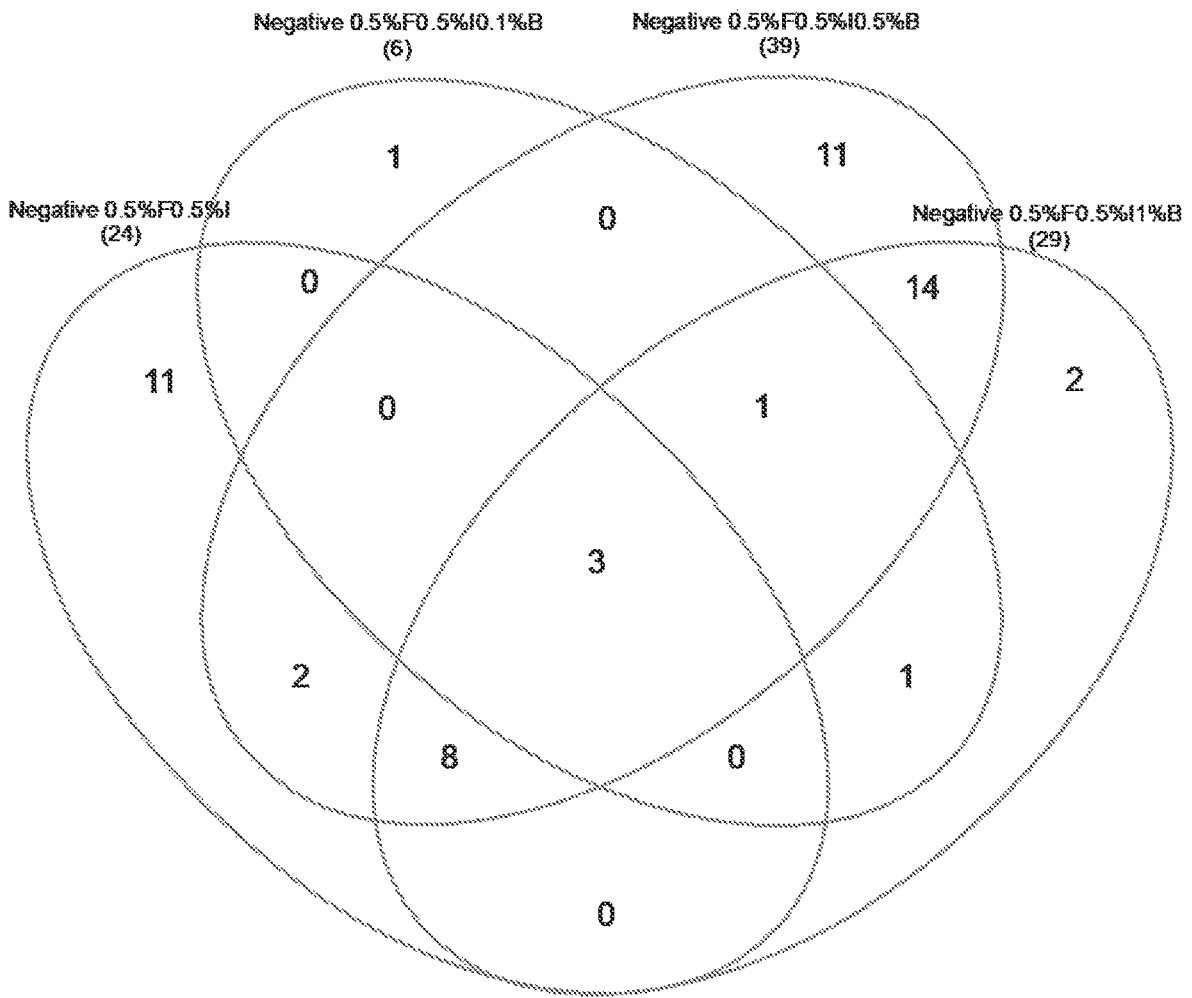
FIG. 11 shows negative responder comparison among 0.5% Fibersol-2®: 0.5% Inulin, 0.5% Fibersol-2®: 0.5% Inulin: 0.1% Bran Mix, 0.5% Fibersol-2®: 0.5% Inulin: 0.5% Bran Mix, and 0.5% Fibersol-2®: 0.5% Inulin: 1% Bran Mix in in vitro fermentation.

SDF:ISDF=1:1 (0.5% F0.5%11% B) and SDF:ISDF=1:0.5 (0.5% F0.5%10.5% B) groups share 14 negative responders which were not inhibited by SDF:ISDF=1:0.1 (0.5% F0.5%10.1% B) and 0.5% F0.5% I groups (FIG. 11). Among these 14 unique bacteria were *Akkermansia* ASV0007 and *Bilophila* ASV0022. Some *Akkermansia* species, which adhere tightly to intestinal epithelium, was reported to be correlated to the dextran sodium sulfate-induced recurring colitis (Berry, D., et al., Intestinal Microbiota Signatures Associated with Inflammation History in Mice Experiencing Recurring Colitis. Frontiers in microbiology, 2015, 6: p. 1408-1408).

Members of *Bilophila* genus has been shown to be pathogenic and detrimental by producing toxic metabolites such as hydrogen sulfide and proinflammatory antigens such as endotoxin (Devkota, S., et al., Dietary-fat-induced taurocholic acid promotes pathobiont expansion and colitis in Il10−/− mice. Nature, 2012. 487(7405): p. 104-108).

Promotion of the butyrate-producing bacteria and inhibition of the potential detrimental bacteria indicated that SDF:ISDF=1:1 (0.5% F0.5%11% B) and SDF:ISDF=1:0.5 (0.5% F0.5%10.5% B) groups could exert more benefits to host. Again, these data suggests that the synergistic effect present in the combination of SDF and ISDF groups that could bring more benefits compared to single SDF or ISDF groups.

Second, SDF:ISDF=1:1 (0.5% F0.5%11% B), SDF:ISDF=0.5:1 (0.25% F0.25%11% B) and SDF:ISDF=0.1:1 (0.05% F0.05%11% B) groups were compared with 1% BranMix group.

Figure 12:
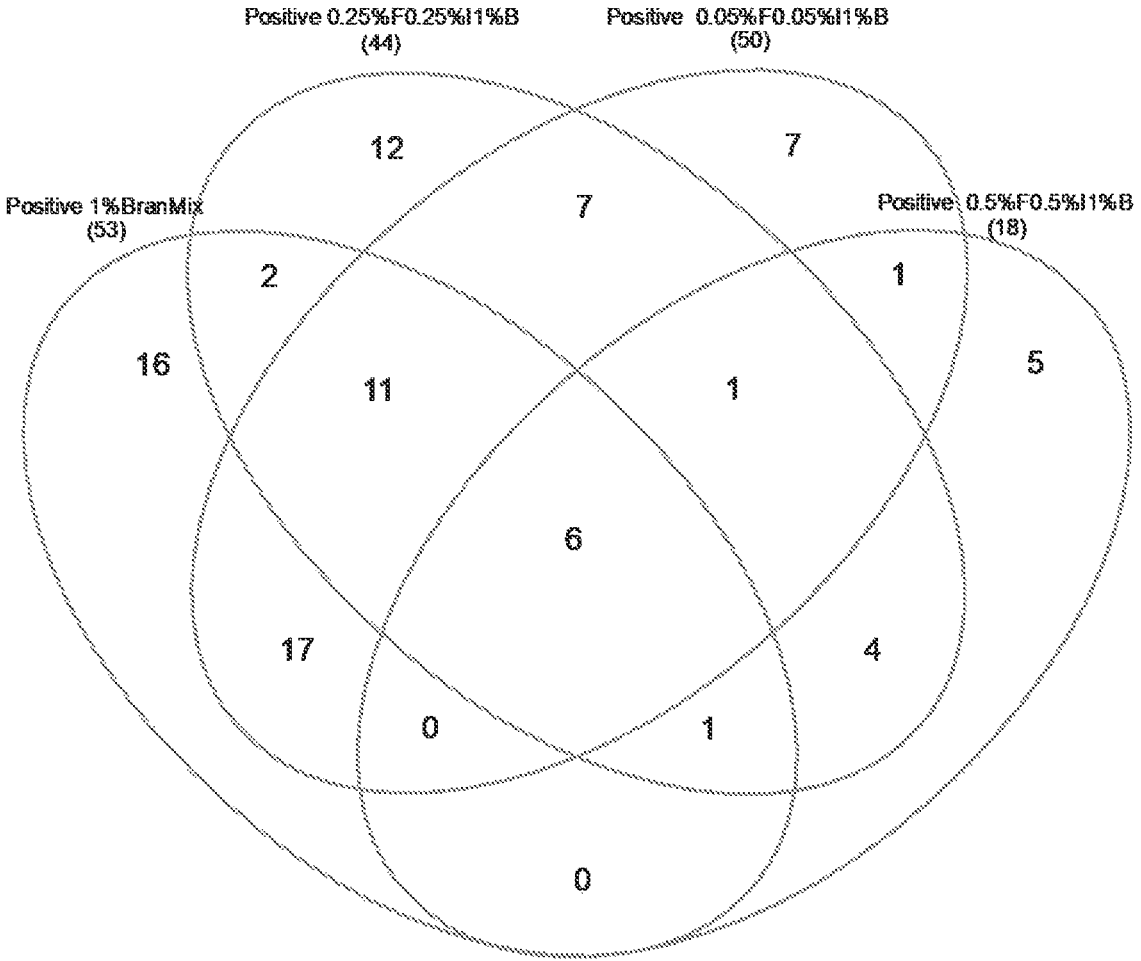
FIG. 12 shows positive responder comparison among 1% Bran Mix, 0.5% Fibersol-2®: 0.5% Inulin: 1% Bran Mix, 0.25% Fibersol-2®: 0.25% Inulin: 1% Bran Mix, and 0.05% Fibersol-2®: 0.05% Inulin: 1% Bran Mix in in vitro fermentation.

11 of the 18 positive responders in SDF:ISDF=1:1 (0.5% F0.5%11% B) group were not promoted by 1% BranMix group (FIG. 12). Among these 11 ASVs, 5 ASVs were also promoted by SDF:ISDF=0.5:1 (0.25% F0.25%11% B) group, including two potential beneficial bacteria, *Faecalibacterium* ASV0014 and *Blautia* ASV001A. 1 ASV was promoted by SDF:ISDF=1:1 (0.5% F0.5%11% B) group, which is *Bifidobacterium* ASV000J. The unique 5 ASVs only promoted by SDF:ISDF=1:1 (0.5% F0.5%11% B)

contain one beneficial bacterium, *Bifidobacterium* ASV0004, and one potential butyrate producing bacterium, *Blautia* ASV005H.

24 of the 44 positive responders in SDF:ISDF=0.5:1 (0.25% F0.25%11% B) group were not promoted by 1% BranMix group (FIG. 12). Among these 24 ASVs, 8 ASVs were also promoted by SDF:ISDF=1:1 (0.5% F0.5%11% B) group, including three potential butyrate producing bacteria, Butyricimonas ASV0036, *Eubacterium hallii* group ASV003U, and *Blautia* ASV001A. The unique 12 ASVs only promoted by SDF:ISDF=0.5:1 (0.25% F0.25%11% B) contain one potential butyrate producing bacteria, *Clostridium butyricum* ASV07RL.

Although only ⅒ SDF was added in ISDF in the SDF:ISDF=0.1:1 (0.05% F0.05%11% B) group, 16 out of 50 positive responders in this group were not promoted by 1% Bran Mix group (FIG. 12), which includes three potential butyrate-producing bacteria mentioned above. This suggests that 10 folders lower of soluble fiber (i.e., Fibersol-2® and inulin) still changed the response of specific ASVs to 1% Bran Mix group and that combination of SDF and ISDF promote more beneficial bacteria than ISDF alone group.

Figure 13:
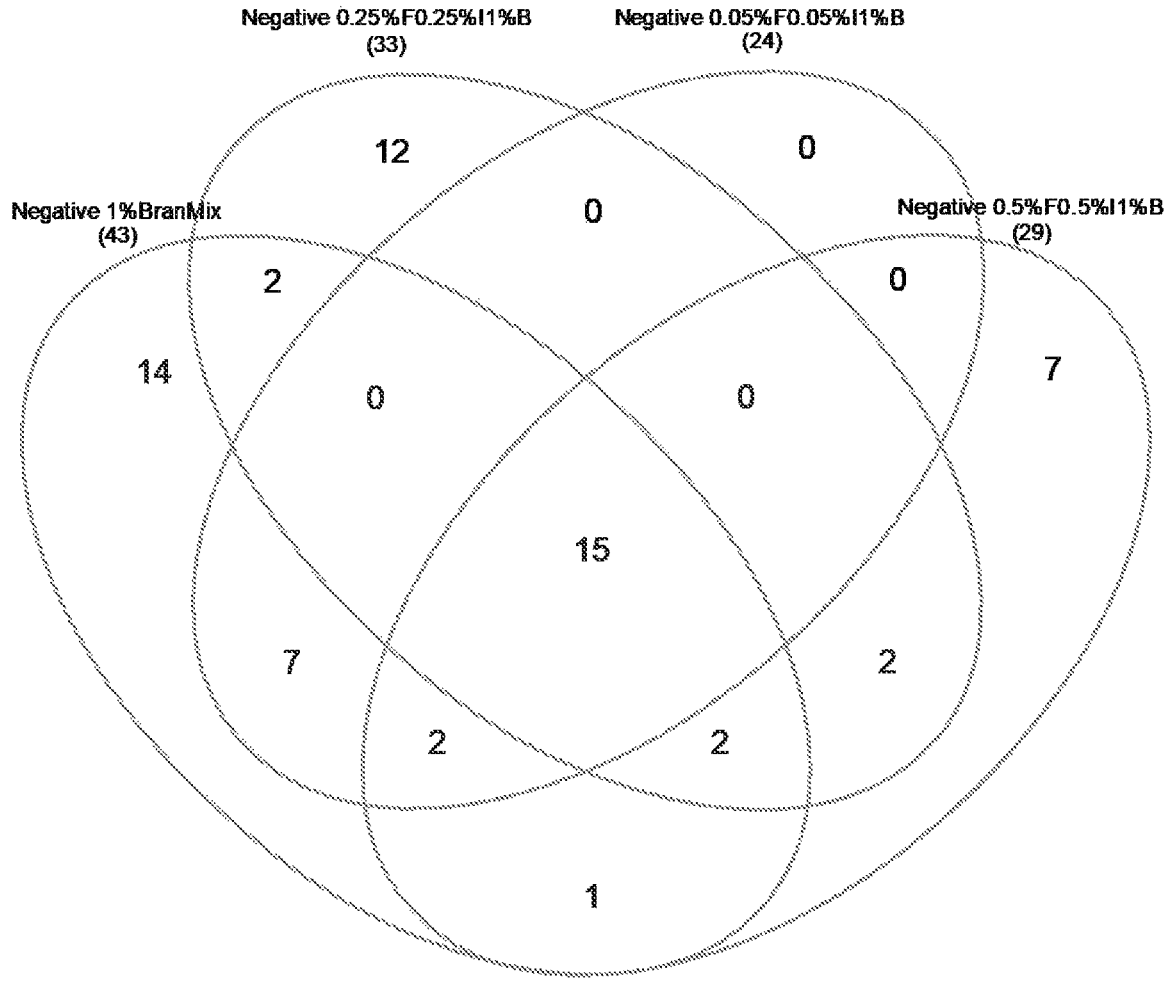
FIG. 13 shows negative responder comparison among 1% Bran Mix, 0.5% Fibersol-2®: 0.5% Inulin: 1% Bran Mix, 0.25% Fibersol-2®: 0.25% Inulin: 1% Bran Mix, and 0.05% Fibersol-2®: 0.05% Inulin: 1% Bran Mix in in vitro fermentation.

One potential detrimental bacterium was found in the 7 unique negative responders of SDF:ISDF=1:1 (0.5% F0.5%11% B) group, which is *Akkermansia* ASV0007 (FIG. 13).

In summary, SDF:ISDF=1:1 (0.5% F0.5%11% B), SDF:ISDF=0.5:1 (0.25% F0.25%11% B) and SDF:ISDF=0.1:1 (0.05% F0.05%11% B) groups promote more beneficial bacteria compared to the 1% Bran Mix group.

CONCLUSION

Promotion of the butyrate-producing bacteria and inhibition of the potential detrimental bacteria indicated that the combination of SDF with ISDF at the ratio from SDF:ISDF=1:0.5 (Fibersol-2®:Inulin:BranMix=1:1:1) and SDF:ISDF=1:1 (Fibersol-2®:Inulin:BranMix=1:1:2), and SDF:ISDF=0.5:1 (Fibersol-2®:Inulin:BranMix=1:1:4) groups promoted more beneficial bacteria and suppressed pathogenic bacteria.

Example 5

In some embodiments, a batch of the insoluble component of the fiber mix (the bran mix) comprising oat bran, corn bran, sorghum bran and wheat bran is sent to Safe Sterilization USA for mixing, milling and roasting as described in Example 1. Thereafter, one, two, three or more soluble fibers are added. In some embodiments, the one or more soluble fiber comprises fructo-oligosaccharide (FOS), galacto-oligosaccharides (GOS), trans-galacto-oligosaccharides (TOS), resistant starch (RS), pectic oligosaccharide (POS), raffinose family oligosaccharides (RFO), polydextrose, inulin, and/or Fibersol-2®. In some embodiments, the one or more soluble fiber comprises fructo-oligosaccharide (FOS), galacto-oligosaccharides (GOS), trans-galacto-oligosaccharides (TOS), resistant starch (RS), pectic oligosaccharide (POS), raffinose family oligosaccharides (RFO), and/or polydextrose.

The resulting formulation changes the dynamics of the fermentation so that a unique combination of SCFA-producing bacteria is selectively promoted as described in Example 2.

When soluble fibers are used alone, the dosage cannot be too high as they are readily fermentable and produce a large amount of gas that can induce bloating, diarrhea as adverse gut effects. Humans cannot tolerate a high dosage of such soluble fibers (e.g. more than 20 grams/day).

When combined with bran fiber mix, the fermentation process slows and produces less gas so that adverse effect minimized.

In some embodiments, the formulation described herein can be taken at 60 grams/day with no adverse gut reaction.

Example 6—Type 2 Diabetes

Figure 1B:
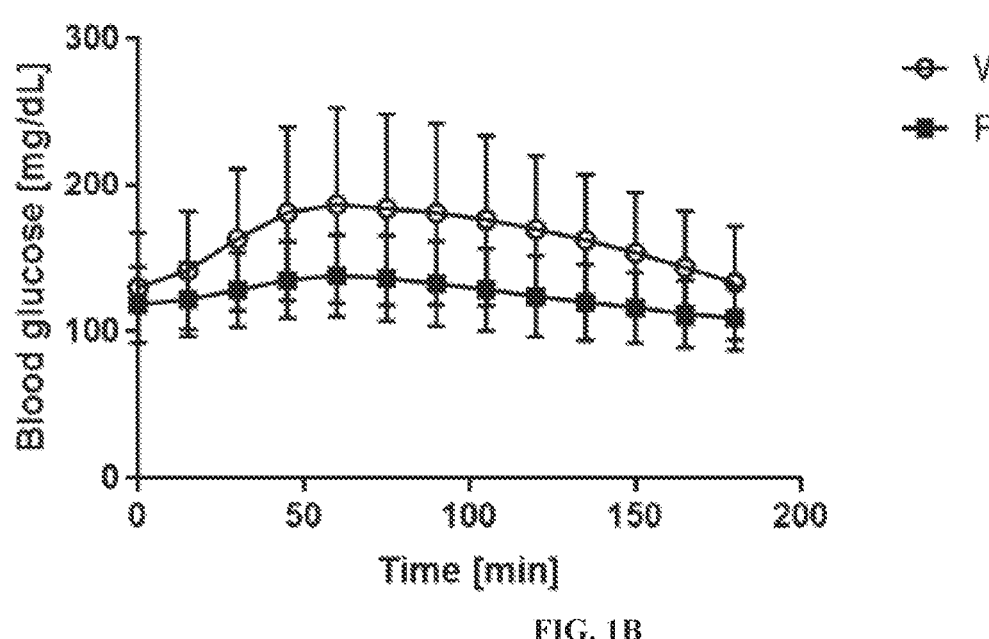

Since patients with type 2 diabetes is one of the key populations that may benefit from gut microbiota-targeted interventions, the present inventors tested the effect of the bran mix of Table 1 on postprandial glycemic response. The present inventors showed that the bran mix induced minimal changes in blood glucose in individuals who have normal glycemic control, prediabetes or type 2 diabetes (FIGS. 1A-1B), suggesting that this fiber mix does not negatively impact glucose homeostasis.

Example 7-COVID-19

All enrolled participants are between 18 and 69 years of age having the following: (1) prediabetes or type 2 diabetes and (2) mild to moderate COVID-19-like symptoms based on the symptom list from the CDC. Mild COVID-19 symptoms include fever or chills, cough, shortness of breath or difficulty breathing, fatigue, muscle or body aches, headache, new loss of taste or smell, sore throat, congestion or runny nose, nausea or vomiting, and diarrhea, no clinical signs indicative of moderate, severe, or critical illness severity. Moderate Covid-19 symptoms include any symptom of mild illness or shortness of breath with exertion, clinical signs suggestive of moderate illness with COVID-19, such as respiratory rate ≥20 breaths/min, oxygen saturation level >93% on room air at sea level, heart rate ≥90 beats/min, no clinical signs indicative of severe or critical illness severity.

Individuals having the following are excluded from the study:

Receiving vancomycin monotherapy or oral broad-spectrum antibiotics

Inability to receive oral fluids

Self-reported allergy or intolerance to any ingredients in the formulation

Surgery involving the intestinal lumen within the last 30 days

Documented diagnosis of celiac disease, inflammatory bowel disease or irritable bowel syndrome Pregnancy or breastfeeding Bariatric surgery Chronic lung disease or moderate/severe asthma Heart failure, coronary artery disease, congenital heart disease, cardiomyopathies or pulmonary hypertension Chronic kidney disease on dialysis Chronic liver disease (cirrhosis)

Immunocompromised, e.g. cancer treatment, bone marrow/organ transplant, immune deficiency, poorly controlled HIV/AIDS, prolonged use of steroids or other immunosuppressant medications All enrolled participants receive self-supportive care for the treatment of COVID-19 and they have access to a series of videos specific to their assigned group that provide them with an overview of the study schedule and what is required of them during the study. The research team provide participants with a digital oral thermometer (Medtus, MO) to monitor body temperature, a pulse oximeter (IMDK, Shenzhen, China) to monitor oxygen saturation level and pulse rate, and a glucometer (Curo Fit, Yorba Linda, CA) to monitor blood glucose with step-by-step instructions. The treatment group take formulation described at Table 2, that provides fermentable dietary fibers as perturbation to improve the gut microbiota. The formulation is taken in the form of drinks up to four times a day (before each main meal and 2 h after dinner) from Day 1 to Day 28. Each drink is prepared by mixing a sachet of formulation mix (30 g) with 500 ml of water. The control group follow the same schedule except they drink the same volume of water without formulation. After 28 days of intervention, all participants remain in the study for follow-up until Day 56. If participants require hospitalization during the study, they discontinue all study procedures during hospitalization but remain in the study for follow-up until Day 56. Participants have access to an interactive online personal dashboard to review their study progress and the data that they have reported.

All prior patents, publications, and test methods referenced herein are incorporated by reference in their entireties.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

---

The invention claimed is:

1. A formulation comprising:
a mixture of bran, inulin, and digestion resistant malto-dextrin;
wherein the bran consists essentially of corn bran, wheat bran, sorghum bran, and oat bran;
wherein the inulin is in a range of 5-8% of total weight of the mixture;
wherein the digestion resistant maltodextrin is in a range of 5-8% of total weight of the mixture;
wherein the mixture comprises a total dietary fiber content in a range of from about 36% to about 47% (w/w);
wherein the mixture has a ratio of dietary fibers from bran:dietary fibers from inulin:dietary fibers from digestion resistant maltodextrin ranging from about 1:1:1 to about 4:1:1; and
wherein the mixture has a uniform particle size between 150 μm and 300 μm.

2. The formulation of claim 1, wherein a ratio of fiber contributed by each of the corn bran, wheat bran, sorghum bran, and oat bran is about 1:1:1:1 by weight.

3. The formulation of claim 1, wherein the formulation comprises about 7-8% inulin by weight.

4. The formulation of claim 1, wherein the formulation comprises about 7.8% inulin by weight.

5. The formulation of claim 1, wherein the digestion resistant maltodextrin is a soluble corn fiber.

6. The formulation of claim 5, wherein the digestion resistant maltodextrin is present at a final percentage of about 7.5% (w/w).

7. The formulation of claim 1, further comprising xanthan gum.

8. The formulation of claim 7, wherein the xanthan gum is present at a final percentage of about 4% (w/w).

9. A method for promoting a healthy gut microbiome in a subject in need thereof, the method comprising:
enterally administering to the subject an effective amount of the formulation of claim 1,
wherein the effective amount is sufficient to increase proliferation of acetate-producing and butyrate-producing gut bacteria species in the subject's gut, thereby promoting the healthy gut microbiome in the subject.

10. The method of claim 9, wherein the effective amount of the formulation comprises 30-90 grams of fiber per day.

11. The method of claim 9, wherein the effective amount of the formulation comprises 30-60 grams of fiber per day.

12. The method of claim 9, wherein the acetate-producing and butyrate-producing gut bacteria species are classified in a bacterial genus comprising at least one of genus of *Bifidobacterium, Ruminococcus, Eubacterium, Clostridium, Alistipes, Bacteroides, Blautia, Butyricicoccus, Butyricimonas, Collinsella, Coprococcus, Dorea, Eggerthella, Faecalibacterium, Fusicatenibacter, Intestinimonas, Lachnoclostridium, Lachnospiraceae, Megasphaera, Parabacteroides, Paraprevotella, Phascolarctobacterium, Roseburia, Ruminiclostridium,* or *Subdoligranulum,* wherein the acetate-producing and butyrate-producing gut bacteria species are classified in a bacterial family comprising at least one of Acidaminococcaceae, Bacteroidaceae, Bifidobacteriaceae, Clostridiaceae, Clostridiales, Coriobacteriaceae, Eggerthellaceae, Enterobacteriaceae, Erysipelotrichaceae, Lachnospiraceae, Marinifilaceae, Prevotellaceae, Rikenellaceae, Ruminococcaceae, Tannerellaceae, or Veillonellaceae.

13. The method of claim 9, wherein the acetate-producing and butyrate-producing gut bacteria species are detected by 16S rRNA amplicon sequencing targeting one or more of the variable regions V4, V3-V4 or the full-length gene.

14. The method of claim 13, wherein the 16S rRNA V4 amplicon sequencing identifies one or more amplicon sequence variant (ASV) characteristic of the acetate-producing and butyrate-producing gut bacteria.

15. The method of claim 14, wherein each of the one or more ASVs represents a unique bacterial strain or a group of highly similar strains of the acetate-producing and butyrate-producing gut bacteria.

16. The method of claim 9, wherein the subject in need thereof has an imbalance of gut microbiota.

17. The method of claim 16, wherein the imbalance of gut microbiota is characterized by low levels of acetate-producing and butyrate-producing gut bacteria.

18. The method of claim 17, wherein the low levels of acetate-producing and butyrate-producing gut bacteria are less than 5% of total gut microbiota in the subject in need thereof.

19. The method of claim 17, wherein the acetate-producing and butyrate-producing gut bacteria species are classified in a bacterial genus comprising at least one of *Bifido-bacterium, Ruminococcus, Eubacterium, Clostridium, Alistipes, Bacteroides, Blautia, Butyricicoccus, Butyricimonas, Collinsella, Coprococcus, Dorea, Eggerthella, Faecalibacterium, Fusicatenibacter, Intestinimonas, Lachnoclostridium, Lachnospiraceae, Megasphaera, Parabacteroides, Paraprevotella, Phascolarctobacterium, Roseburia, Ruminiclostridium,* or *Subdoligranulum.*

20. The method of claim 17, wherein the acetate-producing and butyrate-producing gut bacteria species are detected by 16S rRNA V4 amplicon sequencing.

21. The method of claim 20, wherein the 16S rRNA V4 amplicon sequencing identifies one or more amplicon sequence variant (ASV) characteristic of the acetate-producing and butyrate-producing gut bacteria.

22. The method of claim 21, wherein each of the one or more ASVs represents a unique bacterial strain or a group of highly similar strains of the acetate-producing and butyrate-producing gut bacteria.

23. The method of claim 16, wherein the administering increases the acetate-producing and butyrate-producing gut bacteria.

24. The method of claim 16, wherein the subject in need thereof is obese.

25. The method of claim 16, wherein the subject in need thereof has type 2 diabetes.

26. The method of claim 16, wherein the subject in need thereof has diabetic kidney disease.

27. The method of claim 16, wherein the subject in need thereof is obese with respiratory viral infection such as COVID-19.

28. The method of claim 16, wherein the subject in need thereof is diabetic with respiratory viral infection such as COVID-19.

29. The method of claim 16, wherein the subject in need thereof is prediabetic with respiratory viral infection such as COVID-19.

30. The method of claim 16, wherein the subject in need thereof has multiple sclerosis.

31. The method of claim 16, wherein the subject in need thereof has Parkinson disease.

32. The method of claim 16, wherein the subject in need thereof has Prader-Willi syndrome.

33. The method of claim 16, wherein the subject in need thereof has cancer and wherein administering alleviates side effects associated with cancer chemotherapy.

34. A formulation comprising:

a mixture of (a) insoluble fibers consisting of bran, (b) soluble fibers consisting of inulin, digestion resistant maltodextrin and xanthan gum;

wherein the bran consists essentially of corn bran, wheat bran, sorghum bran, and oat bran;

wherein the inulin is in a range of 5-8% of total weight of the mixture;

wherein the digestion resistant maltodextrin is in a range of 5-8% of total weight of the mixture;

wherein the mixture has a ratio of insoluble fibers to soluble fibers ranging from 1:2 to 2:1;

wherein the mixture comprises a total dietary fiber content in a range of from about 36% to about 47% (w/w);

wherein the mixture has a ratio of dietary fibers from bran:dietary fibers from inulin:dietary fibers from digestion resistant maltodextrin ranging from about 1:1:1 to about 4:1:1; and wherein the mixture has a uniform particle size between 150 μm and 300 μm.

\* \* \* \* \*

SEQUENCE LISTING

<160> NUMBER OF SEQ ID NOS: 117

<210> SEQ ID NO 1
<211> LENGTH: 215
<212> TYPE: DNA
<213> ORGANISM: Bacteroides sp.

<400> SEQUENCE: 1

```
cctgtttgat acccacactt tcgagcctca atgtcagttg cagcttagca ggctgccttc      60
gcaatcggag ttcttcgtga tatctaagca tttcaccgct acaccacgaa ttccgcctgc     120
ctcaactgca ctcaagatat ccagtatcaa ctgcaatttt acggttgagc cgcaaacttt     180
cacaactgac ttaaacatcc atctacgctc ccttt                                215
```

<210> SEQ ID NO 2
<211> LENGTH: 215
<212> TYPE: DNA
<213> ORGANISM: Phascolarctobacterium sp.

<400> SEQUENCE: 2

```
cccgttcgct accctggctt tcgcatctca gcgtcagaca cagtccagaa aggcgccttc      60
gccactggtg ttcctcccaa tatctacgca tttcaccgct acactgggaa ttccccttc     120 ctctcctgca ctcaagccta acagtttcca gcgccatacg gggttgagcc ccgcattttc     180
acgctcgact tattaagccg cctacatgct cttta                                215
```

<210> SEQ ID NO 3
<211> LENGTH: 215
<212> TYPE: DNA
<213> ORGANISM: Bifidobacterium sp.

<400> SEQUENCE: 3

```
cctgttcgct ccccacgctt tcgctcctca gcgtcagtaa cggcccagag acctgccttc      60
gccattggtg ttcttcccga tatctacaca ttccaccgtt acaccgggaa ttccagtctc     120
ccctaccgca ctccagcccg cccgtacccg gcgcagatcc accgttaagc gatggacttt     180
cacaccggac gcgacgaacc gcctacgagc ccttt                                215
```

<210> SEQ ID NO 4
<211> LENGTH: 215
<212> TYPE: DNA
<213> ORGANISM: Bacteroides sp.

<400> SEQUENCE: 4

```
cctgtttgat acccacactt tcgagcatca gcgtcagtta cagtccagta agctgccttc      60
```

-continued

```
gcaatcggag ttcttcgtga tatctaagca tttcaccgct acaccacgaa ttccgcctac    120
ctatgctgca ctcaaggcgc ccagtatcaa ctgcaatttt acggttgagc cgcaaacttt    180
cacaactgac ttaagcaccc gcctacgctc ccttt                               215

<210> SEQ ID NO 5
<211> LENGTH: 215
<212> TYPE: DNA
<213> ORGANISM: Bacteroides sp.

<400> SEQUENCE: 5
cctgtttgat acccacactt tcgagcatca gcgtcagtta cagtccagca agctgccttc     60
gcaatcggag ttcttcgtga tatctaagca tttcaccgct acaccacgaa ttccgcctgc    120
ctctactgta ctcaagacac ccagtatcaa ctgcaatttt acggttgagc cgcaaacttt    180
cacaactgac ttaagcgtcc gcctacgctc ccttt                               215

<210> SEQ ID NO 6
<211> LENGTH: 215
<212> TYPE: DNA
<213> ORGANISM: Alistipes sp.

<400> SEQUENCE: 6
cctgtttgct ccccacgctt tcgtgcctca acgtcagata tagtttggta agctgccttc     60
gcaatcggtg ttctgtatga tctctaagca tttcaccgct acaccataca ttccgcctac    120
cgcaactact ctctagtcta acagtattag aggcagttcc ggagttaagc cccgggattt    180
cacctctaac ttatcaaacc gcctacgcac ccttt                               215

<210> SEQ ID NO 7
<211> LENGTH: 215
<212> TYPE: DNA
<213> ORGANISM: Unknown
<220> FEATURE:
<223> OTHER INFORMATION: Description of Unknown:
      [Ruminococcus] torques group sequence

<400> SEQUENCE: 7
cctgtttgct ccccacgctt tcgagcctca acgtcagtta ccgtccagta agccgccttc     60
gccactggtg ttcctcctaa tatctacgca tttcaccgct acactaggaa ttccgcttac    120
ctctccggta ctctagattg acagtttcca atgcagtccc ggggttgagc cccgggtttt    180
cacatcagac ttgccactcc gtctacgctc ccttt                               215

<210> SEQ ID NO 8
<211> LENGTH: 215
<212> TYPE: DNA
<213> ORGANISM: Parabacteroides sp.

<400> SEQUENCE: 8
cctgtttgat ccccacgctt tcgtgcttca gtgtcagtta tggtttagta agctgccttc     60
gcaatcggag ttctgcgtga tatctatgca tttcaccgct acaccacgca ttccgcctac    120
ctcaaacaca ctcaagtaac ccagtttcaa cggcaatttt atggttgagc cacaaacttt    180
caccgctgac ttaaatcacc acctacgcac ccttt                               215

<210> SEQ ID NO 9
<211> LENGTH: 215
<212> TYPE: DNA
<213> ORGANISM: Bifidobacterium sp.
```

-continued

<400> SEQUENCE: 9
cctgttcgct ccccacgctt tcgctcctca gcgtcagtaa cggcccagag acctgccttc        60
gccattggtg ttcttcccga tatctacaca ttccaccgtt acaccgggaa ttccagtctc       120
ccctaccgca ctcaagcccg cccgtacccg gcgcggatcc accgttaagc gatggacttt       180
cacaccggac gcgacgaacc gcctacgagc ccttt                                   215

<210> SEQ ID NO 10
<211> LENGTH: 215
<212> TYPE: DNA
<213> ORGANISM: Subdoligranulum sp.

<400> SEQUENCE: 10
cctgtttgct acccatgctt tcgagcctca gcgtcagttg gtgcccagta gaccgccttc        60
gccactggtg ttcctcccga tatctacgca ttccaccgct acaccgggaa ttccatctac       120
ctctgcacta ctcaagaaaa acagttttga aagcaattca tgggttgagc ccatggtttt       180
cacttccaac ttgtcttccc gcctgcgctc ccttt                                   215

<210> SEQ ID NO 11
<211> LENGTH: 215
<212> TYPE: DNA
<213> ORGANISM: Parabacteroides sp.

<400> SEQUENCE: 11
cctgtttgat ccccacgctt tcgtgcttca gtgtcagtta tagtttagta agctgccttc        60
gcaatcggag ttctgcgtga tatctatgca tttcaccgct acaccacgca ttccgcctac       120
ctcaaatata ctcaagtcaa ccagtttcaa cggcaatttt atggttgagc cacaaacttt       180
caccgctgac ttaattaacc acctacgcac ccttt                                   215

<210> SEQ ID NO 12
<211> LENGTH: 215
<212> TYPE: DNA
<213> ORGANISM: Unknown
<220> FEATURE:
<223> OTHER INFORMATION: Description of Unknown:
      Lachnospiraceae NK4A136 group sequence

<400> SEQUENCE: 12
cctgtttgct ccccacgctt tcgagcctca acgtcagtta ccgtccagta agccgccttc        60
gccactggtg ttcttcctaa tatctacgca tttcaccgct acactaggaa ttccgcttac       120
ctctccggca ctccagccaa acagtttcca aagcagtccc ggcgttaagc accgggcttt       180
cacttcagac ttgccttgcc gtctacgctc ccttt                                   215

<210> SEQ ID NO 13
<211> LENGTH: 215
<212> TYPE: DNA
<213> ORGANISM: Bacteroides sp.

<400> SEQUENCE: 13
cctgtttgat acccacactt tcgagcatca gtgtcagttg cagtccagtg agctgccttc        60
gcaatcggag ttcttcgtga tatctaagca tttcaccgct acaccacgaa ttccgcccac       120
ctctactgta ctcaagacag ccagtatcaa ctgcaatttt acggttgagc cgcaaacttt       180
cacaactgac ttaactgtcc acctacgctc ccttt                                   215

```
<210> SEQ ID NO 14
<211> LENGTH: 215
<212> TYPE: DNA
<213> ORGANISM: Roseburia sp.

<400> SEQUENCE: 14
cctgtttgct ccccacgctt tcgagcctca gcgtcagtaa tcgtccagta agccgccttc     60
gccactggtg ttcctcctaa tatctacgca tttcaccgct acactaggaa ttccacttac    120
ccctccgaca ctctagtccg acagtttcca atgcagtacc ggggttgagc cccgggattt    180
cacatcagac ttgccgtacc gcctgcgctc ccttt                               215

<210> SEQ ID NO 15
<211> LENGTH: 215
<212> TYPE: DNA
<213> ORGANISM: Parabacteroides sp.

<400> SEQUENCE: 15
cctgtttgat ccccacgctt tcgtgcatca gcgtcagtca tggcttggca ggctgccttc     60
gcaatcgggg ttctgcgtga tatctatgca tttcaccgct acaccacgca ttccgcctgc    120
ctcaaacata ctcaagcccc ccagtttcaa cggcaattct atggttgagc cacagacttt    180
caccgctgac ttaaaaggcc gcctacgcac ccttt                               215

<210> SEQ ID NO 16
<211> LENGTH: 215
<212> TYPE: DNA
<213> ORGANISM: Bacteroides sp.

<400> SEQUENCE: 16
cctgtttgat acccacactt tcgagcatca atgtcagtta caggttagta agctgccttc     60
gcaatcggag ttcttcgtga tatctaagca tttcaccgct acaccacgaa ttccgcctac    120
ctcaactgta ctcaagactg ccagtatcaa ttgcaatttt acggttgagc cgcaaacttt    180
cacaactgac ttaacaaccc atctacgctc ccttt                               215

<210> SEQ ID NO 17
<211> LENGTH: 215
<212> TYPE: DNA
<213> ORGANISM: Unknown
<220> FEATURE:
<223> OTHER INFORMATION: Description of Unknown:
      Lachnospiraceae sequence

<400> SEQUENCE: 17
cctgtttgct ccccacgctt tcgagcctca gcgtcagtta tcgtccagta agccgccttc     60
gccactggtg ttcctcctaa tatctacgca tttcaccgct acactaggaa ttccacttac    120
ccctccgaca ctctagtacg acagtttcca atgcagtacc ggggttgagc cccgggcttt    180
cacatcagac ttgccgcacc gcctgcgctc ccttt                               215

<210> SEQ ID NO 18
<211> LENGTH: 215
<212> TYPE: DNA
<213> ORGANISM: Parabacteroides sp.

<400> SEQUENCE: 18
cctgtttgat ccccacgctt tcgtgcatca gcgtcagtca tggcttggca ggctgccttc     60
gcaatcgggg ttctgcgtga tatctaagca tttcaccgct acaccacgca ttccgcctgc    120
ctcaaacata ctcaagcccc ccagtttcaa cggcaattct atggttgagc cacagacttt    180
```

-continued

```
caccgctgac ttaaaaggcc gcctacgcac ccttt                                215

<210> SEQ ID NO 19
<211> LENGTH: 215
<212> TYPE: DNA
<213> ORGANISM: Parabacteroides sp.

<400> SEQUENCE: 19
cctgtttgat ccccacgctt tcgtgcatca gcgtcagtca tggcttggca ggctgccttc    60
gcgatcgggg ttctgcgtga tatctaagca tttcaccgct acaccacgca ttccgcctgc   120
ctcaaacata ctcaagcccc ccagtttcaa cggcaattct atggttgagc cacagacttt   180
caccgctgac ttaaaaggcc gcctacgcac ccttt                               215

<210> SEQ ID NO 20
<211> LENGTH: 215
<212> TYPE: DNA
<213> ORGANISM: Unknown
<220> FEATURE:
<223> OTHER INFORMATION: Description of Unknown:
      Escherichia-Shigella sequence

<400> SEQUENCE: 20
cctgtttgct ccccacgctt tcgcacctga gcgtcagtct tcgtccaggg ggccgccttc    60
gccaccggta ttcctccaga tctctacgca tttcaccgct acacctggaa ttctaccccc   120
ctctacgaga ctcaagcttg ccagtatcag atgcagttcc caggttgagc ccggggattt   180
cacatctgac ttaacaaacc gcctgcgtgc gcttt                               215

<210> SEQ ID NO 21
<211> LENGTH: 215
<212> TYPE: DNA
<213> ORGANISM: Faecalibacterium sp.

<400> SEQUENCE: 21
cctgtttgct acccacactt tcgagcctca gcgtcagttg gtgcccagta ggccgccttc    60
gccactggtg ttcctcccga tatctacgca ttccaccgct acaccgggaa ttccgcctac   120
ctctgcacta ctcaagaaaa acagttttga aagcagttca tgggttgagc ccatggattt   180
cacttccaac ttgttctccc gcctgcgctc ccttt                               215

<210> SEQ ID NO 22
<211> LENGTH: 215
<212> TYPE: DNA
<213> ORGANISM: Bacteroides sp.

<400> SEQUENCE: 22
cctgtttgat acccacactt tcgagcatca gcgtcagtta cactccagtg agctgccttc    60
gcaatcggag ttcttcgtga tatctaagca tttcaccgct acaccacgaa ttccgcccac   120
ctctactgca ctcaagactg ccagtatcaa ctgcaatttt acggttgagc cgcaaacttt   180
cacaactgac ttaacaatcc gcctacgctc ccttt                               215

<210> SEQ ID NO 23
<211> LENGTH: 215
<212> TYPE: DNA
<213> ORGANISM: Unknown
<220> FEATURE:
<223> OTHER INFORMATION: Description of Unknown:
      Lachnoclostridium sequence
```

-continued

```
<400> SEQUENCE: 23
cctgtttgct ccccacgctt tcgagcctca acgtcagtta tcgtccagta agccgccttc      60
gccactggtg ttcctcctaa tatctacgca tttcaccgct acactaggaa ttccacttac     120
ctctccgaca ctctagcaaa acagtttcca aagcagtccc agggttgagc cctgggtttt     180
cacttcagac ttgcttcgcc gtctacgctc ccttt                               215

<210> SEQ ID NO 24
<211> LENGTH: 215
<212> TYPE: DNA
<213> ORGANISM: Bacteroides sp.

<400> SEQUENCE: 24
cctgtttgat acccacactt tcgagcatca gtgtcagtga cagtctagtg agctgccttc      60
gcaatcggag ttcttcgtga tatctaagca tttcaccgct acaccacgaa ttccgcccac     120
ctctactgta ctcaagactc ccagtttcaa ctgcaatttt acggttgagc cgcaaacttt     180
cacaactgac ttaacaatcc acctacgctc ccttt                               215

<210> SEQ ID NO 25
<211> LENGTH: 215
<212> TYPE: DNA
<213> ORGANISM: Blautia sp.

<400> SEQUENCE: 25
cctgtttgct ccccacgctt tcgagcctca acgtcagtta ccgtccagta agccgccttc      60
gccactggtg ttcctcctaa tatctacgca tttcaccgct acactaggaa ttccgcttac     120
ccctccggca ctcaagcaca gcagtttcca atgcagtcca ggggttaagc ccctgccttt     180
cacatcagac ttgctgcgcc gtctacgctc ccttt                               215

<210> SEQ ID NO 26
<211> LENGTH: 215
<212> TYPE: DNA
<213> ORGANISM: Bifidobacterium sp.

<400> SEQUENCE: 26
cctgttcgct ccccacgctt tcgctcctca gcgtcagtga cggcccagag acctgccttc      60
gccattggtg ttcttcccga tatctacaca ttccaccgtt acaccgggaa ttccagtctc     120
ccctaccgca ctcaagcccg cccgtacccg gcgcggatcc accgttaagc gatggacttt     180
cacaccggac gcgacgaacc gcctacgagc ccttt                               215

<210> SEQ ID NO 27
<211> LENGTH: 215
<212> TYPE: DNA
<213> ORGANISM: Faecalibacterium sp.

<400> SEQUENCE: 27
cctgtttgct acccacactt tcgagcctca gcgtcagttg gtgcccagta ggccgccttc      60
gccactggtg ttcctcccga tatctacgca ttccaccgct acaccgggaa ttccgcctac     120
ctctgcacta ctcaagaaaa acagttttga aagcagttta tgggttgagc ccatagattt     180
cacttccaac ttgtcttccc gcctgcgctc ccttt                               215

<210> SEQ ID NO 28
<211> LENGTH: 215
<212> TYPE: DNA
<213> ORGANISM: Unknown
```

```
<220> FEATURE:
<223> OTHER INFORMATION: Description of Unknown:
     Megasphaera;Ambiguous_taxa sequence

<400> SEQUENCE: 28
cccgttcgct cccctggctt tcgtgcctca gcgtcagttg tcgtccagaa agccgctttc     60
gccactggta ttcctcctaa tatctacgca tttcaccgct acactaggaa ttctgctttc    120
ctctccgata ctccagtctc ccagtttccg tcccctcacg gggttaagcc ccgcactttt    180
aagacagact taagagaccg cctgcgcacc cttta                               215

<210> SEQ ID NO 29
<211> LENGTH: 215
<212> TYPE: DNA
<213> ORGANISM: Parabacteroides sp.

<400> SEQUENCE: 29
cctgtttgat ccccacgctt tcgtgcttca gtgtcagtta tagtttagta agctgccttc     60
gcaatcggag ttctgcgtga tatctatgca tttcaccgct acaccacgca ttccgcctac    120
ctcaaatata ctcaagctaa ccagtttcaa cggcaatttt atggttaagc cacaaacttt    180
caccgctgac ttaataagcc acctacgcac ccttt                               215

<210> SEQ ID NO 30
<211> LENGTH: 215
<212> TYPE: DNA
<213> ORGANISM: Bacteroides sp.

<400> SEQUENCE: 30
cctgtttgat acccacactt tcgagcatca gcgtcagtta cagtccagta agctgccttc     60
gcaatcggag ttcttcgtga tatctaagca tttcaccgct acaccacgaa ttccgcctac    120
ctctactgca ctcaagacga ccagtatcaa ctgcaatttt acggttgagc cgcaaacttt    180
cacagctgac ttaatagtcc gcctacgctc ccttt                               215

<210> SEQ ID NO 31
<211> LENGTH: 215
<212> TYPE: DNA
<213> ORGANISM: Unknown
<220> FEATURE:
<223> OTHER INFORMATION: Description of Unknown:
     Fusicatenibacter sequence

<400> SEQUENCE: 31
cctgtttgct ccccacgctt tcgagcctca acgtcagtta ccgtccagta agccgccttc     60
gccactggtg ttcttcctaa tatctacgca tttcaccgct acactaggaa ttccgcttac    120
ctctccggca ctcgagccag acagtttcca atgcagtccc agggttaagc cctgggtttt    180
cacatcagac ttgccttgcc gtctacgctc ccttt                               215

<210> SEQ ID NO 32
<211> LENGTH: 215
<212> TYPE: DNA
<213> ORGANISM: Unknown
<220> FEATURE:
<223> OTHER INFORMATION: Description of Unknown:
     Coprococcus 2 sequence

<400> SEQUENCE: 32
cctgtttgct ccccacgctt tcgtgcctca gtgtcagtag cagtccagta agtcgccttc     60
gccactggtg ttcctcctaa tatctacgca tttcaccgct acactaggaa ttccacttac    120
```

-continued

```
ctctcctgta ctctagtcag gcagtttcca aagcagttcc ggggttaagc cccggatttt      180
cacttcagac ttgtctcacc acctacgcac ccttt                                 215

<210> SEQ ID NO 33
<211> LENGTH: 215
<212> TYPE: DNA
<213> ORGANISM: Bacteroides sp.

<400> SEQUENCE: 33
cctgtttgat acccacactt tcgagcatca gtgtcagtaa cagtctagtg agctgccttc       60
gcaatcggag ttcttcgtga tatctaagca tttcaccgct acaccacgaa ttccgcccac      120
ctctactgta ctcaagactg ccagtttcaa ctgcaatttt acggttgagc cgcaaacttt      180
cacaactgac ttaacaatcc acctacgctc ccttt                                 215

<210> SEQ ID NO 34
<211> LENGTH: 215
<212> TYPE: DNA
<213> ORGANISM: Unknown
<220> FEATURE:
<223> OTHER INFORMATION: Description of Unknown:
      Lachnospiraceae sequence

<400> SEQUENCE: 34
cctgtttgct ccccacgctt tcgagcctca acgtcagtta cagtccagta agccgccttc       60
gccactggtg ttcctcctaa tatctacgca tttcaccgct acactaggaa ttccacttac      120
ctctcctgca ctctagcttg acagtttcca aagcagtccc agggttgagc ctgggtttt       180 cacttcagac ttgccatgcc gtctacgctc cctt                                  215

<210> SEQ ID NO 35
<211> LENGTH: 215
<212> TYPE: DNA
<213> ORGANISM: Unknown
<220> FEATURE:
<223> OTHER INFORMATION: Description of Unknown:
      Intestinimonas sequence

<400> SEQUENCE: 35
cctgtttgct ccccacgctt tcgcgcctca gcgtcagtta tcgtccagca atccgccttc       60
gccactggtg ttcctccgta tatctacgca tttcaccgct acacacgaa ttccgattgc       120 ctctccgaca ctcaagaact acagtttcaa atgcaggcta tgggttgagc ccatagtttt      180
cacatctgac ttgcagtccc gcctacacgc cctt                                  215

<210> SEQ ID NO 36
<211> LENGTH: 215
<212> TYPE: DNA
<213> ORGANISM: Unknown
<220> FEATURE:
<223> OTHER INFORMATION: Description of Unknown:
      UBA1819 sequence

<400> SEQUENCE: 36
cctgtttgct acccatgctt tcgagcctca gcgtcagtta gtgcccagta ggccgccttc       60
gccactggtg ttcctcccga tatctacgca ttccaccgct acaccgggaa ttccgcctac      120
ctctacacca ctcaagactg acagttttga aagcaattta tgggttgagc ccatagattt      180
cactcccaac ttgccaatcc gcctgcgctc cctt                                  215
```

```
<210> SEQ ID NO 37
<211> LENGTH: 215
<212> TYPE: DNA
<213> ORGANISM: Unknown
<220> FEATURE:
<223> OTHER INFORMATION: Description of Unknown:
      Paraprevotella;Ambiguous_taxa sequence

<400> SEQUENCE: 37
cctgtttgat acccgcactt tcgagcctca gcgtcagtgc tgccccggca caatgccttc      60
gcgatcggag ttcttcgtga tatctaagca tttcaccgct acaccacgaa ttccatgtgc     120
cctgtgcaga ctcaaggctt acagtttcaa cggctggcca cggttgagcc gtggcatttg     180
accgctgact taaaagcccg cctacgctcc cttta                                215

<210> SEQ ID NO 38
<211> LENGTH: 215
<212> TYPE: DNA
<213> ORGANISM: Butyricimonas sp.

<400> SEQUENCE: 38
cctgttcgct acccacgctc tcgcgcatca gcgtcagatc gagcctggga agctgccttc      60
gctatcgggg ttccaagtga tatctaagca tttcaccgct acttcacttg ttccgcctcc     120
ctcgtctcgt ctccaggtcg ccagtttcaa cggcgtgcta cagtttagct gcagtctttt     180
accgctgact tggcgtcccg cctacgcgcc cttta                                215

<210> SEQ ID NO 39
<211> LENGTH: 215
<212> TYPE: DNA
<213> ORGANISM: Unknown
<220> FEATURE:
<223> OTHER INFORMATION: Description of Unknown:
      Ruminiclostridium 5 sequence

<400> SEQUENCE: 39
cctgtttgct acccacactt tcgtgcctca gcgtcagtta aagcccagta ggccgccttc      60
gccactggtg ttcctcccga tctctacgca tttcaccgct acaccgggaa ttccgcctac     120
ctctacttca ctcaagacta acagtttcaa aagcagttca tgggttaagc ccatggattt     180
cacttctgac ttgccaatcc gcctacgcac ccttt                                215

<210> SEQ ID NO 40
<211> LENGTH: 215
<212> TYPE: DNA
<213> ORGANISM: Unknown
<220> FEATURE:
<223> OTHER INFORMATION: Description of Unknown:
      Lachnoclostridium sequence

<400> SEQUENCE: 40
cctgtttgct ccccacgctt tcgagcctca acgtcagtta tcgtccagta agtcgccttc      60
gccactggtg ttcctcctaa tatctacgca tttcaccgct acactaggaa ttccacttac     120
ctctccgaca ctccagttaa acagtttcca aagcagtccc gcagttgagc cgcgggcttt     180
cacttcagac ttgctttacc gtctacgctc ccttt                                215

<210> SEQ ID NO 41
<211> LENGTH: 215
<212> TYPE: DNA
<213> ORGANISM: Unknown
<220> FEATURE:
<223> OTHER INFORMATION: Description of Unknown:
```

-continued

Lachnospiraceae UCG-004;Ambiguous_taxa sequence

<400> SEQUENCE: 41
cctgtttgct ccccacgctt tcgagcctca acgtcagtta ctgtccagta agccgccttc      60
gccactggtg ttcttcctaa tatctacgca tttcaccgct acactaggaa ttccgcttac     120
ctctccagca ctctagcaac acagtttcca aagcagttcc caggttgagc ccgggtattt     180
cacttcagac ttgcgtcgcc gtctacgctc ccttt                                215

<210> SEQ ID NO 42
<211> LENGTH: 215
<212> TYPE: DNA
<213> ORGANISM: Unknown
<220> FEATURE:
<223> OTHER INFORMATION: Description of Unknown:
      uncultured sequence

<400> SEQUENCE: 42
cctgtttgct ccccacgctt tcgagcctca acgtcagtta ctgtccagta agccgccttc      60
gccactggtg ttcctcctaa tatctacgca tttcaccgct acactaggaa ttccgcttac     120
ctctccagca ctccagtcaa acagtttcaa aagcagtccc ggggttgagc cccagccttt     180
cacttctgac ttgcttgacc gtctacgctc ccttt                                215

<210> SEQ ID NO 43
<211> LENGTH: 215
<212> TYPE: DNA
<213> ORGANISM: Unknown
<220> FEATURE:
<223> OTHER INFORMATION: Description of Unknown:
      [Eubacterium] hallii group sequence

<400> SEQUENCE: 43
cctgtttgct ccccacgctt tcgtgcctca gtgtcagtaa cagtccagca ggccgccttc      60
gccactggtg ttcctcctaa tatctacgca tttcaccgct acactaggaa ttccgcctgc     120
ctctcctgta ctctagccga gcagtttcaa atgcagctcc ggggttgagc cccggccttt     180
cacatctgac ttgcactgcc acctacgcac ccttt                                215

<210> SEQ ID NO 44
<211> LENGTH: 215
<212> TYPE: DNA
<213> ORGANISM: Bacteroides sp.

<400> SEQUENCE: 44
cctgtttgat acccacactt tcgagcctca gtgtcagtaa cagtccagtg agctgccttc      60
gcaatcggag ttcttcgtga tatctaagca tttcaccgct acaccacgaa ttccgcccac     120
ctctactgta ctcaagacac acagtatcaa ctgcaatttt acggttgagc cgcaaacttt     180
cacaactgac ttacatgtcc acctacgctc cctttt                               215

<210> SEQ ID NO 45
<211> LENGTH: 215
<212> TYPE: DNA
<213> ORGANISM: Dorea sp.

<400> SEQUENCE: 45
cctgtttgct ccccacgctt tcgagcctca acgtcagtca tcgtccagca agccgccttc      60
gccactggtg ttcctcctaa tatctacgca tttcaccgct acactaggaa ttccacttgc     120
ctctccgaca ctctagctct acagttccaa atgcagtccc ggggttgagc cccgggcttt     180

-continued

```
cacatctggc ttgcaatgcc gtctacgctc ccttt                               215

<210> SEQ ID NO 46
<211> LENGTH: 215
<212> TYPE: DNA
<213> ORGANISM: Unknown
<220> FEATURE:
<223> OTHER INFORMATION: Description of Unknown:
      uncultured sequence

<400> SEQUENCE: 46
cctgtttgct ccccacgctt tcgtgcctca gcgtcagttt cagtccagaa agccgccttc    60
gccactggtg ttcttcccaa tatctacgca tttcaccgct acactgggaa ttccgctttc   120
ctctcctgta ctctagctca acagtttaaa atgcaatccc gtggttaagc cacgggcttt   180
cacatcttac ttgtcatgcc gcctactcac ccttt                              215

<210> SEQ ID NO 47
<211> LENGTH: 215
<212> TYPE: DNA
<213> ORGANISM: Collinsella sp.

<400> SEQUENCE: 47
cctgttcgct cccccagctt tcgcgcctca gcgtcggtct cggcccagag ggccgccttc    60
gccaccggtg ttccacccga tatctgcgca ttccaccgct acaccgggtg ttccaccctc   120
ccctaccgga cccaagccgc ggaggttccg ggggcttcgg ggggttgagc cccccgcttc   180 gaccccçggc ctgccgggcc gcctacgcgc gcttt                              215

<210> SEQ ID NO 48
<211> LENGTH: 215
<212> TYPE: DNA
<213> ORGANISM: Unknown
<220> FEATURE:
<223> OTHER INFORMATION: Description of Unknown:
      [Eubacterium] ventriosum group sequence

<400> SEQUENCE: 48
cctgtttgct ccccacgctt tcgagcctca gcgtcagtaa tcgtccagta agccgccttc    60
gccaccggtg ttcctcctaa tatctacgca tttcaccgct acactaggaa ttccgcttac   120
ccctccgaca ctctagcctg acagtttcaa aagcaattcc ggggttgagc cccaggcttt   180
cacttctgac ttgccatgcc gcctacgctc ccttt                              215

<210> SEQ ID NO 49
<211> LENGTH: 215
<212> TYPE: DNA
<213> ORGANISM: Blautia sp.

<400> SEQUENCE: 49
cctgtttgct ccccacgctt tcgagcctca acgtcagtta ccgtccagta agccgccttc    60
gccactggtg ttcctcctaa tatctacgca tttcaccgct acactaggaa ttccgcttac   120
ccctccggca ctcaagctca acagtttcca atgcagtcca ggggttaagc ccctgccttt   180
cacatcagac ttgctgcgcc gtctacgctc ccttt                              215

<210> SEQ ID NO 50
<211> LENGTH: 215
<212> TYPE: DNA
<213> ORGANISM: Unknown
<220> FEATURE:
```

-continued

```
<223> OTHER INFORMATION: Description of Unknown:
      [Ruminococcus] torques group sequence

<400> SEQUENCE: 50
cctgtttgct ccccacgctt tcgagcctca acgtcagtca tcgtccagta agccgccttc      60
gccactggtg ttcctcctaa tatctacgca tttcaccgct acactaggaa ttccgcttac     120
ctctccgaca ctctagaaaa acagtttcca atgcagtccc ggggttgagc cccgggtttt     180
cacatcagac ttgcctctcc gtctacgctc ccttt                                215

<210> SEQ ID NO 51
<211> LENGTH: 215
<212> TYPE: DNA
<213> ORGANISM: Butyricicoccus sp.

<400> SEQUENCE: 51
cctgtttgct ccccacgctt tcgcgcctca gcgtcagtta atgtccagca ggccgccttc      60
gccactggtg ttcctccgta tatctacgca tttcaccgct acacacggaa ttccgcctgc     120
ctctccatca ctcaagacca gcagttttga aagcagttta tgggttaagc ccatagattt     180
cacttccaac ttaccggccc gcctgcgcgc ccttt                                215

<210> SEQ ID NO 52
<211> LENGTH: 215
<212> TYPE: DNA
<213> ORGANISM: Butyricicoccus sp.

<400> SEQUENCE: 52
cctgtttgct ccccacgctt tcgcgcctca gcgtcagtta atgtccagca ggccgccttc      60
gccactggtg ttcctccgta tatctacgca tttcaccgct acacacggaa ttccgcctgc     120
ctctccatca ctcaagacca gcagttttga aagcagttta tgggttaagc ccatagattt     180
cacttccaac ttgccggccc gcctgcgcgc ccttt                                215

<210> SEQ ID NO 53
<211> LENGTH: 215
<212> TYPE: DNA
<213> ORGANISM: Unknown
<220> FEATURE:
<223> OTHER INFORMATION: Description of Unknown:
      [Eubacterium] fissicatena group sequence

<400> SEQUENCE: 53
cctgtttgct ccccacgctt tcgagcctca acgtcagtca tcgtccagta agccgccttc      60
gccactggtg ttcctcctaa tatctacgca tttcaccgct acactaggaa ttccacttac     120
ctctccgaca ctctagttac atagtttcca atgcagtccc ggggttgagc cccgggtttt     180
cacatcagac ttacataacc gtctacgctc ccttt                                215

<210> SEQ ID NO 54
<211> LENGTH: 215
<212> TYPE: DNA
<213> ORGANISM: Eggerthella sp.

<400> SEQUENCE: 54
cctgttcgct cccctagctt tcgcgcctca gcgtcagttg cggcccagca ggctgccttc      60
gccatcggtg ttcttcccga tatctgcgca ttccaccgct acaccgggaa ttccgcctgc     120
ctctaccgaa ctcgagcctc ccagttcggg atccggccgg gggttgagcc ctcggattag     180
agatcccgct tgagaggccg cctacgcgct cttta                                215
```

```
<210> SEQ ID NO 55
<211> LENGTH: 215
<212> TYPE: DNA
<213> ORGANISM: Unknown
<220> FEATURE:
<223> OTHER INFORMATION: Description of Unknown:
      Ruminococcaceae UCG-005 sequence

<400> SEQUENCE: 55
cctgtttgct ccccacgctt tcgcgcctca gcgtcagttg tcgtccagca ggccgccttc      60
gccactggtg ttcctcctaa tatctacgca tttcaccgct acactaggaa ttccgcctgc     120
ctctccgata ctcaagggat acagtttcaa aagcagtttg ggggttgagc ccccagattt     180
cactcctgac ttgcatctcc gcctacacgc ccttt                                 215

<210> SEQ ID NO 56
<211> LENGTH: 215
<212> TYPE: DNA
<213> ORGANISM: Unknown
<220> FEATURE:
<223> OTHER INFORMATION: Description of Unknown:
      uncultured bacterium sequence

<400> SEQUENCE: 56
cctgtttgct ccccacgctt tcgagcctca gtgtcagtta cagtccagta agccgccttc      60
gcctctggtg ttcttcctaa tatctacgca ttccaccgct acactaggaa ttccgcttac     120
ctctcctgca ctcaagctta acagttttat atgcagttcc gcagttaagc cacgggcttt     180
cacatataac ttattatgcc acctacactc ccttt                                 215

<210> SEQ ID NO 57
<211> LENGTH: 215
<212> TYPE: DNA
<213> ORGANISM: Unknown
<220> FEATURE:
<223> OTHER INFORMATION: Description of Unknown:
      Enterobacteriaceae sequence

<400> SEQUENCE: 57
cctgtttgct ccccacgctt tcgcacctga gcgtcagtct ttgtccaggg ggccgccttc      60
gccaccggta ttcctccaga tctctacgca tttcaccgct acacctggaa ttctaccccc     120
ctctacaaga ctctagcctg ccagtttcga atgcagttcc caggttgagc ccggggattt     180
cacatccgac ttgacagacc gcctgcgtgc gcttt                                 215

<210> SEQ ID NO 58
<211> LENGTH: 215
<212> TYPE: DNA
<213> ORGANISM: Unknown
<220> FEATURE:
<223> OTHER INFORMATION: Description of Unknown:
      Ruminococcus 2 sequence

<400> SEQUENCE: 58
cctgtttgct acccacgctt tcgtgcctca gcgtcagtta aagcccagca ggccgccttc      60
gccactggtg ttcctcccca tctctacgca tttcaccgct acacggggaa ttccgcctgc     120
ctctacttca ctcaagctct gcagtttcaa atgcaggcta tgggttgagc ccatagattt     180
cacatctgac ttgcaaagcc gcctacgcac ccttt                                 215

<210> SEQ ID NO 59
```

-continued

```
<211> LENGTH: 215
<212> TYPE: DNA
<213> ORGANISM: Unknown
<220> FEATURE:
<223> OTHER INFORMATION: Description of Unknown:
      [Ruminococcus] torques group sequence

<400> SEQUENCE: 59
cctgtttgct ccccacgctt tcgagcctca acgtcagtta ctgtccagta agccgccttc     60
gccactggtg ttcctcctaa tatctacgca tttcaccgct acactaggaa ttccacttac    120
ctctccagca ctctagatga acagtttcca atgcagtccc ggggttgagc cccgggtttt    180
cacatcagac ttgcccatcc gtctacgctc ccttt                               215

<210> SEQ ID NO 60
<211> LENGTH: 215
<212> TYPE: DNA
<213> ORGANISM: Unknown
<220> FEATURE:
<223> OTHER INFORMATION: Description of Unknown:
      Clostridium sensu stricto 1 sequence

<400> SEQUENCE: 60
cctgtttgct ccccacgctt tcgagcctca gcgtcagtta cagtccagag aagcgccttc     60
gccactggtg ttcttcctaa tctctacgca tttcaccgct acactaggaa ttcccttctc    120
ctctcctgca ctctagactt ccagtttgaa atgcagcact caggttaagc ccgagtattt    180
cacatctcac ttaaaaatcc gcctacgctc ccttt                               215

<210> SEQ ID NO 61
<211> LENGTH: 215
<212> TYPE: DNA
<213> ORGANISM: Unknown
<220> FEATURE:
<223> OTHER INFORMATION: Description of Unknown:
      [Clostridium] innocuum group sequence

<400> SEQUENCE: 61
cctatttgct ccccacgctt tcgtgcctca gtgtcagtta cagaccaggc gaccgccttc     60
gccactggtg ttcctccata tatctacgca ttttaccgct acacatggaa ttccatcgcc    120
ctcttctgca ctctagcata ccagtttcca tagcttacaa tggttgagcc attgcctttt    180
actacagact tagtacgcca cctacgcacc cttta                               215

<210> SEQ ID NO 62
<211> LENGTH: 215
<212> TYPE: DNA
<213> ORGANISM: Unknown
<220> FEATURE:
<223> OTHER INFORMATION: Description of Unknown:
      [Ruminococcus] torques group sequence

<400> SEQUENCE: 62
cctgtttgct ccccacgctt tcgagcctca acgtcagtta ctgtccagta agccgccttc     60
gccactggtg ttcctcctaa tatctacgca tttcaccgct acactaggaa ttccacttac    120
ctctccagca ctctagatga acagtttcca atgcagtccc ggggttgagc cccgggtttt    180
cacatcagac ttgccatccg tctacgctcc cttac                               215

<210> SEQ ID NO 63
<211> LENGTH: 215
<212> TYPE: DNA
<213> ORGANISM: Unknown
```

-continued

```
<220> FEATURE:
<223> OTHER INFORMATION: Description of Unknown:
      Clostridium sensu stricto 1 sequence

<400> SEQUENCE: 63
cctgtttgct ccccacgctt tcgagcctca gtgtcagtta cagtccagaa aggcgccttc     60
gccactggta ttcttcctaa tctctacgca tttcaccgct acactaggaa ttctcctttc    120
ctctcctgca ctctagatat ccagtttgga atgcagcacc caggttaagc ccgggtattt    180
cacatcccac ttaaatatcc acctacgctc ccttt                              215

<210> SEQ ID NO 64
<211> LENGTH: 215
<212> TYPE: DNA
<213> ORGANISM: Unknown
<220> FEATURE:
<223> OTHER INFORMATION: Description of Unknown:
      Ruminococcaceae UCG-002 sequence

<400> SEQUENCE: 64
cctgtttgct ccccacgctt tcgcgcctca ccgtcagttg tcgtccagca atccgccttc     60
gccactggtg ttcctcctaa tatctacgca tttcaccgct acactaggaa ttccgattgc    120
ctctccgata ctcaagaaga gtagtttcaa atgcagttca cgagttgagc ccgtggattt    180
cacatctgac ttgccctccc ggctacacgc ccttt                              215

<210> SEQ ID NO 65
<211> LENGTH: 215
<212> TYPE: DNA
<213> ORGANISM: Unknown
<220> FEATURE:
<223> OTHER INFORMATION: Description of Unknown:
      Christensenellaceae R-7 group sequence

<400> SEQUENCE: 65
cctgtttgct ccccacgctt tcgtgcctca gcgtcagtta cagtccagaa agccgccttc     60
gccaccggtg ttcctcctaa tatctacgca tttcaccgct acactaggaa ttccgctttc    120
ctctcctgca ctcaagtccg acagtattgg atgcagcccc caagttaagc ccgggtattt    180
cacatccaac ttaccaaacc gcctacgcac ccttt                              215

<210> SEQ ID NO 66
<211> LENGTH: 215
<212> TYPE: DNA
<213> ORGANISM: Akkermansia sp.

<400> SEQUENCE: 66
ccctttcgct cccctggcct tcgtgcctca gcgtcagtta atgtccagga acccgccttc     60
gccacgagtg ttcctctcga tatctacgca tttcactgct acaccgagaa ttccggttcc    120
ccctccatta ctctagtctc gcagtatcat gtgccgtccg cgggttgagc ccgcgccttt    180
cacacacgac ttacgaaaca gcctacgcac gcttt                              215

<210> SEQ ID NO 67
<211> LENGTH: 215
<212> TYPE: DNA
<213> ORGANISM: Unknown
<220> FEATURE:
<223> OTHER INFORMATION: Description of Unknown:
      Ruminococcaceae UCG-002 sequence

<400> SEQUENCE: 67
```
cctgtttgct ccccacactt tcgcgcctca ccgtcagtta tcgtccagca atccgccttc          60
gccactggtg ttcctcctaa tatctacgca tttcaccgct acactaggaa ttccgattgc         120
ccctccgaca ctcaagatct acagtttcaa atgcagttca tgggttgagc ccatggattt        180
cacatctgac ttgcagaccc ggctgcacgc ccttt                                     215

<210> SEQ ID NO 68
<211> LENGTH: 215
<212> TYPE: DNA
<213> ORGANISM: Unknown
<220> FEATURE:
<223> OTHER INFORMATION: Description of Unknown:
      Ruminococcaceae UCG-002 sequence

<400> SEQUENCE: 68
cctgtttgct ccccacactt tcgcgcctca ccgtcagttg ctgtccagca atccgccttc          60
gccactggtg ttcctcctaa tatctacgca tttcaccgct acactaggaa ttccgattgc         120
ctctccagta ctcaagaaat acagtttcaa atgcagttca tgggttaagc ccatggattt        180
cacatctgac ttgcattccc ggctgcacgc ccttt                                     215

<210> SEQ ID NO 69
<211> LENGTH: 215
<212> TYPE: DNA
<213> ORGANISM: Barnesiella sp.

<400> SEQUENCE: 69
cctgttcgat acccacgctt tcgtgcctca gcgtctgtcg caccctagca ggctgccttc          60
gcaatcgggg ttctgcgtga tatctatgca tttcaccgct acaccacgca ttccgcctgc         120
ctcttgtgca ctctagctcg ccagtttcaa cggcacagtc cgggttgagc ccggaaattt        180
caccgctgac ttggcgtgcc gcctacgcac ccttt                                     215

<210> SEQ ID NO 70
<211> LENGTH: 215
<212> TYPE: DNA
<213> ORGANISM: Blautia sp.

<400> SEQUENCE: 70
cctgtttgct ccccacgctt tcgagcctca acgtcagtta ccgtccagta agccgccttc          60
gccactggtg ttcctcctaa tatctacgca tttcaccgct acactaggaa ttccgcttac         120
ccctccggca ctcaagtatg acagtttcca atgcagtcca caggttgagc ccatgccttt        180
cacatcagac ttgccacacc gtctacgctc cttt                                      215

<210> SEQ ID NO 71
<211> LENGTH: 215
<212> TYPE: DNA
<213> ORGANISM: Bacteroides sp.

<400> SEQUENCE: 71
cctgtttgat acccacactt tcgagcatga acgtcagtta cggcttagtg tgctgccttc          60
gcaatcggag ttcttcgtga tatctaagca tttcaccgct acaccacgaa ttccgcacac         120
ctcaaccgca ctcaaggacg ccagtatcaa ctgcaatttt aaggttgagc cccaaacttt        180
cacagctgac ttaacgaccc gtctgcgctc cttt                                      215

<210> SEQ ID NO 72
<211> LENGTH: 215
<212> TYPE: DNA

```
<213> ORGANISM: Bilophila sp.

<400> SEQUENCE: 72
cctgtttgct acccacgctt tcgcacctca gcgtcagtta ccgtccaggt ggccgccttc      60
gccaccggtg ttcctccaga tatctacgga tttcactcct acacctggaa ttccgccacc     120
ctctccggta ctcaagcctg gcagtatcaa aggcagttcc acagttgggc tgtgggattt     180
cacccctgac ttaccaggcc gcctacgtgc gcttt                                215

<210> SEQ ID NO 73
<211> LENGTH: 215
<212> TYPE: DNA
<213> ORGANISM: Unknown
<220> FEATURE:
<223> OTHER INFORMATION: Description of Unknown:
      Eisenbergiella sequence

<400> SEQUENCE: 73
cctgtttgct ccccacgctt tcgagcctca acgtcagtta cagtccagta agccgccttc      60
gccactggtg ttcctcctaa tatctacgca tttcaccgct acactaggaa ttccgcttac     120
ctctcctgca ctccagcctg gcagttccaa atgcaatccc aaggttgagc cctgggtttt     180
cacatctggc ttgccatgcc gtctacgctc ccttt                                215

<210> SEQ ID NO 74
<211> LENGTH: 215
<212> TYPE: DNA
<213> ORGANISM: Oscillibacter sp.

<400> SEQUENCE: 74
cctgtttgct ccccacgctt tcgcgcctca ccgtcagttg ccgtccagtt atccgccttc      60
gccactggtg ttcttcctta tatctacgca tttcaccgct acacaaggaa ttccgataac     120
ctctccggta ctcaagacct acagtttcaa atgcagtttg gaggttaagc ctccagattt     180
cacatctgac ttgccggccc ggctgcacgc ccttt                                215

<210> SEQ ID NO 75
<211> LENGTH: 215
<212> TYPE: DNA
<213> ORGANISM: Unknown
<220> FEATURE:
<223> OTHER INFORMATION: Description of Unknown:
      Intestinimonas sequence

<400> SEQUENCE: 75
cctgtttgct ccccacgctt tcgcgcctca gcgtcagtta ctgtccagca atccgccttc      60
gccactggtg ttcctccgta tatctacgca tttcaccgct acacacggaa ttccgattgc     120
ctctccagca ctcaagaact acagtttcaa atgcaggcta tgagttgagc tcatagtttt     180
cacatctgac ttgcagtccc gcctacacgc cttt                                 215

<210> SEQ ID NO 76
<211> LENGTH: 215
<212> TYPE: DNA
<213> ORGANISM: Unknown
<220> FEATURE:
<223> OTHER INFORMATION: Description of Unknown:
      Tyzzerella 3 sequence

<400> SEQUENCE: 76
cctgtttgct ccccacgctt tcgtgactca gcgtcagtaa cagtccagta agccgccttc      60
```

-continued

```
gccaccggtg ttcttcctaa tatctacgca tttcaccgct acactaggaa ttccgcttac      120
ctctcctgca ctctagtcat acagtttctt atgcagcgcc aaggttaagc cctgacattt      180
cacatatgac ttgcatgacc gcctactcac ccttt                                215

<210> SEQ ID NO 77
<211> LENGTH: 215
<212> TYPE: DNA
<213> ORGANISM: Unknown
<220> FEATURE:
<223> OTHER INFORMATION: Description of Unknown:
      Lachnospiraceae sequence

<400> SEQUENCE: 77
cctgtttgct ccccacgctt tcgagcctca acgtcagtta cagtccagta agccgccttc       60
gccactggtg ttcctcctaa tatctacgca tttcaccgct acactaggaa ttccacttac      120
ctctcctgca ctccagcctg acagtttcca aagcagttca ggggttgagc ccccgcattt      180
cacttcagac ttgccatgcc gtctacgctc ccttt                                215

<210> SEQ ID NO 78
<211> LENGTH: 215
<212> TYPE: DNA
<213> ORGANISM: Flavonifractor sp.

<400> SEQUENCE: 78
cctgtttgct ccccacgctt tcgcgcctca gcgtcagtta ctgtccagca atccgccttc       60
gccactggtg ttcctccgta tatctacgca tttcaccgct acacacgaa ttccgattgc      120 ctctccagca ctcaagaact acagtttcaa atgcaggctg gaggttgagc ccccagtttt      180
cacatctgac ttgcaatccc gcctacacgc ccttt                                215

<210> SEQ ID NO 79
<211> LENGTH: 215
<212> TYPE: DNA
<213> ORGANISM: Bilophila sp.

<400> SEQUENCE: 79
cctgtttgct acccacgctt tcgcacctca gcgtcagtta ccgtccaggt ggccgccttc       60
gccaccggtg ttcctccaga tatctacgga tttcactcct acacctggaa ttccgccacc      120
ctctccggta ctcaagcctg gcagtatcaa aggcagttcc acagtgggc tgtgggattt      180 cacccctgac ttaccaagcc gcctacgtgc gcttt                                215

<210> SEQ ID NO 80
<211> LENGTH: 215
<212> TYPE: DNA
<213> ORGANISM: Unknown
<220> FEATURE:
<223> OTHER INFORMATION: Description of Unknown:
      Erysipelotrichaceae UCG-003 sequence

<400> SEQUENCE: 80
cctatttgct ccccacgctt tcgggactga gcgtcagtta tgcgccagat cgtcgccttc       60
gccactggtg ttcctccata tatctacgca tttcaccgct acacatggaa ttccacgatc      120
ctctcacaca ctctagctct acggtttcca tggcttaccg aagttaagct tcgatctttc      180
accacagacc cttagtgccg cctgctccct cttta                                215

<210> SEQ ID NO 81
<211> LENGTH: 215
```

-continued

```
<212> TYPE: DNA
<213> ORGANISM: Blautia sp.

<400> SEQUENCE: 81
cctgtttgct ccccacgctt tcgagcctca acgtcagtta ccgtccagta agccgccttc      60
gccactggtg ttcctcctaa tatctacgca tttcaccgct acactaggaa ttccgcttac     120
ctctccggca ctcaagacta acagtttcca atgcagtcca ggggttgagc ccccgccttt     180
cacatcagac ttgccagtcc gtctacgctc ccttt                                215

<210> SEQ ID NO 82
<211> LENGTH: 215
<212> TYPE: DNA
<213> ORGANISM: Blautia sp.

<400> SEQUENCE: 82
cctgtttgct ccccacgctt tcgagcctca acgtcagtta ccgtccagta agccgccttc      60
gccactggtg ttcctcctaa tatctacgca tttcaccgct acactaggaa ttccgcttac     120
ctctccggca ctcaagacgg gcagtttcca atgcagtccc ggggttgagc cccagccttt     180
cacatcagac ttgtccatcc gtctacgctc ccttt                                215

<210> SEQ ID NO 83
<211> LENGTH: 215
<212> TYPE: DNA
<213> ORGANISM: Oxalobacter sp.

<400> SEQUENCE: 83
cctgtttgct ccccacgctt tcgtgcatga gcgtcagtgt tatcccaggg ggctgccttc      60
gccatcggta ttcctccaca tatctacgca tttcactgct acacgtggaa ttctacccccc    120 ctctgacaca ctctagccgt gcagtcacaa atgcaattcc caggttaagc ccgggcattt     180
cacatctgtc ttacacaacc gcctgcgcac gcttt                                215

<210> SEQ ID NO 84
<211> LENGTH: 215
<212> TYPE: DNA
<213> ORGANISM: Unknown
<220> FEATURE:
<223> OTHER INFORMATION: Description of Unknown:
      Ruminococcus 1 sequence

<400> SEQUENCE: 84
cctgtttgct ccccacgctt tcgagcctca gcgtcagtaa aggcccagta agccgccttc      60
gccaccgatg ttcctcctga tctctacgca tttcaccgct acaccaggaa ttccgcttac     120
ctctacctca ctcaagaaca acagtttcaa atgcagtcta tgggttgagc ccatagtttt     180
cacatctgac ttgccgtccc gcctacgctc ccttt                                215

<210> SEQ ID NO 85
<211> LENGTH: 215
<212> TYPE: DNA
<213> ORGANISM: Unknown
<220> FEATURE:
<223> OTHER INFORMATION: Description of Unknown:
      Ruminococcaceae UCG-003;Ambiguous_taxa sequence

<400> SEQUENCE: 85
cctgtttgct ccccacgctt tcgcgcctca ccgtcagtta ccgtccagta atccgccttc      60
gccactggtg ttcttcctta tatctacgca tttcaccgct acacaaggaa ttccgattac     120
```

-continued

```
ctctccggca ctcaagatgc acagtttcaa atgcagtttc agggttgagc cctgagattt      180
cacatctgac ttgcgcaccc ggctgcacgc ccttt                                  215

<210> SEQ ID NO 86
<211> LENGTH: 215
<212> TYPE: DNA
<213> ORGANISM: Unknown
<220> FEATURE:
<223> OTHER INFORMATION: Description of Unknown:
      Christensenellaceae R-7 group sequence

<400> SEQUENCE: 86 cctgttttgct ccccacgctt cgcgcctca acgtcagtta cagtccagaa agccgccttc      60
gccactggtg ttcctcctaa tatctacgca tttcaccgct acactaggaa ttccgcttcc      120
ctctcctgca ctcaagccat gcagtattac aggcagttcc aaccttgaaa gttgggcttt      180
cacctataac ttacacagcc gtctacgcgc cttt                                   215

<210> SEQ ID NO 87
<211> LENGTH: 215
<212> TYPE: DNA
<213> ORGANISM: Oscillibacter sp.

<400> SEQUENCE: 87 cctgtttttgct ccccacgctt cgcgcctca ccgtcagttg ccgtccagtc atccgccttc     60
gccactggtg ttcttcctta tatctacgca tttcaccgct acacaaggaa ttccgatgac      120
ctctccggta ctcaagacca gcagtttcaa acgcagttcc agggttgagc cctgggattt      180
cacgcctgac ttgccagccc ggctgcacgc cttt                                   215

<210> SEQ ID NO 88
<211> LENGTH: 215
<212> TYPE: DNA
<213> ORGANISM: Unknown
<220> FEATURE:
<223> OTHER INFORMATION: Description of Unknown:
      Ruminococcaceae UCG-014 sequence

<400> SEQUENCE: 88 cctgtttttgct ccccacactt cgtgcctca acgtcagttt ctgtccagaa agtcgccttc     60
gccactggtg ttcctcctaa tatctacgca tttcaccgct acactaggaa ttccactttc      120
ctctccagta ctcaagaaaa acagtttttag ttgcagttcc tcagttaagc cgagggattt     180
cacaactaac ttatcttccc gtctacgcac cttt                                   215

<210> SEQ ID NO 89
<211> LENGTH: 215
<212> TYPE: DNA
<213> ORGANISM: Unknown
<220> FEATURE:
<223> OTHER INFORMATION: Description of Unknown:
      Lachnospiraceae ND3007 group sequence

<400> SEQUENCE: 89 cctgtttttgct ccccacgctt cgagcctca gtgtcagtta cagtccagtg agccgccttc     60
gcctccggtg ttcctcctaa tatctacgca tttcaccgct acactaggaa ttccgctcac      120
ccctcctgca ctctagcatg acagttccaa aagcaatccc gcggttgagc cccgggtttt      180
cacttctggc ttgccttgcc acctacgctc cttt                                   215

<210> SEQ ID NO 90
```

```
<211> LENGTH: 215
<212> TYPE: DNA
<213> ORGANISM: Unknown
<220> FEATURE:
<223> OTHER INFORMATION: Description of Unknown:
      Ruminiclostridium 9 sequence

<400> SEQUENCE: 90
cctgtttgct ccccacactt tcgcgcctca gcgtcagtta ctgtccagca aatcgccttc      60
gccactggtg ttcttcctaa tatctacgca tttcaccgct acactaggag ttccatttgc     120
ctctccagca ctcaagaact acagtttcaa atgcaggcta tgagttgagc ccatagtttt     180
cacatctgac ttgcagtccc gcctacacgc ccttt                                215

<210> SEQ ID NO 91
<211> LENGTH: 215
<212> TYPE: DNA
<213> ORGANISM: Unknown
<220> FEATURE:
<223> OTHER INFORMATION: Description of Unknown:
      Christensenellaceae R-7 group sequence

<400> SEQUENCE: 91
cctgtttgct ccccacgctt tcgtgcctca gcgtcagttg tcgtccagta agccgccttc      60
gccactggtg ttcctcccga tatctacgca tttcaccgct acaccgggaa ttccgcttac     120
ctctccgaca ctcaagtccg aaagtttcga atgcagctcc catgttaagc acggggattt     180
cacatccgac ttttcagacc gcctacgcac ccttt                                215

<210> SEQ ID NO 92
<211> LENGTH: 215
<212> TYPE: DNA
<213> ORGANISM: Unknown
<220> FEATURE:
<223> OTHER INFORMATION: Description of Unknown:
      Ruminiclostridium 9;Ambiguous_taxa sequence

<400> SEQUENCE: 92
cctgtttgct ccccacgctt tcgcgcctca gcgtcagttg ctgtccagca gatcgccttc      60
gccactggtg ttcctcctaa tatctacgca tttcaccgct acactaggaa ttccatctgc     120
ctctccagta ctcaagaaaa acagtttcaa atgcaggctg tgggttgagc ccacagtttt     180
cacatctgac ttgctttccc gcctacacgc ccttt                                215

<210> SEQ ID NO 93
<211> LENGTH: 215
<212> TYPE: DNA
<213> ORGANISM: Unknown
<220> FEATURE:
<223> OTHER INFORMATION: Description of Unknown:
      Ruminiclostridium 9 sequence

<400> SEQUENCE: 93
cctgtttgct ccccacgctt tcgcgcctca gcgtcagttg ctgtccagtt gaccgccttc      60
gccactggtg ttcctcctaa tatctacgca tttcaccgct acactaggaa ttccgtcaac     120
ctctccagta ctcaagaact acagtttcaa acgcaggcca gaggttgagc ccctggtttt     180
cacgcctgac ttgcaatccc gcctacacgc ccttt                                215

<210> SEQ ID NO 94
<211> LENGTH: 215
<212> TYPE: DNA
<213> ORGANISM: Unknown
```

```
<220> FEATURE:
<223> OTHER INFORMATION: Description of Unknown:
      Family XIII AD3011 group sequence

<400> SEQUENCE: 94
cctgtttgct ccccacgctt tcgtacctca gtgtcagtta cagtccagaa agccgccttc      60
gccactggtg ttcctcctaa tatctacgca tttcaccgct acactaggaa ttccgctttc     120
ctctcctgca ctcaagtagc ccagttcaca aggcgaacaa tggttaagcc attgccttat     180
acctcgtgct taggtaacca cctacgtact cttta                                215

<210> SEQ ID NO 95
<211> LENGTH: 215
<212> TYPE: DNA
<213> ORGANISM: Unknown
<220> FEATURE:
<223> OTHER INFORMATION: Description of Unknown:
      gut metagenome sequence

<400> SEQUENCE: 95
cctgtttgct ccccacgctt tcgtgcttca gtgtcagtta cggcccagta tgtcgctttc      60
gccaccggtg ttcctcctaa tatctacgca ttccaccgct acactaggaa ttccacatac     120
ccctgccgca ctcaagccta tcagttttgg cagtagttcc gcggttaagc cacggaatta     180
cgctgccaac ttgacaaacc acctacgcac ccttt                                215

<210> SEQ ID NO 96
<211> LENGTH: 215
<212> TYPE: DNA
<213> ORGANISM: Unknown
<220> FEATURE:
<223> OTHER INFORMATION: Description of Unknown:
      Agathobacter sequence

<400> SEQUENCE: 96
cctgtttgct ccccacgctt tcgagcctca gcgtcagtta tcgtccagta agccgccttc      60
gccactggtg ttcctcctaa tatctacgca tttcaccgct acactaggaa ttccgcttac     120
ccctccgaca ctctagtacg acagtttcca atgcagtacc gaggttgagc cccgggtttt     180
cacatcagac ttgccgcacc gcctgcgctc ccttt                                215

<210> SEQ ID NO 97
<211> LENGTH: 215
<212> TYPE: DNA
<213> ORGANISM: Unknown
<220> FEATURE:
<223> OTHER INFORMATION: Description of Unknown:
      Ruminococcaceae UCG-005 sequence

<400> SEQUENCE: 97
cctgtttgct ccccacgctt tcgcgcctca gcgtcagttg tcgtccagca ggccgccttc      60
gccactggtg ttcctcctaa tatctacgca tttcaccgct acactaggaa ttccgcctgc     120
ctctccgata ctcaagaaaa acggtttcaa atgcagttcc ggggttgagc cccgacattt     180
cacatctgac ctgtcttccc gcctacacgc ccttt                                215

<210> SEQ ID NO 98
<211> LENGTH: 215
<212> TYPE: DNA
<213> ORGANISM: Flavonifractor sp.

<400> SEQUENCE: 98
```

-continued

```
cctgtttgct ccccacgctt tcgcgcctca gcgtcagtta tcgtccagcg atccgccttc      60
gccactggtg ttcctccgta tatctacgca tttcaccgct acacacgaa  ttccgatcgc     120 ctctccgaca ctcaagaact acagtttcaa atgcaggctg gaggttgagc ccccagtttt     180
cacatctgac ttgcagtccc gcctacacgc ccttt                                215
```

```
<210> SEQ ID NO 99
<211> LENGTH: 215
<212> TYPE: DNA
<213> ORGANISM: Unknown
<220> FEATURE:
<223> OTHER INFORMATION: Description of Unknown:
      Defluviitaleaceae UCG-011 sequence

<400> SEQUENCE: 99
```

```
cctgtttgct ccccacgctt tcgtgcctca gcgtcagttg cagtccagaa agccgccttc      60
gccactggtg ttcttcctaa tatctacgca tttcaccgct acactaggaa ttccgctttc     120
ctctcctgca ctctagctcc gcagtttcca ttgcacttcg atggttaagc catcgccttt     180
cacaacagac ttacggtgcc gcctacgcac ccttt                                215
```

```
<210> SEQ ID NO 100
<211> LENGTH: 215
<212> TYPE: DNA
<213> ORGANISM: Unknown
<220> FEATURE:
<223> OTHER INFORMATION: Description of Unknown:
      Ruminiclostridium 9 sequence

<400> SEQUENCE: 100
```

```
cctgtttgct ccccacgctt tcgcgcctca gcgtcagttg ctgtccagca gaccgccttc      60
gccactggtg ttcctcctaa tatctacgca tttcaccgct acactaggaa ttccgtctgc     120
ctctccagta ctcaagaact acagtttcaa atgcaggcca caggttgagc ccatggtttt     180
cacatctgac ttgcagtccc gcctacacgc ccttt                                215
```

```
<210> SEQ ID NO 101
<211> LENGTH: 215
<212> TYPE: DNA
<213> ORGANISM: Unknown
<220> FEATURE:
<223> OTHER INFORMATION: Description of Unknown:
      uncultured sequence

<400> SEQUENCE: 101
```

```
cctgtttgct ccccacgctt tcgtgcctca gcgtcagtta cagtccagaa agccgccttc      60
gccactggtg ttcctcctaa tatctacgca tttcaccgct acactaggaa ttccgctttc     120
ctctcctgca ctcaagccta acagtatcag atgcaccccc catgttgagc acgggtattt     180
cacatctgac ttaccaggcc gcctacgcac ccttt                                215
```

```
<210> SEQ ID NO 102
<211> LENGTH: 215
<212> TYPE: DNA
<213> ORGANISM: Unknown
<220> FEATURE:
<223> OTHER INFORMATION: Description of Unknown:
      DTU089 sequence

<400> SEQUENCE: 102
```

```
cctgtttgct acccatgctt tcgtgcctca gcgtcagtta aggcccagca ggccgccttc      60
gccactggtg ttcctcccga tctctacgca tttcaccgct acaccgggaa ttccgcctgc     120
```
ctctacctca ctcaagaccc acagtttcaa tagcagttcc agggttaagc cctgggattt          180
cactactgac ttgcagatcc gcctacgcac ccttt                                     215

<210> SEQ ID NO 103
<211> LENGTH: 215
<212> TYPE: DNA
<213> ORGANISM: Unknown
<220> FEATURE:
<223> OTHER INFORMATION: Description of Unknown:
      Angelakisella sequence

<400> SEQUENCE: 103
cctgtttgct ccccacactt tcgagcctca gcgtcagtaa aagcccagca agccgccttc          60
gccactggtg ttcctcctaa tatctacgca tttcaccgct acactaggaa ttccgcttgc          120
ctctacttca ctcaagaaaa acagttttga atgcagtctg taggttgagc ccacagtttt          180
cacatccaac ttgccttccc gcctacgctc ccttt                                     215

<210> SEQ ID NO 104
<211> LENGTH: 215
<212> TYPE: DNA
<213> ORGANISM: Marvinbryantia sp.

<400> SEQUENCE: 104
cctgtttgct ccccacgctt tcgagcctca acgtcagtta ccgtccagta agccgccttc          60
gccactggtg ttcctcctaa tatctacgca tttcaccgct acactaggaa ttccgcttac          120
ctctccggca ctcagcagg acagtttcca atgcagtccc ggggttgagc cccagccttt          180
cacatcagac ttgccttgcc gtctacgctc ccttt                                     215

<210> SEQ ID NO 105
<211> LENGTH: 215
<212> TYPE: DNA
<213> ORGANISM: Streptococcus sp.

<400> SEQUENCE: 105
cctgttcgct ccccacgctt tcgagcctca gcgtcagtta cagaccagag agccgctttc          60
gccaccggtg ttcctccata tatctacgca tttcaccgct acacatggaa ttccactctc          120
cccttctgca ctcaagtttg acagtttcca aagcgaacta tggttgagcc acagccttta          180
acttcagact tatcaaaccg cctgcgctcg cttta                                     215

<210> SEQ ID NO 106
<211> LENGTH: 215
<212> TYPE: DNA
<213> ORGANISM: Unknown
<220> FEATURE:
<223> OTHER INFORMATION: Description of Unknown:
      Ruminococcaceae sequence

<400> SEQUENCE: 106
cctgtttgct ccccacgctt tcgcgcctca gcgtcagtta ctgtccagca atccgccttc          60
gccactggtg ttcctccgta tatctacgca tttcaccgct acacacggaa ttccgattgc          120
ctctccagca ctcaagaaaa acagtttcaa atgcaggcta tgagttgagc ccatagtttt          180
cacatctgac ttgccttccc gcctacacgc ccttt                                     215

<210> SEQ ID NO 107
<211> LENGTH: 215
<212> TYPE: DNA

-continued

```
<213> ORGANISM: Unknown
<220> FEATURE:
<223> OTHER INFORMATION: Description of Unknown:
      Clostridiales sequence

<400> SEQUENCE: 107
cctgtttgct acccacgctt tcgtgcctca gcgtcagttt tggtccagca agccgccttc      60
gccactggtg ttcctcccga tctctacgca tttcaccgct acaccgggaa ttccgcttgc     120
ctctcccata ctcaagccaa ccagtttcaa gtgcaacccc catgttaagc acgggtcttt     180
cacacctgac ttgatcggcc gcctacgcac ccttt                               215

<210> SEQ ID NO 108
<211> LENGTH: 215
<212> TYPE: DNA
<213> ORGANISM: Unknown
<220> FEATURE:
<223> OTHER INFORMATION: Description of Unknown:
      uncultured sequence

<400> SEQUENCE: 108
cctgtttgct acccacgctt tcgtgcctca gcgtcagtta cagtccagta agtcgccttc      60
gccactggtg ttcctcctaa tatctacgca ttccaccgct acactaggaa ttccacttac     120
ctctcctgca ctcaagcaca gcagtatcag aagcagtccc gaggttaagc cccgatattt     180
cacttctgac taactgcgcc gcctacgcac ccttt                               215

<210> SEQ ID NO 109
<211> LENGTH: 215
<212> TYPE: DNA
<213> ORGANISM: Unknown
<220> FEATURE:
<223> OTHER INFORMATION: Description of Unknown:
      Ruminococcaceae UCG-002 sequence

<400> SEQUENCE: 109
cctgtttgct ccccacgctt tcgcgcctca ccgtcagttg tcgtccagca atccgccttc      60
gccactggtg ttcctcctaa tatctacgca tttcaccgct acactaggaa ttccgattgc     120
ctctccgata ctcaagaaaa gtagtttcaa atgcagttca cgagttaagc ccgtggattt     180
cacatctgac ttgccttccc ggctacacgc ccttt                               215

<210> SEQ ID NO 110
<211> LENGTH: 215
<212> TYPE: DNA
<213> ORGANISM: Subdoligranulum sp.

<400> SEQUENCE: 110
cctgtttgct acccatgctt tcgagcctca gcgtcagttg gtgcccagta ggtcgccttc      60
gccactggtg ttcctcccga tatctacgca ttccaccgct acaccgggaa ttccacctac     120
ctctgcacta ctcaaggcca gcagttttga aagcaattca cgggttgagc ccatggattt     180
cacttccaac ttgccggtcc gcctgcgctc ccttt                               215

<210> SEQ ID NO 111
<211> LENGTH: 215
<212> TYPE: DNA
<213> ORGANISM: Unknown
<220> FEATURE:
<223> OTHER INFORMATION: Description of Unknown:
      Ruminococcaceae NK4A214 group sequence

<400> SEQUENCE: 111
```

-continued

```
cctgtttgct ccccacgctt tcgcgcctca gcgtcagtta tcgtccagtt gaccgccttc      60
gccactggtg ttcctcctaa tatctacgca tttcaccgct acactaggaa ttccgtcaac     120
ctctccgaca ctcaagaaat acagtttcaa atgcagttca agggttgagc ccttggattt     180
cacatctgac ttgcattccc gcctacgcgc ccttt                                215
```

```
<210> SEQ ID NO 112
<211> LENGTH: 215
<212> TYPE: DNA
<213> ORGANISM: Unknown
<220> FEATURE:
<223> OTHER INFORMATION: Description of Unknown:
      Family XIII UCG-001 sequence

<400> SEQUENCE: 112
```

```
cctgtttgct ccccacgctt tcgtacctca gcgtcagtta cagtccagaa agtcgccttc      60
gccactggtg ttcctcctaa tatctacgca tttcaccgct acactaggaa ttccacttc     120 ccctcctgca ctcaagtctg acagttcgca aggctgacat tggttgagcc tatgcctttc     180
accttgcgct taccagaccg cctacgtact cttta                                215
```

```
<210> SEQ ID NO 113
<211> LENGTH: 215
<212> TYPE: DNA
<213> ORGANISM: Unknown
<220> FEATURE:
<223> OTHER INFORMATION: Description of Unknown:
      uncultured sequence

<400> SEQUENCE: 113
```

```
cctgtttgct ccccacgctt tcgcgcctca gtgtcagtta cggtccaggc agccgccttc      60
gccactggtg ttcctcccaa tctctacgca tttcaccgct acactgggaa ttccactgcc     120
ctctcccgca ctcaagactg accgtatcgg atgcggttcc caggttaagc ctggggcttt     180
cacatccgac tgatcagtcc acctacacgc ccttt                                215
```

```
<210> SEQ ID NO 114
<211> LENGTH: 215
<212> TYPE: DNA
<213> ORGANISM: Desulfovibrio sp.

<400> SEQUENCE: 114
```

```
cctgtttgct ccccacgctt tcgcacctca gcgtcaatac cggtccaggt ggccgccttc      60
gccactgatg ttcctccaga tatctacgga tttcactcct acacctggaa ttccgccacc     120
ctctcccgga ttcaagttgt gcagtatcaa aggcagttcc acggttgagc cgtgggattt     180
cacccctgac ttacactaca gcctacgtgc gcttt                                215
```

```
<210> SEQ ID NO 115
<211> LENGTH: 215
<212> TYPE: DNA
<213> ORGANISM: Unknown
<220> FEATURE:
<223> OTHER INFORMATION: Description of Unknown:
      Ruminiclostridium 1 sequence

<400> SEQUENCE: 115
```

```
cctgtttgct ccccacgctt tcgcgcctca gcgtcagttt ctgtccagaa agccgccttc      60
gccaccggtg ttcctcctaa tatctacgca tttcaccgct acactaggaa ttccactttc     120
ctctccagta ctcaagatcc acagtttcag atgcagttcc ggagttaagc cccggcattt     180
```

-continued

```
cacatctgac ttgcagaccc gcctacgcgc ccttt                      215

<210> SEQ ID NO 116
<211> LENGTH: 215
<212> TYPE: DNA
<213> ORGANISM: Blautia sp.

<400> SEQUENCE: 116
cctgtttgct ccccacgctt tcgagcctca acgtcagtta ccgtccagta agccgccttc    60
gccactggtg ttcctcctaa tatctacgca tttcaccgct acactaggaa ttccgcttac   120
ctctccggca ctcaagaaaa acagtttcca atgcagtcct ggggttaagc cccagccttt   180
cacatcagac ttgctcttcc gtctacgctc ccttt                      215

<210> SEQ ID NO 117
<211> LENGTH: 215
<212> TYPE: DNA
<213> ORGANISM: Blautia sp.

<400> SEQUENCE: 117
cctgtttgct ccccacgctt tcgagcctca acgtcagtta ccgtccagta agccgccttc    60
gccactggtg ttcctcctaa tatctacgca tttcaccgct acactaggaa ttccgcttac   120
ccctccggca ctcaagtatg acagtttcca atgcagtcca cgggttgagc ccatgccttt   180
cacatcagac ttgccacacc gtctacgctc ccttt                      215
```